(12) United States Patent
Teyeb et al.

(10) Patent No.: US 12,267,732 B2
(45) Date of Patent: Apr. 1, 2025

(54) CONDITIONAL CONFIGURATION IN A WIRELESS COMMUNICATION NETWORK

(71) Applicant: Telefonaktiebolaget LM Ericsson (publ), Stockholm (SE)

(72) Inventors: Oumer Teyeb, Montréal (CA); Patrik Rugeland, Stockholm (SE); Icaro L. J. da Silva, Solna (SE); Mattias Bergström, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 492 days.

(21) Appl. No.: 17/627,834

(22) PCT Filed: Jul. 17, 2020

(86) PCT No.: PCT/SE2020/050739
§ 371 (c)(1),
(2) Date: Jan. 18, 2022

(87) PCT Pub. No.: WO2021/015658
PCT Pub. Date: Jan. 28, 2021

(65) Prior Publication Data
US 2023/0007542 A1 Jan. 5, 2023

Related U.S. Application Data

(60) Provisional application No. 62/876,245, filed on Jul. 19, 2019.

(51) Int. Cl.
*H04W 36/00* (2009.01)
*H04W 76/27* (2018.01)
(52) U.S. Cl.
CPC ....... *H04W 36/0016* (2013.01); *H04W 76/27* (2018.02)

(58) Field of Classification Search
CPC .......................... H04W 36/0016; H04W 76/27
See application file for complete search history.

(56) References Cited

U.S. PATENT DOCUMENTS

| 2018/0279193 A1 | 9/2018 | Park et al. | |
| 2019/0223073 A1* | 7/2019 | Chen | H04W 36/0079 |
| 2020/0396652 A1* | 12/2020 | Decarreau | H04W 36/0033 |

FOREIGN PATENT DOCUMENTS

| CA | 3047626 A1 | 6/2018 |
| CN | 105612786 A | 5/2016 |

(Continued)

OTHER PUBLICATIONS

3GPP, "3GPP TS 37.340 V15.6.0", 3rd Generation Partnership Project; Technical Specification Group Radio Access Network; Evolved Universal Terrestrial Radio Access (E-UTRA) and NR; Multi-connectivity; Stage 2 (Release 15), Jun. 2019, 1-69.

(Continued)

*Primary Examiner* — Walter J DiVito
(74) *Attorney, Agent, or Firm* — Murphy, Bilak & Homiller, PLLC

(57) ABSTRACT

A wireless device (16) receives a control message (26) indicating a conditional configuration (28-1) that the wireless device (16) is to add, modify, or release for a link (20). The control message (26) includes configuration-specific information (30-1) that distinguishes the conditional configuration (28-1) from one or more other conditional configurations that are configurable for the link (20). The configuration-specific information (30-1) may for example includes a conditional configuration identifier that is unique at least among any conditional configurations configured for the link (20).

19 Claims, 25 Drawing Sheets

(56) References Cited

FOREIGN PATENT DOCUMENTS

| CN | 108605253 A | 9/2018 |
|---|---|---|
| CN | 106797590 A | 7/2020 |
| WO | 2010057127 A1 | 5/2010 |
| WO | 2018156696 A1 | 8/2018 |
| WO | 2019096396 A1 | 5/2019 |
| WO | 2021010890 A1 | 1/2021 |
| WO | 2021015659 A1 | 1/2021 |

OTHER PUBLICATIONS

3GPP, "3rd Generation Partnership Project; Technical Specification Group Radio Access Network; NR; NR and NG-RAN Overall Description; Stage 2 (Release 15)", 3GPP TS 38.300 V15.2.0, Jun. 2018, 1-87.

China Telecom, "Handling of the CHO release in NR", 3GPP TSG-RAN WG2 Meeting #106, R2-1906472, Reno, America, May 13-17, 2019, 1-2.

China Telecom, "Reconfiguration and deconfiguration of Cho", 3GPP Tsg-Ran WG2 Meeting #106, R2-1907139, Reno, USA, May 13-17, 2019, 1-2.

Huawei, et al., "Considerations on modification of CHO configurations by RRC signalling", 3GPP TSG-RAN WG2 Meeting #106, R2-1907672, Reno, Nevada, USA, May 13-17, 2019, 1-2.

Huawei, et al., "Discussion on de-configuration for CHO", 3GPP TSG-RAN WG2 #106, R2-1907432, Reno, USA, May 13-17, 2019, 1-3.

Nokia, et al., "Conditional Handover in E-UTRAN—other aspects", 3GPP TSG-RAN WG2 Meeting #106, R2-1907276, Reno, USA, May 13-17, 2019, 1-3.

Sharp, "Open issues for multiple candidate cells in conditional handover in NR", 3GPP TSG-RAN WG2#105bis meeting, R2-1903768, Xi'an, China, Apr. 8-12, 2019, 1-5.

\* cited by examiner

DETERMINING TO TRANSMIT THE CONTROL MESSAGE, BASED ON NETWORK CONDITIONS AND/OR TRAFFIC CONDITIONS FOR THE WIRELESS DEVICE
300

TRANSMITTING, TO A WIRELESS DEVICE, A CONTROL MESSAGE INDICATING A CONDITIONAL CONFIGURATION THAT THE WIRELESS DEVICE IS TO ADD, MODIFY, OR RELEASE FOR A LINK, WHEREIN THE CONTROL MESSAGE INCLUDES CONFIGURATION-SPECIFIC INFORMATION THAT DISTINGUISHES THE CONDITIONAL CONFIGURATION FROM ONE OR MORE OTHER CONDITIONAL CONFIGURATIONS THAT ARE CONFIGURABLE FOR THE LINK
310

RECEIVING A CONTROL MESSAGE INDICATING A CONDITIONAL CONFIGURATION THAT THE WIRELESS DEVICE HAS APPLIED FOR THE LINK, WHEREIN THE RECEIVED CONTROL MESSAGE INCLUDES CONFIGURATION-SPECIFIC INFORMATION THAT DISTINGUISHES THE APPLIED CONDITIONAL CONFIGURATION FROM ONE OR MORE OTHER CONDITIONAL CONFIGURATIONS THAT ARE CONFIGURABLE FOR THE LINK
320

*FIGURE 3*

CONDITIONAL CONFIGURATION IN A WIRELESS COMMUNICATION NETWORK

TECHNICAL FIELD

The present application relates generally to a wireless communication network, and more particularly to conditional configuration in such a network.

BACKGROUND

Robustness of mobility procedures to failure proves challenging particularly in New Radio (NR) systems whose radio links are more prone to fast fading due to their higher operating frequencies. Conditional mobility is one approach to improve mobility robustness in this regard. Under this approach, a wireless device may be commanded to perform a mobility procedure (e.g., handover or resume) earlier than traditionally commanded, before the source radio link quality deteriorates below a certain threshold. But the wireless device is commanded to wait to perform that mobility procedure until the wireless device detects that a certain condition is fulfilled, e.g., the source radio link quality deteriorates even further below a different threshold. Once the device detects that condition, the device may autonomously perform the mobility procedure without receiving any other signaling on the source radio link, so that the procedure proves robust to source link deterioration.

In practice, there may be multiple links that are candidates for a mobility procedure, or multiple possible ways to configure the same link for a mobility procedure. Known approaches to conditional mobility, however, fail to adequately support multiple conditional handover configurations, especially for the same link.

SUMMARY

Although conditional mobility can improve mobility robustness in a wireless communication network, distributing more control over a mobility procedure to a wireless device threatens to waste resources if the wireless device is configured with multiple conditional mobility configurations as alternatives. If the wireless device only applies one of those mobility configurations, resources reserved for the other mobility configurations may go wasted if they are not released. Especially if the wireless device is configured with multiple mobility configurations for the same link (e.g., cell or network node), though, the network may be unable to identify which mobility configuration the wireless device applied and therefore unable to release the appropriate resources. A similar problem may arise in other contexts besides mobility which exploit conditional configurations that the wireless device is to apply upon the occurrence of a condition.

According to some embodiments herein, different conditional configurations that are configurable for the same link (e.g., a cell or radio network node) are distinguishable on the basis of configuration-specific information. The configuration-specific information may for instance be conditional configuration identifiers, such that different conditional configurations for the same link have unique conditional configuration identifiers. Alternatively or additionally, the configuration-specific information may for instance be radio network temporary identifiers, such that different conditional configurations for the same link are associated with respective radio network temporary identifiers. Alternatively or additionally, the configuration-specific information may for instance be random access preambles and/or random access resources, such that different conditional configurations for the same link are associated with respective random access preambles and/or random access resources.

With different conditional configurations (e.g., for a link) distinguishable in these or other ways, any of those conditional configurations may be added, released, or modified as needed. For example, the wireless device may transmit a control message that unambiguously identifies which of the conditional configurations the wireless device applied for the link, so that the network can release any other conditional configurations for the same link that were not applied. As another example, if network conditions and/or traffic conditions for the wireless device change after the wireless device has already been configured with one or more conditional configurations for a link, the network may add, release, or modify a conditional configuration for that link to dynamically account for such a change. In these and other embodiments, then, the distinguishability of different conditional configurations for the same link advantageously avoids resource waste.

More particularly, embodiments herein include a method performed by a wireless device. The method comprises receiving a control message indicating a conditional configuration that the wireless device is to add, modify, or release for a link. The control message includes configuration-specific information that distinguishes the conditional configuration from one or more other conditional configurations that are configurable for the link.

In some embodiments, the configuration-specific information includes a conditional configuration identifier that is unique at least among any conditional configurations configured for the link. Alternatively or additionally, the configuration-specific information includes a Radio Resource Control, RRC, transaction identifier, or a radio network temporary identifier, that is unique at least among any conditional configurations configured for the link. Alternatively or additionally, the configuration-specific information includes a random access channel configuration that is unique at least among any conditional configurations configured for the link.

In some embodiments, the link is a cell. In other embodiments, the link is a radio network node.

In some embodiments, the conditional configuration is a conditional handover configuration that contains a handover configuration and one or more trigger conditions whose fulfillment is to trigger execution of the handover configuration.

In some embodiments, the conditional configuration is a conditional configuration that contains a configuration and one or more trigger conditions whose fulfillment is to trigger execution of the configuration. In one such embodiment, the control message is received from a source link for the conditional configuration.

In some embodiments, the conditional configuration is a conditional configuration that contains a configuration and one or more trigger conditions whose fulfillment is to trigger execution of the configuration. In one such embodiment, the control message is received, via a source link for the conditional configuration, from a target link for the conditional configuration. In one embodiment, the control message is or is included in a transparent container that the source link transparently forwards from the target link to the wireless device.

In some embodiments, the method further comprises adding, modifying, or releasing the conditional configuration for the link in accordance with the received control message.

In some embodiments, the method further comprises applying a conditional configuration whose one or more trigger conditions are fulfilled. The method may also comprise transmitting a control message indicating a conditional configuration that the wireless device has applied for the link. In this case, the transmitted control message may include configuration-specific information that distinguishes the applied conditional configuration from one or more other conditional configurations that are configurable for the link.

Embodiments herein also include a method performed by a radio network node. The method comprises transmitting, to a wireless device, a control message indicating a conditional configuration that the wireless device is to add, modify, or release for a link. The control message includes configuration-specific information that distinguishes the conditional configuration from one or more other conditional configurations that are configurable for the link.

In some embodiments, the configuration-specific information includes a conditional configuration identifier that is unique at least among any conditional configurations configured for the link. Alternatively or additionally, the configuration-specific information includes a Radio Resource Control, RRC, transaction identifier, or a radio network temporary identifier, that is unique at least among any conditional configurations configured for the link. Alternatively or additionally, the configuration-specific information includes a random access channel configuration that is unique at least among any conditional configurations configured for the link.

In some embodiments, the link is a cell. In other embodiments, the link is a radio network node.

In some embodiments, the method further comprises triggering the addition, modification, or release of the conditional configuration for the link, based on network conditions and/or traffic conditions for the wireless device, or responsive to one or more of: a change in availability of resources needed for the conditional configuration; the wireless device applying a different conditional configuration; a change in resource requirements that are required for communicating traffic to or from the wireless device; or a change in channel conditions at the wireless device.

In some embodiments, the conditional configuration is a conditional handover configuration that contains a handover configuration and one or more trigger conditions whose fulfillment is to trigger execution of the handover configuration.

In some embodiments, the radio network node is a target radio network node for the conditional configuration and/or provides a target cell candidate for the conditional configuration. In one such embodiment, the method further comprises triggering, by the target radio network node, the addition, modification, or release of the conditional configuration for the link.

In some embodiments, the radio network node is a target radio network node for the conditional configuration and/or provides a target cell candidate for the conditional configuration. In one such embodiment, transmitting the control message to the wireless device comprises transmitting the control message to the wireless device transparently via a source radio network node for the conditional configuration. For example, transmitting the control message to the wireless device transparently via the source radio network node may comprise transmitting a container to the source radio network node, wherein the container includes the control message.

In other embodiments, the radio network node is a source radio network node for the conditional configuration. The method in this case may further comprise receiving, from a target radio network node for the conditional configuration, a message explicitly indicating which conditional configuration the wireless device is to add, modify, or release for the link, as triggered by the target radio network node. The method may also comprise processing the received message to determine which conditional configuration the wireless device is to add, modify, or release for the link. In one such embodiment, transmitting the control message to the wireless device is performed responsive to receiving the message from the target radio network node.

In some embodiments, the transmitted control message indicates multiple conditional configurations that the wireless device is to add, modify, or release for the link. In one embodiment, the control message includes configuration-specific information for each of the multiple conditional configurations that distinguishes the multiple conditional configurations from one another.

In some embodiments, the method further comprises receiving a control message indicating a conditional configuration that the wireless device has applied for the link. In one embodiment, the received control message includes configuration-specific information that distinguishes the applied conditional configuration from one or more other conditional configurations that are configurable for the link.

Embodiments herein also include a method performed by a radio network node. The method comprises transmitting, to another radio network node, a control message indicating a conditional configuration that the other radio network node is to add, modify, or release. In one embodiment, the control message includes configuration-specific information that distinguishes the conditional configuration from one or more other conditional configurations that are configurable for the link.

In some embodiments, the method further comprises determining to transmit the control message, based on network conditions and/or traffic conditions for the wireless device, or responsive to one or more of: a change in availability of resources needed for the conditional configuration; the wireless device applying a different conditional configuration; a change in resource requirements that are required for communicating traffic to or from the wireless device; or a change in channel conditions at the wireless device.

In some embodiments, the configuration-specific information includes a conditional configuration identifier that is unique at least among any conditional configurations configured for the link.

In some embodiments, the radio network node is a target radio network node for the conditional handover configuration and/or provides a target cell candidate for the conditional handover configuration.

Embodiments herein also include a method performed by a radio network node. The method comprises receiving, from another radio network node, a control message indicating a conditional configuration that the radio network node is to add, modify, or release. In one embodiment, the control message includes configuration-specific information that distinguishes the conditional configuration from one or more other conditional configurations that are configurable for the link. In some embodiments, the method also comprises adding, modifying, or releasing the conditional configuration indicated by the control message.

Embodiments herein further include corresponding apparatus, computer programs, and carriers of those computer programs. For example, embodiments herein include a wireless device, e.g., comprising communication circuitry and processing circuitry. The wireless device is configured to receive a control message indicating a conditional configuration that the wireless device is to add, modify, or release for a link. The control message includes configuration-specific information that distinguishes the conditional configuration from one or more other conditional configurations that are configurable for the link.

Embodiments herein also include a radio network node, e.g., comprising communication circuitry and processing circuitry. The radio network node is configured to transmit, to a wireless device, a control message indicating a conditional configuration that the wireless device is to add, modify, or release for a link. The control message includes configuration-specific information that distinguishes the conditional configuration from one or more other conditional configurations that are configurable for the link.

Other embodiments herein include a radio network node, e.g., comprising communication circuitry and processing circuitry. The radio network node is configured to transmit, to another radio network node, a control message indicating a conditional configuration that the other radio network node is to add, modify, or release. In one embodiment, the control message includes configuration-specific information that distinguishes the conditional configuration from one or more other conditional configurations that are configurable for the link.

Yet other embodiments herein include a radio network node, e.g., comprising communication circuitry and processing circuitry. The radio network node is configured to receive, from another radio network node, a control message indicating a conditional configuration that the radio network node is to add, modify, or release. In one embodiment, the control message includes configuration-specific information that distinguishes the conditional configuration from one or more other conditional configurations that are configurable for the link. In some embodiments, the radio network node is further configured to add, modify, or release the conditional configuration indicated by the control message.

BRIEF DESCRIPTION OF THE DRAWINGS

FIG. 3 is a logic flow diagram of a method performed by a radio network node according to some embodiments.

DETAILED DESCRIPTION

Figure 1:
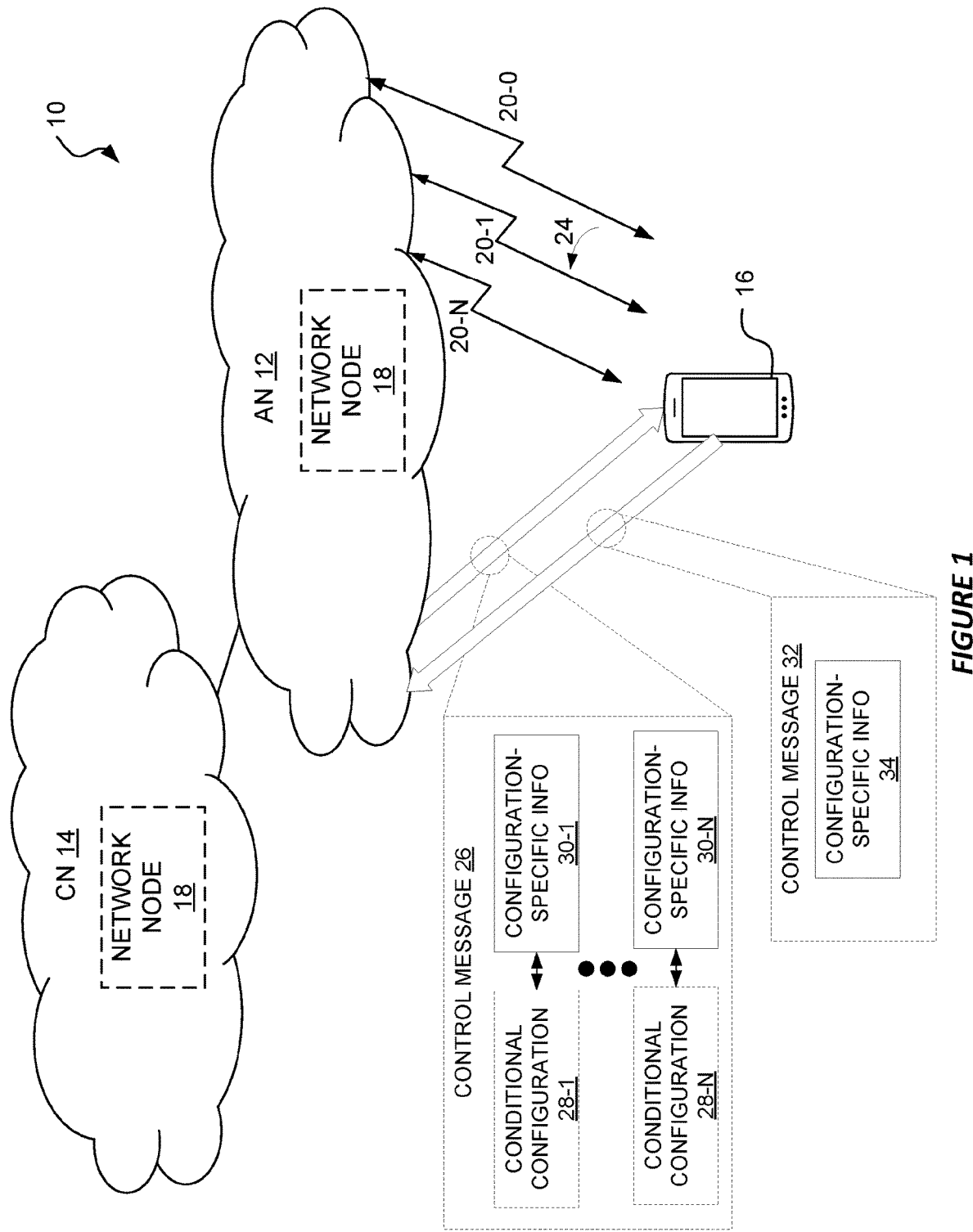
FIG. 1 is a block diagram of a wireless communication network according to some embodiments.

FIG. 1 illustrates a wireless communication network 10 according to one or more embodiments. As shown, the network 10, e.g., a 5G network or New Radio, NR, network, may include an access network (AN) 12 and a core network (CN) 14. The AN 12 wirelessly connects a wireless communication device 16 (or simply "wireless device 16") to the CN 14. The CN 14 in turn connects the wireless device 16 to one or more external networks (not shown), such as a public switched telephone network and/or a packet data network, e.g., the Internet.

The AN 12 provides links via which the wireless device 16 may wirelessly access the system 10, e.g., using uplink and/or downlink communications. The AN 12 may for example provide links 20-0, 20-1, . . . 20-N (generally links 20) in the form of access nodes (e.g., base stations), cells, sectors, beams, carriers, or the like. Some links 20 may provide wireless coverage over different geographical areas.

The network 10, e.g., via one or more network nodes 18 in the AN 12 and/or CN 14, may control configuration of the wireless device 16 in a number of respects. That is, the network 10 may control application by the wireless device 16 of different possible types of configurations. For example, the network 10 may control the device's configuration in terms of which link 20 the device 16 uses to access the network 10, e.g., in or for a so-called connected mode, which may for instance be a mode in which the device 16 has established a radio resource control, RRC, connection with the network 10, in contrast with an RRC idle mode in which no RRC connection is established. The network 10 in this regard may transmit to the wireless device 16 a type of configuration (e.g., a mobility configuration such as a handover configuration) that, when applied by the wireless device 16, configures the device 16 to use certain link(s) 20 to access the network 10. In some embodiments, a mobility configuration may for example configure the device 16 to perform a mobility procedure that causes the device 16 to switch 24 from accessing the network 10 via one link to accessing the system via another link, e.g., in connected mode. In some embodiments, this link switch 24 may be a handover. In another respect, the network 10 may control the device's configuration in terms of how many links the device 16 uses to access the network 10, e.g., in the context of dual connectivity, carrier aggregation, or the like. For example, the network 10 may signal a different type of configuration to the device 16 for adding a secondary cell group (SCG) or a secondary cell. In still other embodiments, the network 10 may signal another type of configuration to the device 16 for resuming a connection, e.g., an RRC connection resume, for a reconfiguration with sync, for a reconfiguration, for a reestablishment, or the like. In yet other respects, the network 10 may signal a different type of configuration that configures the wireless device 16 to perform a measurement, or still another type of configuration that configures the wireless device 16 to record/log certain information.

According to embodiments herein, the network 10 may transmit a configuration to the wireless device 16 but indicate that the wireless device 16 is to only conditionally apply that configuration. In particular, the wireless device 16 is to apply the configuration if/when the wireless device 16 detects fulfillment of one or more trigger conditions e.g., the source radio link quality deteriorates even further below a different threshold. Once the device detects the condition, the device 16 may autonomously apply the configuration without receiving any other signaling. Such a configuration is referred to as a conditional configuration because it its application is conditional on fulfillment of trigger condition(s).

In this context, the network node 18 in the embodiments shown in FIG. 1 may transmit to the wireless device 16 a control message 26, e.g., in the form of an RRC message such as an RRC reconfiguration message or an RRC conditional reconfiguration message. The control message 26 may indicate a conditional configuration 28-1 (e.g., a conditional handover configuration) that the wireless device 16 is to add, modify, or release for a link 20. If the wireless device 16 is to add the conditional configuration 28-1, the control message 26 may include the conditional configuration 28-1. If the wireless device 16 is to modify the conditional configuration 28-1, the control message 26 may indicate how the conditional configuration 28-1 is to be modified, e.g., by including the conditional configuration 28-1 in its absolute modified form or by including a delta configuration that includes only the relative modifications of the conditional configuration 28-1. Or, if the wireless device 16 is to release the conditional configuration 28-1, the control message 26 may simply identify the conditional configuration 28-1 that is to be released.

In this regard, the control message 26 according to some embodiments includes configuration-specific information 30-1 that is specific to the conditional configuration 28-1. The configuration-specific information 30-1 distinguishes the conditional configuration 28-1 from one or more other conditional configurations that are configurable for the same link 20. In some embodiments, for example, the configuration-specific information 30-1 includes a conditional configuration identifier, e.g., that is unique at least among any conditional configurations configured for the same link 20. Where the link 20 is a cell, then, the conditional configuration 28-1 may be uniquely identified by a combination of the cell's identity and the conditional configuration identity.

In other embodiments, the configuration-specific information 28-1 includes a radio network temporary identifier (RNTI) that is unique at least among any conditional configurations configured for the link 20. Alternatively or additionally, the configuration-specific information 28-1 includes a random access channel configuration that is unique at least among any conditional configurations configured for the link 20. Alternatively or additionally, the configuration-specific information includes a preamble and/or a radio resource allocation for random access that is unique at least among any conditional configurations configured for the link 20.

No matter the particular nature of the configuration-specific information, some embodiments exploit such information so that the control message 26 may indicate multiple conditional configurations that the wireless device is to add, modify, or release for the link 20. As shown in FIG. 1, for instance, the control message 26 indicates multiple conditional configurations 28-1, . . . 28-N that the wireless device 16 is to add, modify, or release for the same link 20. In this case, the control message 26 also includes configuration-specific information 30-1 . . . 30-N for each of the multiple conditional configurations 28-1, . . . 28-N that distinguishes the multiple conditional configurations 28-1, . . . 28-N from one another. For example, different ones of the conditional configurations 28-1, . . . 28-N may have unique conditional configuration identifiers.

Note that in some embodiments, the configuration-specific information for a conditional configuration may be included in the conditional configuration itself, or may be indicated separate and apart from that configuration.

Regardless, the wireless device 16 may correspondingly add, modify, or release one or more conditional configurations 28-1 . . . 28-N for the link 20 in accordance with the control message 26. Then, for each conditional configuration that is configured for the link 20, the wireless device 16 may monitor for whether one or more trigger conditions associated with the conditional configuration are fulfilled. The wireless device 16 may apply a conditional configuration whose one or more trigger conditions are fulfilled.

In some embodiments, the wireless device 16 transmits a control message 32 indicating a conditional configuration that the wireless device 16 has applied for the link 20. Notably, the control message 32 may include or otherwise be transmitted using configuration-specific information 34 that distinguishes the applied conditional configuration from one or more other conditional configurations that are configurable for the link 20. The configuration-specific information 34 may for instance be the same configuration-specific information that was indicated for the applied conditional configuration in the control message 26 received from the network node 18. In one embodiment, for instance, the control message 32 may be an RRC Configuration Complete message and the configuration-specific information 34 may be a conditional configuration identity. In other embodiments, the control message 32 is a message (e.g., msg1) of a random access procedure and the configuration-specific information 34 is a random access preamble. In still other embodiments, the control message 32 is a message (e.g., msg1) of a random access procedure and the control message 32 is transmitted using (e.g., on) radio resources associated with the applied conditional configuration. The control message's transmission on such radio resources in this case implicitly indicates the applied conditional configuration.

Regardless, based on the configuration-specific information 34 in or indicated by the control message 32, the network node 18 may trigger the release of any other conditional configurations that were prepared for the same link 20 but were not applied. This advantageously avoids wasting resources that were reserved for application of the other conditional configurations.

Accordingly, some embodiments exploit configuration-specific information for distinguishing different conditional configurations that are configurable for the same link (e.g., a cell or radio network node). Some embodiments exploit this information to avoid resource wastage.

Figure 2:
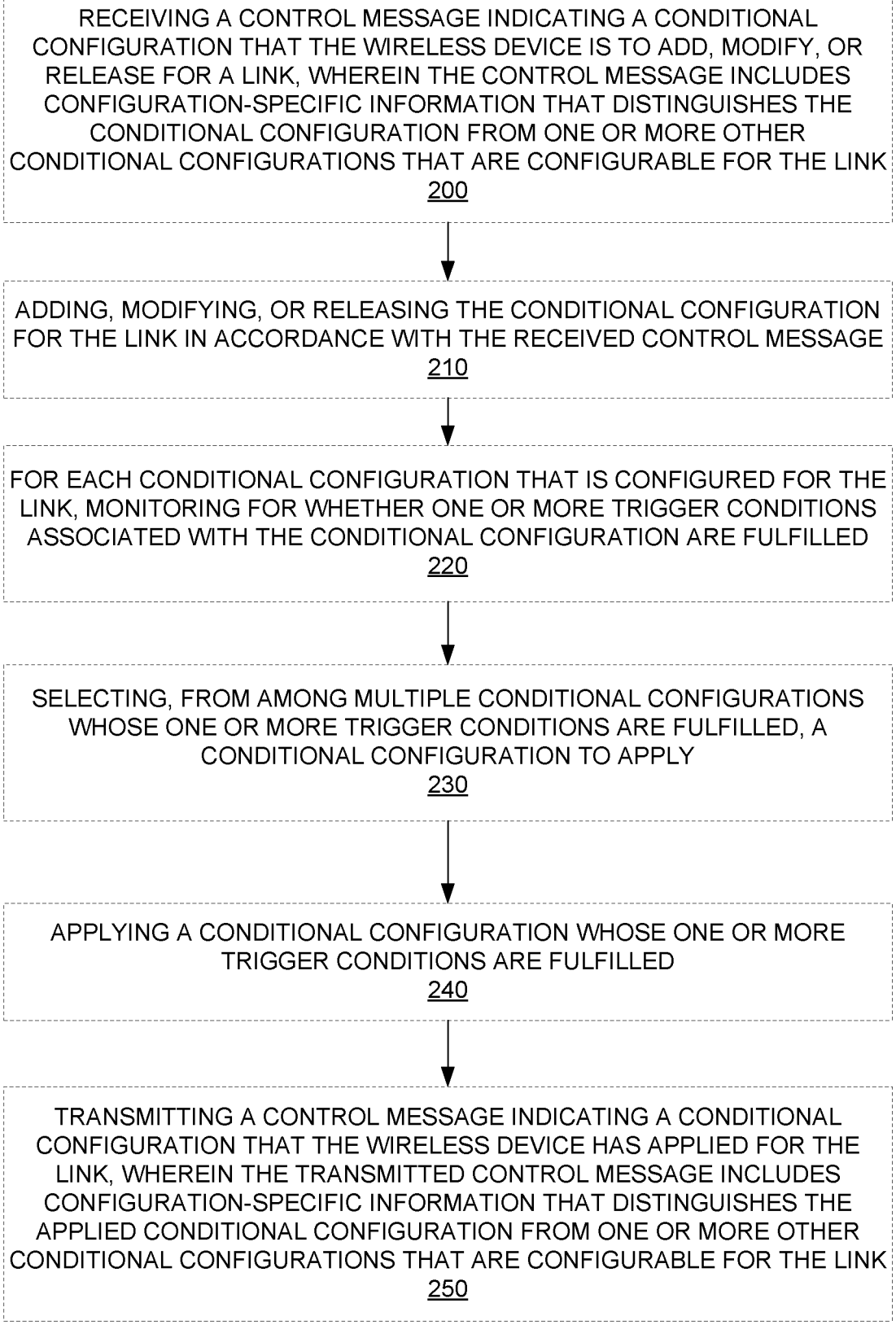
FIG. 2 is a logic flow diagram of a method performed by a wireless device according to some embodiments.

In view of the above modifications and variations, FIG. 2 depicts a method performed by a wireless device 16 according to some embodiments. The method in one or more embodiments includes receiving a control message 26 indicating a conditional configuration 28-1 that the wireless device 16 is to add, modify, or release for a link 20 (Block 200). In some embodiments, the control message 26 includes configuration-specific information 30-1 that distinguishes the conditional configuration 28-1 from one or more other conditional configurations 28-2 . . . 28-N that are configurable for the link 20.

In some embodiments, the method includes adding, modifying, or releasing the conditional configuration 28-1 for the link 20 in accordance with the received control message 26 (Block 210).

In some embodiments, the method includes, for each conditional configuration that is configured for the link 20, monitoring for whether one or more trigger conditions associated with the conditional configuration 28-1 are fulfilled (Block 220).

In some embodiments, the method also includes selecting, from among multiple conditional configurations 28-1 . . . 28-N whose one or more trigger conditions are fulfilled, a conditional configuration to apply (Block 230).

In some embodiments, the method includes applying a conditional configuration whose one or more trigger conditions are fulfilled (Block 240).

In some embodiments, the method alternatively or additionally includes transmitting a control message 32 indicating a conditional configuration that the wireless device has applied for the link 20 (Block 250). In one or more embodiments, the transmitted control message includes configuration-specific information 34 that distinguishes the applied conditional configuration from one or more other conditional configurations that are configurable for the link 20.

Further aspects of these and other embodiments for a method performed by the wireless device 16 are exemplified in Group A Embodiments enumerated later herein.

FIG. 3 depicts a method performed by a radio network node (e.g., network node 18) in accordance with other particular embodiments. The method in some embodiments includes transmitting, to a wireless device 16, a control message 26 indicating a conditional configuration 28-1 that the wireless device 16 is to add, modify, or release for a link 20 (Block 310). In some embodiments, the control message 26 includes configuration-specific information 30-1 that distinguishes the conditional configuration 28-1 from one or more other conditional configurations 28-2 . . . 28-N that are configurable for the link 20.

In some embodiments, the method includes triggering the addition, modification, or release of the conditional configuration 28-1 for the link 20, based on network conditions and/or traffic conditions for the wireless device 16 (Block 300).

In some embodiments, the method alternatively or additionally includes receiving a control message 32 indicating a conditional configuration that the wireless device 16 has applied for the link 20 (Block 320). In some embodiments, the received control message 32 includes configuration-specific information 34 that distinguishes the applied conditional configuration from one or more other conditional configurations that are configurable for the link 20.

Further aspects of these and other embodiments for a method performed by a radio network node (e.g., network node 18) are exemplified in Group B Embodiments enumerated later herein.

Figures 4A, 4B:
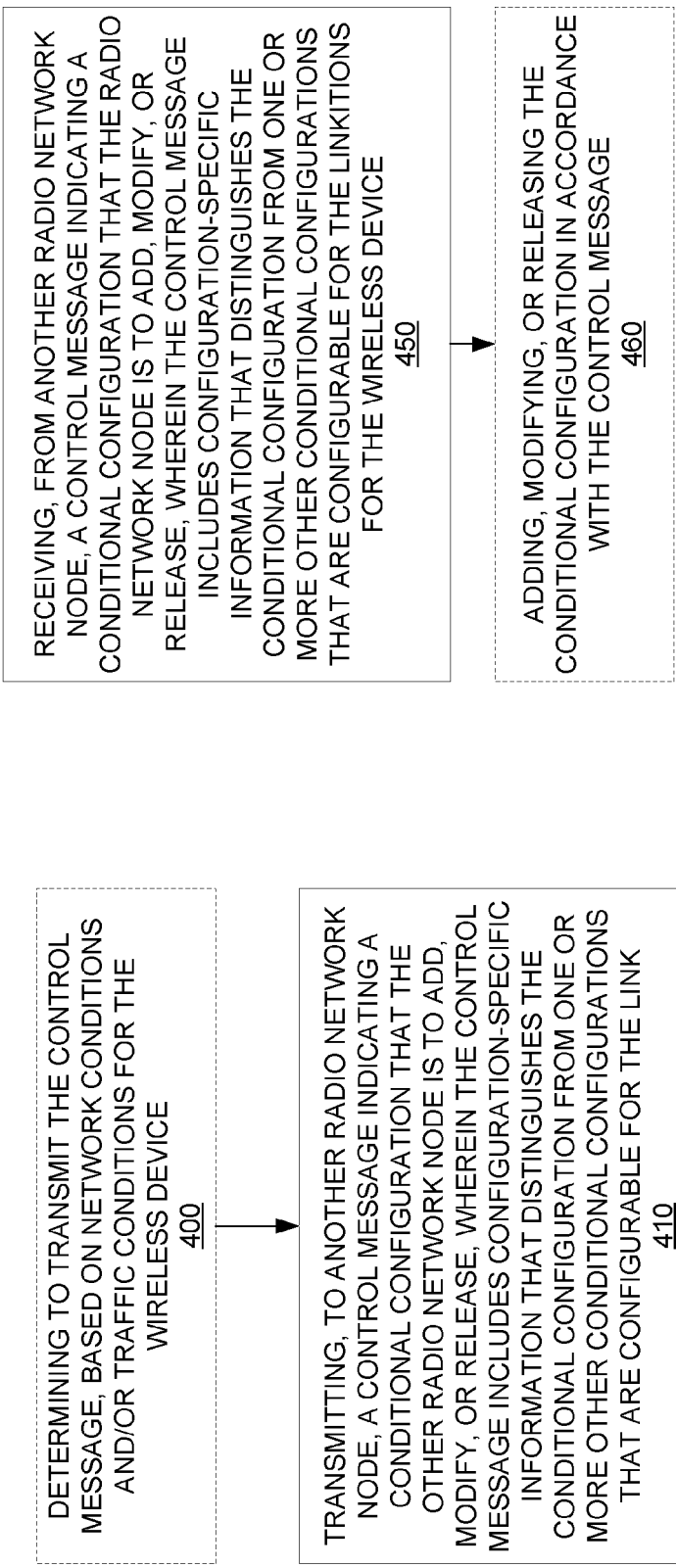
FIG. 4A is a logic flow diagram of a method performed by a radio network node according to other embodiments.
FIG. 4B is a logic flow diagram of a method performed by a radio network node according to still other embodiments.

FIG. 4A depicts a method performed by a radio network node (e.g., network node 18) in accordance with other particular embodiments. The method includes transmitting, to another radio network node, a control message indicating a conditional configuration that the other radio network node is to add, modify, or release (Block 410). In some embodiments, the control message includes configuration-specific information that distinguishes the conditional configuration from one or more other conditional configurations that are configurable for the link.

In some embodiments, the method also includes determining to transmit the control message, based on network conditions and/or traffic conditions for the wireless device (Block 400).

Further aspects of these and other embodiments for a method performed by a radio network node (e.g., network node 18) are exemplified in Group B Embodiments enumerated later herein.

FIG. 4B depicts a method performed by a radio network node (e.g., network node 18) in accordance with other particular embodiments. The method includes receiving, from another radio network node, a control message indicating a conditional configuration that the other radio network node is to add, modify, or release (Block 450). In some embodiments, the control message includes configuration-specific information that distinguishes the conditional configuration from one or more other conditional configurations that are configurable for the link.

In some embodiments, the method also includes adding, modifying, or releasing the conditional configuration in accordance with the control message (Block 460).

Embodiments herein also include corresponding apparatuses. Embodiments herein for instance include a wireless device 16 configured to perform any of the steps of any of the embodiments described above for the wireless device 16.

Embodiments also include a wireless device 16 comprising processing circuitry and power supply circuitry. The processing circuitry is configured to perform any of the steps of any of the embodiments described above for the wireless device 16. The power supply circuitry is configured to supply power to the wireless device 16.

Embodiments further include a wireless device 16 comprising processing circuitry. The processing circuitry is configured to perform any of the steps of any of the embodiments described above for the wireless device 16. In some embodiments, the wireless device 16 further comprises communication circuitry.

Embodiments further include a wireless device 16 comprising processing circuitry and memory. The memory contains instructions executable by the processing circuitry whereby the wireless device 16 is configured to perform any of the steps of any of the embodiments described above for the wireless device 16.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 16. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node (e.g., network node 18) configured to perform any of the steps of any of the embodiments described above for the radio network node.

Embodiments also include a radio network node (e.g., network node 18) comprising processing circuitry and power supply circuitry. The processing circuitry is configured to perform any of the steps of any of the embodiments described above for the radio network node. The power supply circuitry is configured to supply power to the radio network node.

Embodiments further include a radio network node (e.g., network node 18) comprising processing circuitry. The processing circuitry is configured to perform any of the steps of any of the embodiments described above for the radio network node. In some embodiments, the radio network node further comprises communication circuitry.

Embodiments further include a radio network node (e.g., network node 18) comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
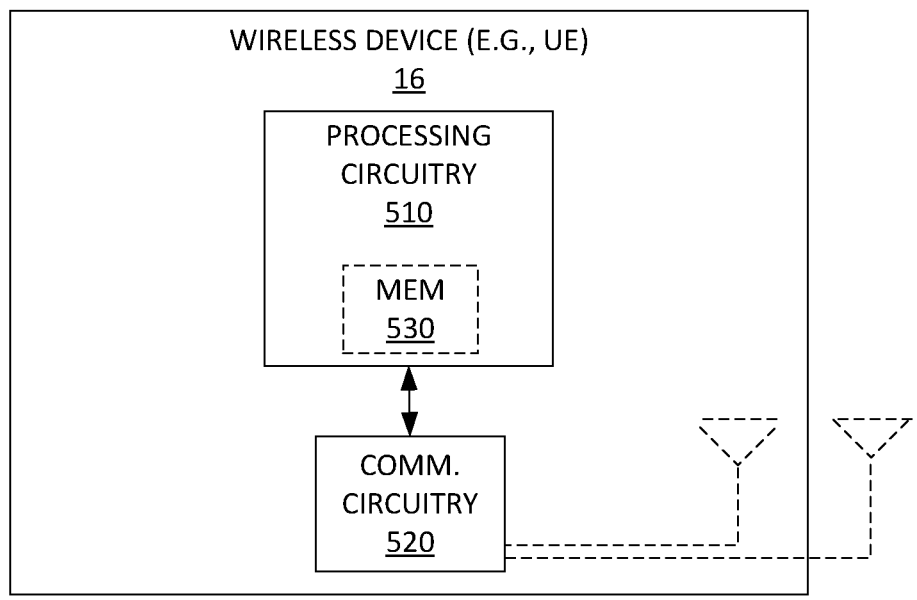
FIG. 5 is a block diagram of a wireless device according to some embodiments.

FIG. 5 for example illustrates a wireless device 16 as implemented in accordance with one or more embodiments. As shown, the wireless device 16 includes processing circuitry 510 and communication circuitry 520. The communication circuitry 520 (e.g., radio circuitry) is configured to transmit and/or receive information to and/or from one or more other nodes, e.g., via any communication technology. Such communication may occur via one or more antennas that are either internal or external to the wireless device 16. The processing circuitry 510 is configured to perform processing described above, e.g., in FIG. 2, such as by executing instructions stored in memory 530. The processing circuitry 510 in this regard may implement certain functional means, units, or modules.

Figure 6:
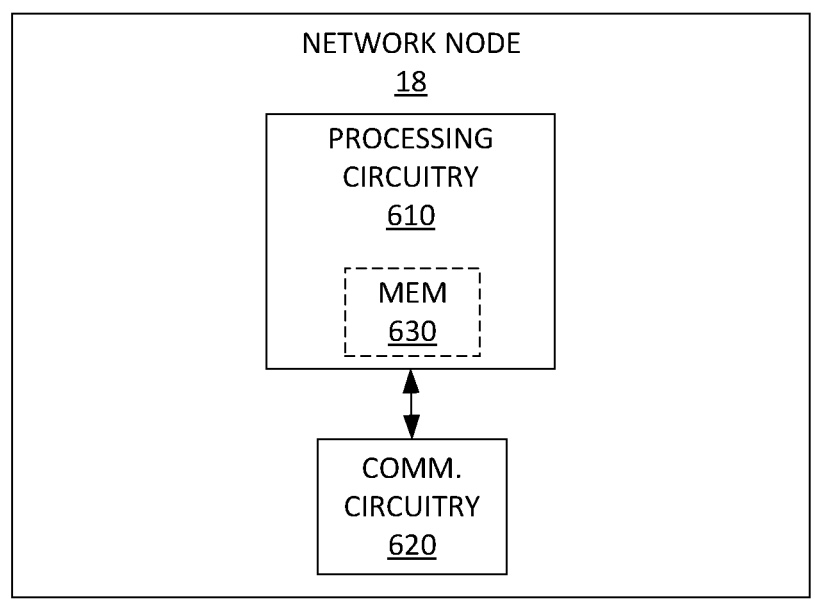
FIG. 6 is a block diagram of a network node (e.g., a radio network node) according to some embodiments.

FIG. 6 illustrates a network node 18 (e.g., radio network node) as implemented in accordance with one or more embodiments. As shown, the network node 18 includes processing circuitry 610 and communication circuitry 620. The communication circuitry 620 is configured to transmit and/or receive information to and/or from one or more other nodes, e.g., via any communication technology. The processing circuitry 610 is configured to perform processing described above, e.g., in FIG. 3 and/or FIG. 4, such as by executing instructions stored in memory 630. The processing circuitry 610 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Mobility will be enhanced in LTE and NR in 3GPP in release 16. The main objectives are to improve the robustness at handover and to decrease the interruption time at handover.

One problem related to robustness at handover is that the HO Command (RRCConnectionReconfiguration with mobilityControlInfo and RRCReconfiguration with a reconfigurationWithSync field) is normally sent when the radio conditions for the UE are already quite bad. That may lead to that the HO Command may not reach the UE in time if the message is segmented or there are retransmissions.

One solution to increase mobility robustness in NR is called "conditional handover" or "early handover command". To avoid the undesired dependence on the serving radio link upon the time (and radio conditions) where the UE should execute the handover radio resource control (RRC) signaling for the handover may be provided to the UE earlier. To achieve this, the HO command may be associated with a condition e.g. based on radio conditions possibly similar to the ones associated to an A3 event, where a given neighbour cell becomes X dB better than a primary cell (Pcell). As soon as the condition is fulfilled, the UE executes the handover in accordance with the provided handover command.

Such a condition could e.g. be that the quality of the target cell or beam becomes X dB stronger than the serving cell (similar to an A3-like event may be configured to trigger measurement reports). The threshold Y used in a preceding measurement reporting event may then be chosen lower than the one in the handover execution condition. This allows the serving cell to prepare the handover upon reception of an early measurement report and to provide the RRCConnectionReconfiguration with mobilityControlInfo (LTE) or RRCReconfiguration with a reconfigurationWithSync (NR) at a time when the radio link between the source cell and the UE is still stable. The execution of the handover is done at a later point in time (and threshold) which is considered optimal for the handover execution.

In some embodiments, a cell-level quality or beam quality is used as a baseline for a CHO execution condition. A reference signal type Synchronization Signal Block (SSB) can be used for one or more such embodiments. Alternatively or additionally, Ax events (i.e. entry conditions) are used for CHO execution condition and events A3/5 as a baseline. The trigger quantity for CHO execution condition (reference signal received power (RSRP), reference signal received quality (RSRQ) or reference signal-signal to interference plus noise ratio (RS-SINR)) may be configured by the network.

In any event, while the UE evaluates the condition, it should continue operating per its current RRC configuration, i.e. without applying the conditional HO command. When the UE determines that the condition is fulfilled, it disconnects from the serving cell, applies the conditional HO command and connects to the target cell.

A conditional handover (CHO) in some sense may therefore be defined as a UE having a network configuration for initiating access to a target cell based on configured condition(s). Usage of a conditional handover may be decided by the network, and the UE evaluates when the condition is valid. In some embodiments, the baseline operation for the conditional HO procedure assumes a HO command type of message contains HO triggering condition(s) and dedicated RRC configuration(s). The UE may then access the prepared target when the relevant condition is met. The baseline operation for conditional HO may also assume the source RAN remains responsible for RRC until the UE successfully sends an RRC Reconfiguration Complete message to the target RAN.

Figure 7:
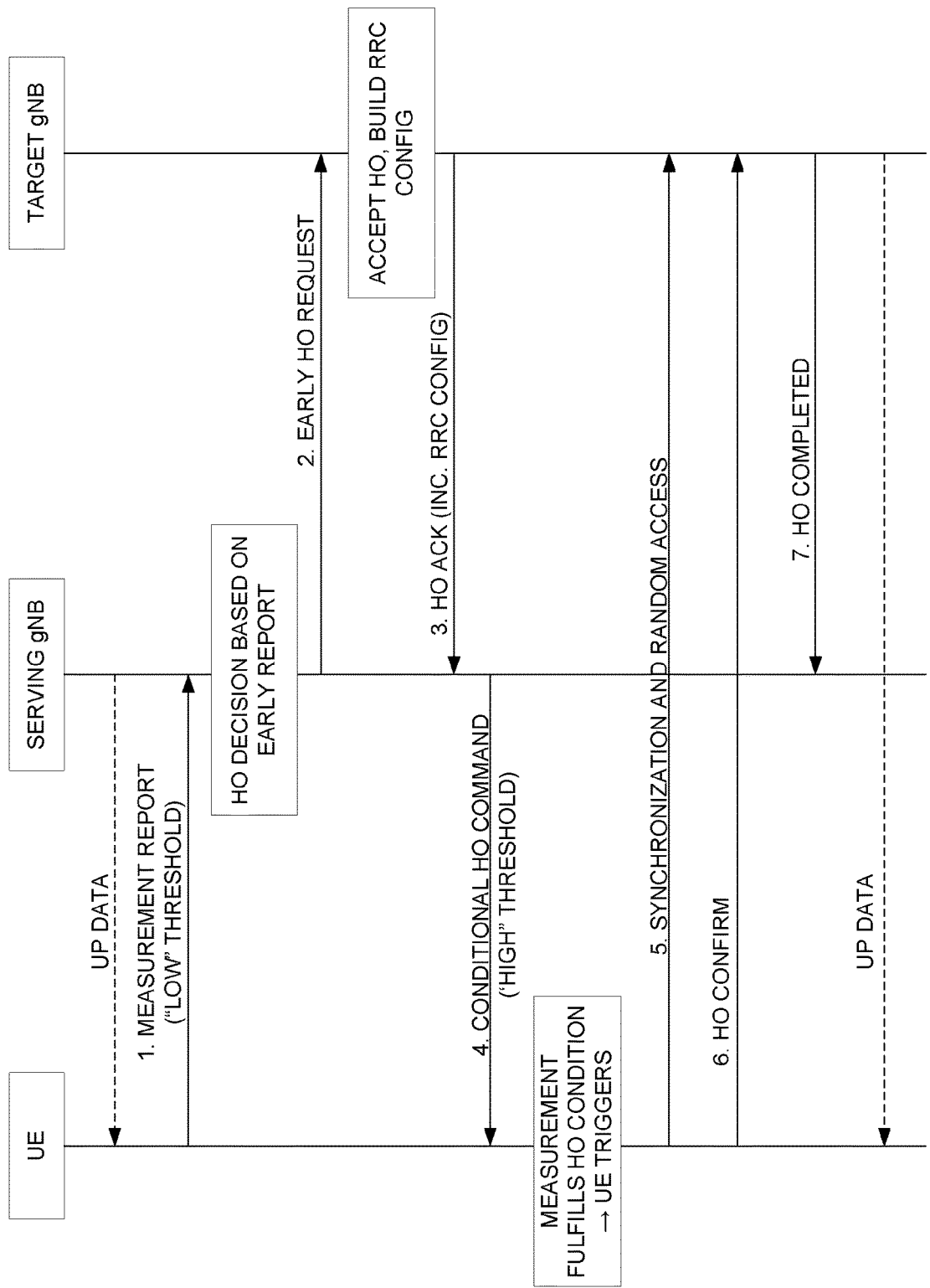
FIG. 7 is a call flow diagram of a conditional handover procedure according to some embodiments.

FIG. 7 depicts an example with a single serving and target cell. More particularly, in FIG. 7, the serving gNB may exchange user plane (UP) data with the UE. In step 1, the UE sends a measurement report with a "low" threshold to the serving gNB. The serving gNB makes a handover (HO) decision based on this early report. In step 2, the serving gNB sends an early HO request to a target gNB. The target gNB accepts the HO request and builds an RRC configuration. The target gNB returns a HO acknowledgement, including the RRC configuration, to the serving gNB in step 3. In step 4, a conditional HO command with a "high" threshold is sent to the UE. Subsequently, measurements by the UE may fulfil the HO condition of the conditional HO command. The UE thus triggers the pending conditional handover. The UE performs synchronization and random access with the target gNB in step 5, and HO confirm is exchanged in step 6. In step 7, the target gNB informs the serving gNB that HO is completed. The target gNB may then exchange user plane (UP) data with the UE.

A user equipment (UE) may be configured with multiple conditional handover configurations towards the same node or cell, e.g. where each configuration may be associated to different target cell candidates from that node, comprising different sets of secondary cells, specific beams, number of multiple input multiple output (MIMO) layers, etc. In this case, the UE would trigger only one of these conditional configurations and send a RRCReconfigurationComplete message to the target node. However, the target node would heretofore not be able to distinguish which of the conditional handover configurations was triggered. Similarly, if the UE is signaled to add, modify, or release a conditional handover configuration towards a node or cell, but there are multiple such configurations towards that node or cell, the UE heretofore would not be able to distinguish which of the conditional handover configurations is supposed to be added, modified, or released.

Some embodiments accordingly include methods for how to manage CHOs in case there are multiple CHOs for a UE for a cell or node.

Figure 8:
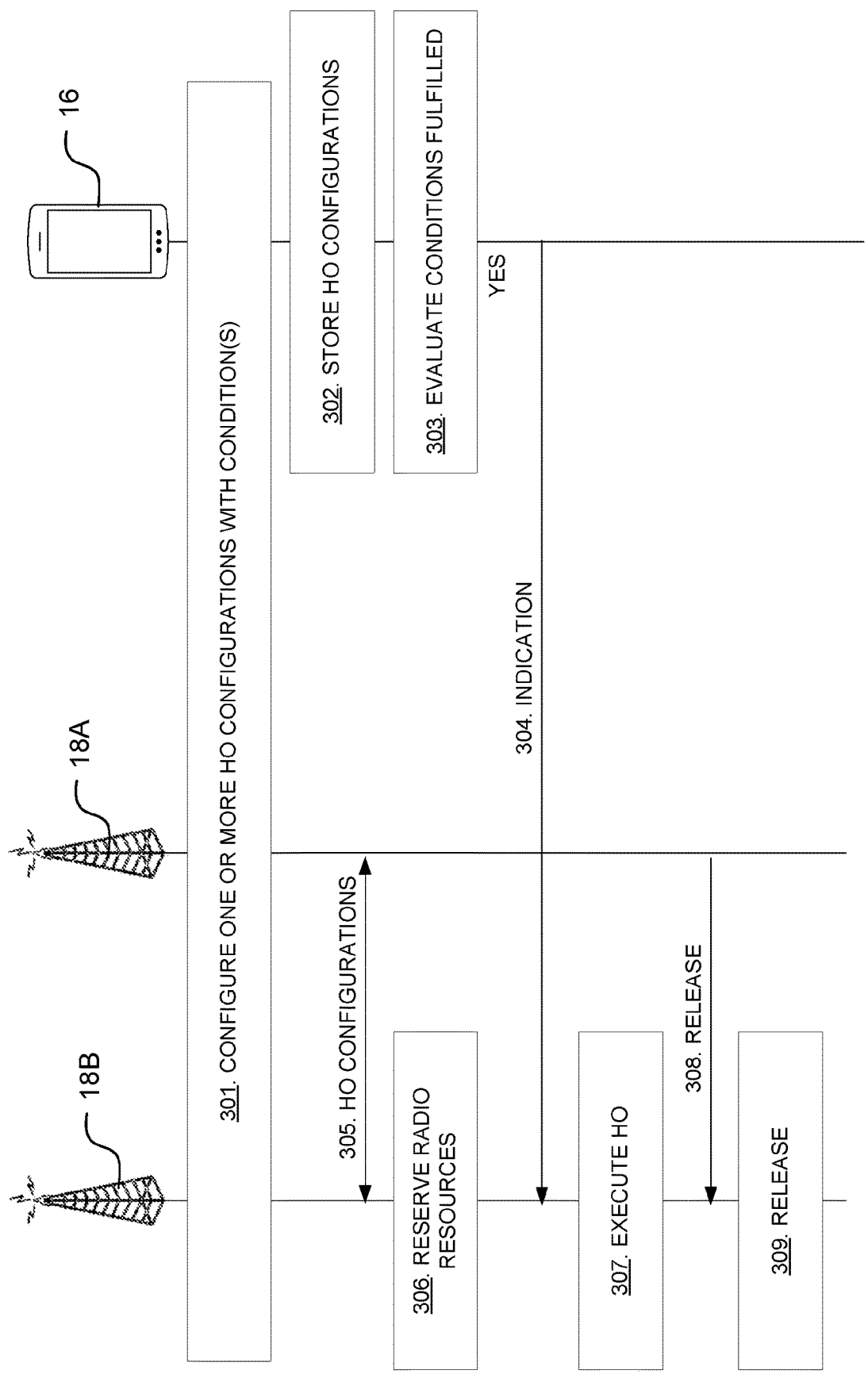
FIG. 8 is a call flow diagram of conditional configuration according to some embodiments.

More particularly, FIG. 8 is a schematic combined signaling scheme and flowchart depicting some embodiments herein.

Action 301. A source network node such as the first radio network node 18A may configure the UE 16 with one or more (conditional) handover configuration(s), e.g., in the form of one or more RRC Reconfigurations. The first radio network node 18A may request and receive handover configurations from a candidate target radio network node such as the second radio network node 18B. The handover configuration(s) from e.g. the second radio network node 18B, may comprise identifier(s) for each handover configuration. Alternatively or additionally, the handover configurations from the second radio network node 18B may comprise suggested one or more conditions for each of the handover configuration(s), e.g. relative or absolute conditions. In this case, the first radio network node 18A may take these suggestions into account. Alternatively or additionally, the first radio network node 18A may associate an identifier to each received handover configuration. The identifiers of the handover configurations may be determined implicitly (e.g. first configuration gets identity=1, second one gets identity=2, etc.). Or, the first radio network node 18A may decide unique identities and indicate to the second radio network node 18B the assigned identifier for a corresponding handover configuration. The first radio network node 18A may transmit a message to the UE comprising the one or more handover configurations and the associated identifiers.

Action 302. The UE 16 may receive and store the one or more handover configurations, such as conditional handover configuration(s), with associated one or more conditions, from the first radio network node 18A, i.e. the serving radio network node. The one or more handover configurations may for instance be or correspond to one or more RRC Reconfigurations. In some embodiments, each of these configurations is associated with the same candidate target cell, e.g. the second cell 14. In other embodiments, at least one candidate target cell has more than one handover configuration associated with it, but the UE can be configured with additional handover configurations associated to other cells with one or more handover configurations associated to each cell.

Regardless, in some embodiments, each handover configuration has an identifier, also referred to as an optional conditional configuration identifier. This identifier may be unique among all handover configurations, unique among all handover configuration(s) toward a specific cell, or unique among all handover configuration(s) toward a specific network node. If there is only a single handover configuration associated with the candidate target cell or radio network node, though, the identifier of the handover configuration may be omitted.

In one alternative solution, each handover configuration is distinguished by different random access channel (RACH) configurations, such as different sets of preambles, preamble to synchronization signal blocks (SSB) and/or channel state information-reference signals (CSI-RS) mapping, or time/frequency resource allocations, for each CHO configuration for the same cell. With that, the radio network node has means to distinguish which handover configuration the UE has executed. For example, if preamble X is associated to CHO configuration 1 for cell-A, e.g. with a secondary cell (SCell) configuration, and if preamble Y is associated to CHO configuration 2 for the same cell-A, e.g. without an SCell configuration, by preamble detection the target node candidate can distinguish which handover configuration the UE has executed. Alternatively or additionally to different RACH configurations, each handover configuration may be distinguished by different cell-radio network temporary identifiers (C-RNTIs) for each CHO configuration for the same cell. With that, the radio network node 12 has means to distinguish which configuration the UE has executed upon the reception of msg3. For example, if C-RNTI X is associated to CHO configuration 1 for cell-A, e.g. with an SCell configuration, and if C-RNTI Y is associated to CHO configuration 2 for the same cell-A, e.g. without an SCell configuration, by msg3 detection the target node candidate can distinguish which configuration the UE has executed. Generally, though, the RRCConnectionReconfiguration (or RRCReconfiguration, in NR) for each candidate may differ e.g. in terms of the HO execution condition (reference signal (RS) to measure and threshold to exceed), in terms of the random access (RA) preamble to be sent when a condition is met or the configuration itself to be used in a specific target candidate.

Action 303. The UE 16 may evaluate whether one or more conditions, such as trigger conditions for conditional handovers, are fulfilled. Thus, the UE 16 in this example determines that a condition related to mobility of the UE is fulfilled, wherein the condition is part of a first handover configuration out of one or more handover configurations.

Action 304. The UE 16, upon triggering the condition, may execute a conditional handover according to the first handover configuration. Execution of the conditional handover according to the first handover configuration may for instance mean that the UE 16 applies the first handover configuration and executes the conditional handover upon that configuration. Thus, the UE 16 transmits an indication that the condition is fulfilled and also indicates that the condition is part of the first handover configuration. The indication thereby indicates which one of the one or more handover configurations the UE 16 executed. For example, the UE may transmit a message such as an RRCReconfigurationComplete message (or similar, e.g. ConditionalReconfigurationComplete message) toward the target node/cell, e.g. the first or the second radio network node, which fulfilled the trigger condition. The message may comprise the identifier associated with the executed (conditional) handover configuration. In some embodiments, though, if the handover configuration is the only handover configuration associated with the target cell and the identifier was omitted in the previous step, the UE 16 may omit the identifier from the complete message; alternatively, the UE uses a default value, e.g. 0, for the identifier.

Each of these handover configurations may be associated with different target cell candidates associated to the same target network node. In that case, the distinction of which configuration the UE executes is done via network implementation, as described further.

Action 305. Meanwhile, the second radio network node 18B, also referred to as a candidate target node, may have received a request from the first radio network node 18A to configure CHO for the UE 16 e.g. receiving a CHO or HO REQUEST message over X2, Xn or any other inter-node interface. The second radio network node 18B may in response provide (transmit) one or multiple CHO configurations for the same target cell candidate for the UE 16. For example, the second radio network node 18B may do so by transmitting a CHO or HO REQUEST ACK message over X2, Xn or any other inter-node interface, which comprises for each CHO configuration an RRCReconfiguration-like message with reconfiguration with synchronization (or at least the content of the message) for the same target cell candidate. The response may comprise recommended conditions of the CHO configuration associated to different configurations, e.g. relative or absolute conditions. The response may comprise an identifier associated to each CHO configuration. In an alternative solution, the response may comprise, for each CHO configuration, some distinguishing parameter configurations, such as different RACH configurations and/or different C-RNTIs for each CHO configuration for the same cell, as described above.

Action 306. The second radio network node 18B may reserve radio resources for CHO for that UE 16, e.g. C-RNTI, contention-free RACH resources, etc. Herein, one advantage of the case of using different identifiers associated to different CHO configurations, instead of different distinguishing parameter configurations, is that some of these resources may be reused in different handover configurations for the same cell, which has a lower cost in terms of resources allocated for conditional HO.

Action 307. The second radio network node 18B may receive the indication from the UE 16, which the UE 16 transmitted in Action 304. The second radio network node 18B may execute a performance based on the received indication and fulfilled condition.

Upon the UE 16 triggering the handover configuration associated to the second radio network node 10, the second radio network node 18B may thus receive an RRC message (e.g. the RRCReconfigurationComplete) comprising the identifier. The second radio network node 18B may then execute the handover configuration associated with the identifier indicated by the UE 16 in the RRC Reconfiguration complete (including e.g. performing a path switch request to the core network which will instruct the first radio network node 18A to release the UE context/resources).

In an alternative solution where the UE was configured with handover configurations for the same cell but with distinguished parameter configurations, the second radio network node may use at least one of these to distinguish which configuration the UE 16 has executed: a RACH preamble, preamble to SSBs/CSI-RSs mapping, or time/frequency resource allocations, as described above. The second radio network node 18B may then execute handover configurations associated to the used parameter (e.g. preamble, time/frequency resource, C-RNTI, etc.).

Action 308. Upon receiving a HO indication that the UE has executed the handover in a candidate target network node (e.g. via X2/Xn signaling or from the CN via S1/NG signalling), the first radio network node 18A may prompt the release of UE context and/or radio resources associated with CHO configurations that were not executed. For example, in some embodiments, for each candidate target network node except the one in which the UE 16 executed the CHO, the first radio network node 18A may transmit a single message to release UE context and/or radio resources associated to all CHO configurations for that UE. In other embodiments, the first radio network node 18A may transmit one message per CHO configuration, comprising the conditional configuration identifier, to each candidate target network node to release the UE context and/or radio resources.

Action 309. The second radio network node 18B may receive the HO indication and may release the radio resources associated with other handover configurations associated to the second radio network node 18B executing the HO for the UE 16. The second radio network node 18B may receive a message from the second radio network node 18B to release all handover configurations; and/or release of all CHO configurations associated to the UE. Thus, the second radio network node 18B, or another radio network node, may receive one or more messages from the first radio network node 11 comprising the identifier, indicating to release a handover configuration, and may release the handover configurations associated to the UE 16 as indicated by the conditional configuration identifier.

Embodiments herein thereby allow multiple (conditional) handover configurations applicable to a same target candidate cell and allow the UE 16 to indicate which of the configurations it has executed. Doing so allows the second radio network node 18B to configure the UE with different HO configurations for a given target such as different carrier aggregation (CA) configurations with the same target PCell. Some embodiments also allow release of a specific CHO configuration in a candidate target cell.

Consider now other embodiments where the handover configurations are related to different target cells of e.g. the second radio network node 18B, e.g. CHO1 that has a PCell=cell1, CHO2 that has a PCell=cell2, etc. . . . where cell1, cell2, . . . are different cells of the same target node or a different node. In this case, the second radio network node 18B may receive a request from the first radio network node 18A to configure handover, also known as conditional handover, for a given UE e.g. receiving a CHO or HO REQUEST message over X2, Xn or any other inter-node interface.

The second radio network node 18B may provide in response, one or multiple handover configurations for different target cells for the UE 16. The second radio network node 18B may do so by transmitting a CHO or HO REQUEST ACK message over X2, Xn or any other inter-node interface, where the message comprises for each handover configuration an RRCReconfiguration-like message with reconfiguration with synchronization, or at least the content of the message, for these different target cells. The response may comprise recommended conditions associated to different HO configurations (e.g. relative or absolute conditions). The response may comprise an identifier associated to each HO configuration. Accordingly, for the case the second radio network node 18B is configuring CHO for different cells, the second radio network node 18B may reuse parameters that could be otherwise used to distinguish which cell the UE 16 is accessing. In other words, embodiments herein enable or allow the second radio network node 18B to allocate for these different candidate cells the same C-RNTI or the same RACH configuration(s), or even allow a CHO without security keys refresh (since these are different cells, the network could have chosen to perform CHO with key refresh for the sake of distinguishing for which cell the UE has executed the handover i.e. which CHO configuration was triggered). In one embodiment, for this case, the UE uses a cell identifier to distinguish the different configurations i.e. that is what is reported in the RRC Reconfiguration Complete like message in the target node.

The second radio network node may further reserve radio resources for CHO for the UE 16 e.g. C-RNTI, contention-free RACH resources, etc. At that step, the second radio network node may use the resource reservations as a way to distinguish the target cell for which the UE has executed the conditional handover when the UE access the target node. For example, there could be different ways to distinguish the different target cell candidates: A RACH preamble, preamble to SSBs/CSI-RSs mapping, or time/frequency resource allocations. For example, if preamble X is associated to CHO configuration 1 for cell-A and if preamble Y is associated to CHO configuration 2 for a different cell-B, by preamble detection the target node candidate can distinguish which configuration the UE has executed, and which cell the UE is connected to. That could allow the target to possibly configure the same C-RNTI for multiple target cell candidates for the same target candidate node (since distinction could be done via RACH distinction). The different target cell candidates could also be distinguished via C-RNTIs for each CHO configuration for the different cells. For example, if C-RNTI X is associated to CHO configuration 1 for cell-A and if C-RNTI Y is associated to CHO configuration 2 for a different cell-B, by msg3 detection the target node candidate can distinguish which configuration the UE has executed. That would allow the target node to distinguish the target cell for which the UE has executed CHO, and at the same time allow the target to allocate the same set of RACH resource for the same UE, on a per-node basis, rather than a per-cell basis e.g. contention free RACH resources. The different target cell candidates may alternatively or additionally be distinguished via security configuration. For example, if handover is configured with key refresh, a target cell identifier is used as input. Hence, upon receiving an encrypted and integrity protected Packet Data Convergence Protocol (PDCP) Packet Data Unit (PDU) (with the RRC Reconfiguration Complete like message), the network can test different hypothesis for different target cell ID candidates, as a way to figure out which target cell the UE is triggering CHO. Using the previous methods (C-RNTI and RACH) allows on the other hand the usage of CHO without security key refresh.

In any event, the second radio network node 12 may, upon the UE triggering a HO configuration associated to the second radio network node 18B, receive an RRC message, e.g. RRCReconfigurationComplete, comprising the identifier. The identifier may be the cell identifier that is used as a way to indicate which cell the UE is accessing, in case common parameters for the different target cell candidates have been provided e.g. RACH, C-RNTI, etc. That allows the usage of CHO without security key refresh.

The second radio network node 18B may then execute the HO configurations associated to the identifier indicated by the UE 16 in the RRC Reconfiguration complete, including performing a path switch request to the core network which will instruct the source network node to release the UE context/resources. In an alternative embodiment where the UE 16 was configured with HO configurations for different cells and with distinguished parameter configurations, the second radio network node 18B may execute HO configurations associated to the used parameter, e.g. preamble, timer/frequency resource, C-RNTI, etc.

Figure 9:
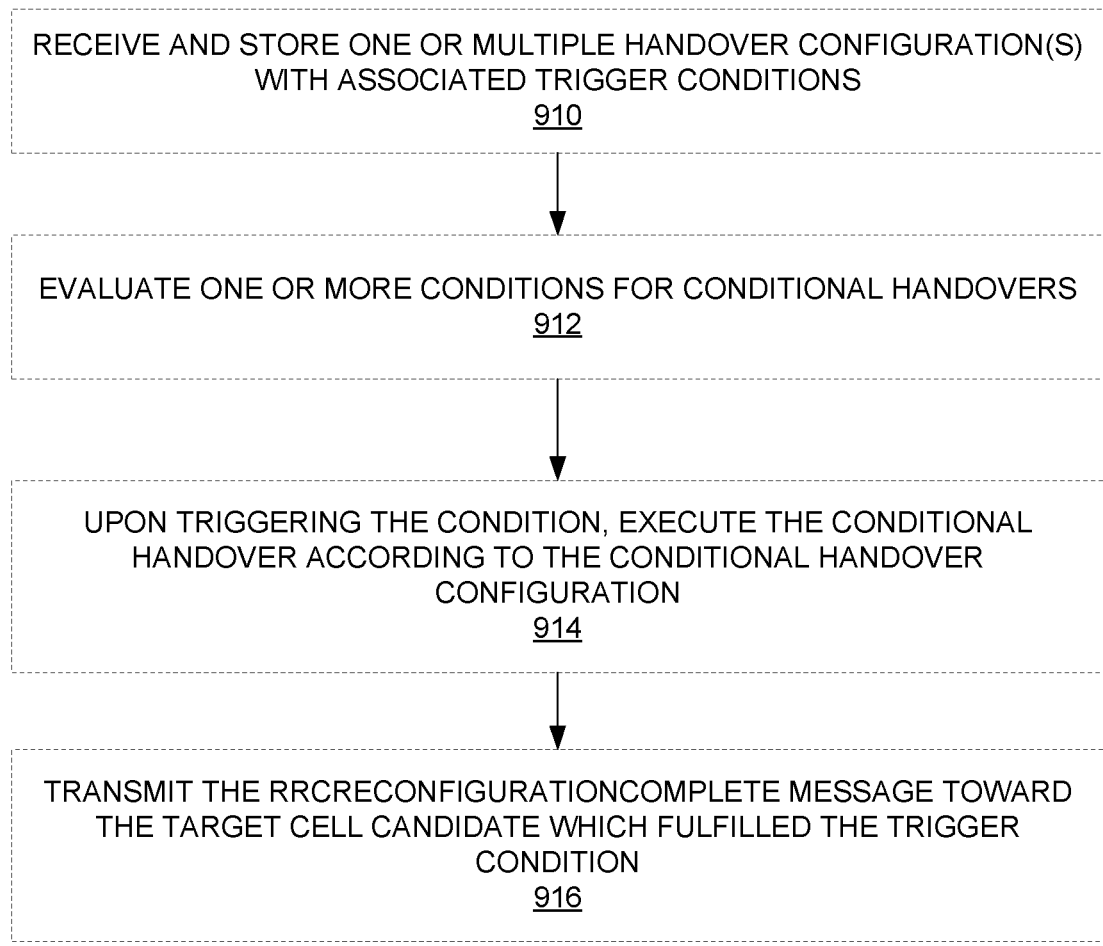
FIG. 9 is a logic flow diagram of a method performed by a wireless device according to some embodiments.

In view of the above, FIG. 9 shows a method at a UE for handling (conditional) handover configurations when triggering a conditional handover according to some embodiments. The UE 16 according to the method shown may receive and store one or multiple handover configuration(s) with associated trigger conditions, from a source network node (Step 910). Each of these configurations are associated to a given target cell candidate (i.e. target PCell, PSCell, SpCell).

In some embodiments, each handover configuration has an identifier, also referred to as conditional configuration identifier. This identifier may be unique among all conditional handover configurations, unique among all conditional handover configuration(s) toward a specific cell, or unique among all conditional handover configuration(s) toward a specific radio network node. If there is only a single HO configuration associated to a candidate target network node, the conditional configuration identifier can be omitted.

Regardless, the identifier in these and other embodiments may be implemented as shown in the example below of a possible implementation of the handover configuration:

```
-- ASN1START
-- TAG-RRCRECONFIGURATION-START
RRCReconfiguration ::=                    SEQUENCE {
    rrc-TransactionIdentifier             RRC-TransactionIdentifier,
    criticalExtensions                    CHOICE {
        rrcReconfiguration                RRCReconfiguration-IEs,
        criticalExtensionsFuture          SEQUENCE { }
    }
}
RRCReconfiguration-IEs ::=                SEQUENCE {
    radioBearerConfig                     RadioBearerConfig   OPTIONAL, -- Need M
    secondaryCellGroup                    OCTET STRING (CONTAINING
CellGroupConfig)
        OPTIONAL, -- Need M
    measConfig                            MeasConfig OPTIONAL, -- Need M
    lateNonCriticalExtension              OCTET STRING OPTIONAL,
    nonCriticalExtension                  RRCReconfiguration-v1530-IEs OPTIONAL
}
RRCReconfiguration-v1530-IEs ::=          SEQUENCE {
    masterCellGroup                       OCTET STRING (CONTAINING CellGroupConfig)
        OPTIONAL, -- Need M
    fullConfig                            ENUMERATED {true} OPTIONAL, -- Cond FullConfig
    dedicatedNAS-MessageList              SEQUENCE (SIZE(1..maxDRB)) OF
        DedicatedNAS-Message OPTIONAL, -- Cond nonHO
    masterKeyUpdate                       MasterKeyUpdate OPTIONAL, -- Cond
MasterKeyChange
    dedicatedSIB1-Delivery                OCTET STRING (CONTAINING SIB1)
        OPTIONAL, -- Need N
    dedicatedSystemInformationDelivery          OCTET STRING (CONTAINING
        SystemInformation) OPTIONAL, --
Need N
    otherConfig                           OtherConfig OPTIONAL, -- Need M
    nonCriticalExtension                  RRCReconfiguration-v1540-IEs OPTIONAL
}
RRCReconfiguration-v1540-IEs ::=          SEQUENCE {
    otherConfig-v1540                     OtherConfig-v1540   OPTIONAL, -- Need M
    nonCriticalExtension                  SEQUENCE {} RRCReconfiguration-v16xxx-IEs
        OPTIONAL
}
RRCReconfiguration-v16xxx-IEs ::=         SEQUENCE {
    conditionalRRCReconfiguration         ConditionalRRCReconfiguration
OPTIONAL, --
        Need M
    nonCriticalExtension                  SEQUENCE { }     OPTIONAL
}
MasterKeyUpdate ::=                       SEQUENCE {
    keySetChangeIndicator                 BOOLEAN,
    nextHopChainingCount                  NextHopChainingCount,
    nas-Container                         OCTET STRING OPTIONAL,   -- Cond securityNASC
    ...
}
-- TAG-RRCRECONFIGURATION-STOP
-- ASN1STOP
1
-- ASN1START
-- TAG-CONDITIONALRRCRECONFIGURATION-START
ConditionalRRCReconfiguration ::=                 SEQUENCE {
    conditionalConfigurationList                  SEQUENCE (SIZE
```

```
(1 ..maxCandidateTargetCells)) OF ConditionalConfigurationPerCell}
   }
}
ConditionalConfigurationPerCell ::=         SEQUENCE {
   candidateCellId                          PhysCellId
   conditionalConfigurationPerCellList      SEQUENCE (SIZE
      (1 ..maxConditionalConfigurationsPerCell)) OF
ConditionalConfiguration
}
ConditionalConfiguration ::=                SEQUENCE {
conditionalConfigurationId                     INTEGER (1 ..maxConfigurationPerCell)
         OPTIONAL, -- Need R
triggerCondition                            TriggerCondition
   conditionalConfiguration                 OCTET STRING (Containing
RRCReconfiguration)
}
-- TAG-CONDITIONALRRCRECONFIGURATION-STOP
-- ASN1STOP
```

The UE 16 may receive an RRCReconfiguration message containing a ConditionalRRCReconfiguration. This ConditionalRRCReconfiguration contains a list (e.g. conditionalConfigurationList) of HO configurations (e.g. ConditionalConfigurationPerCell), each associated with a candidate target cell.

Each of these configurations may contain the cell identity (e.g. the physical cell identity, PhysCellId) of the target candidate cell (i.e. PCell, PSCell, SpCell) and a list of conditional configurations associated to that cell (e.g. conditionalConfigurationPerCellList)

Each of these configurations may in turn contain: (i) an identifier to separate which message is which, e.g. conditionalConfigurationId, comprising an integer value; (ii) one or more conditions for when to fulfill each HO configuration, e.g. triggerCondition comprising a set of measurement conditions; and (iii) a HO configuration, e.g. conditionalConfiguration comprising an RRCReconfiguration message.

The identifier such as the conditionalConfigurationId may be the same as the RRC-TransactionIdentifier of the RRCReconfiguration that is contained in the conditionalConfiguration IE.

The UE 16 may evaluate one or more conditions for conditional handovers (Step 912) and upon triggering the condition, may execute the conditional handover according to the conditional handover configuration (Step 914). The UE 16 may evaluate according to normal CHO procedures, i.e. check if trigger conditions are fulfilled, and apply the one that fulfills the condition. However, in some cases, multiple configurations can fulfill the trigger condition at the same time. The UE 16 may then select a conditional configuration among multiple candidates of conditional configurations fulfilling their one or more conditions. For example, in case there are multiple HO configurations which are fulfilled at the same time, the UE 16 may select one among those candidate HO configurations to apply. The UE 16 may select which of the HO configurations to apply based on an indication from the first radio network node 18A. This indication may for example be a prioritization indication received from the network. This has the benefit that the first radio network node 18A may determine that a particular HO configuration is preferred. For example, the first radio network node 18A may have provided to the UE 16 one HO configuration which configures the UE 16 to use multiple carriers, while another configuration which only configures one carrier for the UE 16. If the first radio network node 18A wants to maximize the amount of bandwidth the UE 16 uses, the first radio network node 18A may give higher priority to the HO configuration with multiple carriers. Such a prioritization-indication may be provided to the first radio network node 18A and/or the UE 16 together with the HO configurations. There could be a prioritization among different target cells as well.

An enhancement of the example conditional handover structure discussed earlier is shown below, where the candidatePriority IE specifies the priority among the candidates, and configurationPriority specifies the priority among the HO configurations within a given candidate. A value of 1 could signify the highest priority, and higher values indicating lower priority (or it could be the other way around).

```
ConditionalConfigurationPerCell ::=         SEQUENCE {
   candidateCellId                          PhysCellId
      candidatePriority                     INTEGER (1 ..maxCandidateTargetCells)
OPTIONAL
   conditionalConfigurationPerCellList      SEQUENCE (SIZE
      (1 ..maxConditionalConfigurationsPerCell)) OF
ConditionalConfiguration
}
ConditionalConfiguration ::=                SEQUENCE {
   conditionalConfigurationId               INTEGER (1 ..maxConfigurationPerCell)
OPTIONAL,
         -- Need R
      triggerCondition                      TriggerCondition,
      conditionalConfiguration              OCTET STRING (Containing
RRCReconfiguration),
      configurationPriority                 INTEGER (1 ..maxConfigurationPerCell)
OPTIONAL
}
```

The candidate priority can be determined by the first radio network node 18A, while the configuration priority can be determined by the source and/or target.

The UE 16 may select the HO configuration which has the lowest (or highest) identifier. This has the benefit of allowing the first radio network node 18A to decide which HO configuration the UE would select in case the conditions for the multiple candidates are fulfilled, while avoiding the overhead of an additional indication. In other embodiments, the UE 16 may select a HO configuration randomly among the candidates of HO configurations.

Alternatively or additionally, the UE may select the HO configuration based on the expected performance the UE 16 would achieve if applying the HO configuration. When evaluating performance, the UE 16 may consider different metrics such as throughput, power consumption, etc. For example, the UE 16 may select the HO configuration which the UE expects would provide highest throughput, which may for example be determined based on the number of carriers the configuration comprises, or the number of MIMO-layers the configuration comprises, etc. Or if coverage is a metric which should be optimized for the UE 16, the UE 16 may select the HO configuration which would be expected to give best power consumption performance, e.g. by having a carrier on lower frequency, etc.

During this calculation of expected performance, the UE 16 may consider other aspects as well such as the current UE battery or expected traffic. For example, if the UE 16 has an active video streaming session that requires very high throughput it may be optimal to select a HO configuration that includes carrier aggregation while if it is has only low throughput bearers, it my select a configuration that doesn't include carrier aggregation.

Alternatively or additionally, the UE may select the HO configuration based on how stringent the conditions for the HO configurations are. For example, if the UE 16 has two HO configurations and one HO configuration has an RSRP threshold of −100 dBm while the other HO configuration has −90 dBm, the UE 16 may select the latter one since that has a more stringent condition. Note that it is here assumed that both are fulfilled as otherwise not both would be considered candidates. This embodiment may also be extended to more than two separate thresholds for the same metric, associated to different configurations. The UE 16 may use other measurement metrics than reference signal received power (RSRP), e.g. reference signal received quality (RSRQ), signal to interference plus noise (SINR), etc.

In any event, the UE 16 according to the method in FIG. 9 may thereafter transmit the RRCReconfigurationComplete message toward the target cell candidate which fulfilled the trigger condition (Step 916).

The complete message, e.g. RRCReconfigurationComplete or a similar message, may contain the identifier associated to the handover configuration that fulfilled the trigger condition. Or, in case there were multiple configurations that fulfilled the condition, the complete message may contain the identifier associated to the handover configuration that was selected by the UE based on the criteria described above.

The UE 16 may respond to the triggered conditional handover towards the target candidate cell with a modified RRCReconfigurationComplete comprising the identifier. For example, the modified RRCReconfigurationComplete may be realized in some embodiments as:

RRCReconfigurationComplete Message

```
-- ASN1START
-- TAG-RRCRECONFIGURATIONCOMPLETE-START
RRCReconfigurationComplete ::=              SEQUENCE {
    rrc-TransactionIdentifier               RRC-TransactionIdentifier,
    criticalExtensions                      CHOICE {
        rrcReconfigurationComplete              RRCReconfigurationComplete-IEs,
        criticalExtensionsFuture                SEQUENCE { }
    }
}
RRCReconfigurationComplete-IEs ::=  SEQUENCE {
    lateNonCriticalExtension                    OCTET STRING OPTIONAL,
    nonCriticalExtension                    RRCReconfigurationComplete-v1530-IEs
OPTIONAL
}
RRCReconfigurationComplete-v1530-IEs ::=            SEQUENCE {
    uplinkTxDirectCurrentList               UplinkTxDirectCurrentList OPTIONAL,
    nonCriticalExtension                    SEQUENCE { RRCReconfigurationCom-
                                            plete-
v16xx-IEs OPTIONAL
}
RRCReconfigurationComplete-v16xx-IEs ::=  SEQUENCE {
    conditionalConfigurationId              INTEGER (1 ..maxConfigurationPerCell)
OPTIONAL,
    nonCriticalExtension                    SEQUENCE{ } OPTIONAL
}
-- TAG-RRCRECONFIGURATIONCOMPLETE-STOP
-- ASN1STOP
```

If the UE 16 has not received an identifier for a certain conditional configuration, the UE 16 omits, or sets to a default value, e.g. 0, a configuration identity field in the complete message.

Figure 10:
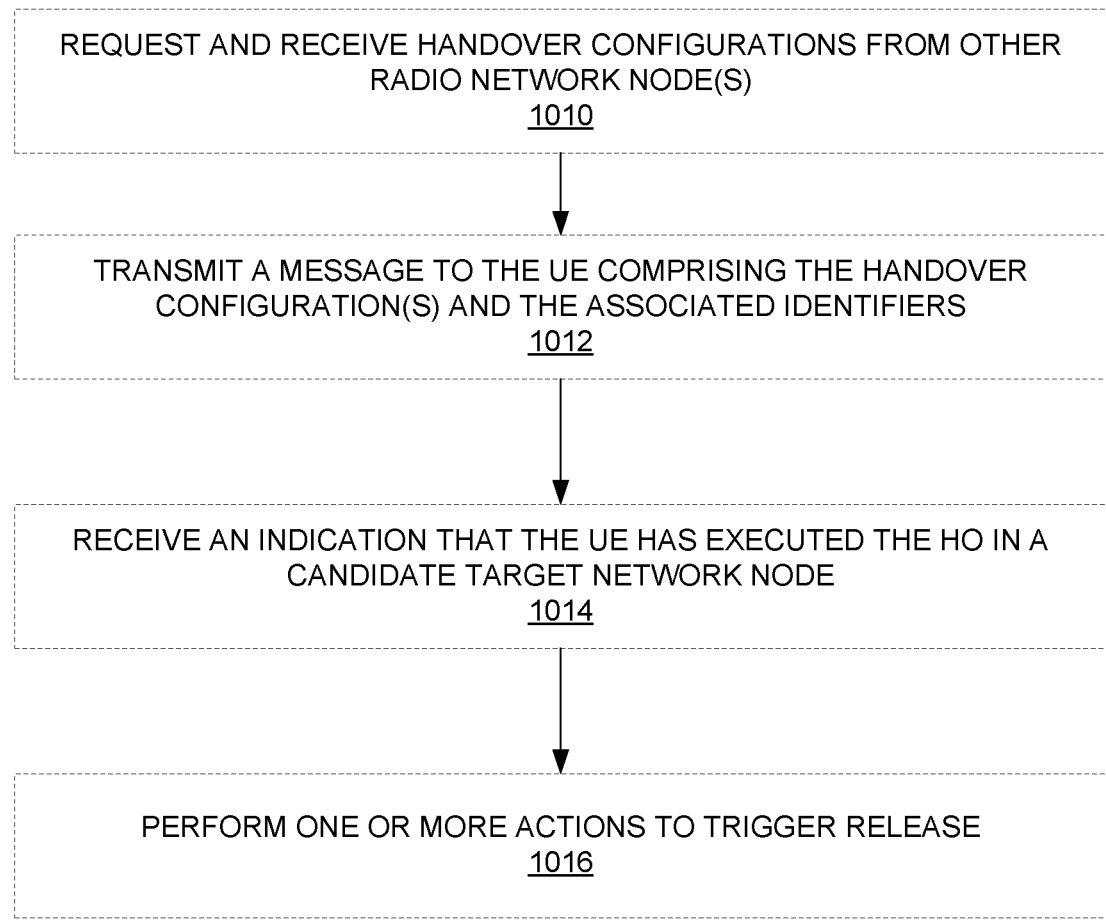
FIG. 10 is a logic flow diagram of a method performed by a radio network node according to some embodiments.

FIG. 10 shows a corresponding method performed by the first radio network node 18A according to some embodiments. As shown, the first radio network node 18A according to the method may request and receive handover configurations from other radio network node(s) (Step 1010). The handover configuration(s) from the other radio network nodes may comprise identifier(s) for each conditional handover configuration. In some embodiments, the HO configurations from the other radio network nodes may comprise suggested conditions for each of the configuration(s), e.g. relative or absolute conditions, and the first radio network node 18A may take these HO conditions into account. The first radio network node 18A may adjust the suggested conditions based on e.g. conditions from other candidate cells, or from previous measurement reports.

The first radio network node 18A may associate the identifier to each received handover configuration. The identifiers may be determined implicitly, e.g. first configuration gets identity=1, second one gets identity=2, etc. Or, the first radio network node 18A may decide unique identities and indicate to the target network node such as the second radio network node 18B the assigned configuration identifier for the corresponding handover configuration.

Regardless, the first radio network node 18A as shown according to the method may transmit a message to the UE 16 comprising the handover configuration(s) and the associated identifiers (Step 1012).

The first radio network node 18A may thereafter receive an indication that the UE 16 has executed the HO in a candidate target network node (e.g. via X2/Xn signaling or from the CN via S1/NG signaling) (Step 1014). Upon receiving such an indication, the first radio network node 18A may perform one or more actions to trigger release (Step 1016). For example, for each candidate target network node except the one in which the UE executed the CHO, the first radio network node 18A may transmit a single message to release the UE context/resources associated to all CHO configurations for that UE. Or, the first radio network node 18A may transmit one message per CHO configuration, comprising the conditional configuration identifier, to each candidate target network node to release the UE context/resources.

Note that, in order to setup handover configurations for the UE 16, the first radio network node 18A may request candidate target network nodes to provide conditional handover configurations. If any of these candidate radio network nodes intends to configure multiple alternative configurations associated to any particular cell, it will need to be able to distinguish which configuration the UE selects and activates.

The candidate target network node may provide a unique identifier associated to each HO configuration. This will allow the UE 16 to report to the candidate target network node in e.g. RRCReconfigurationComplete message, which of the conditional configuration it has used. The identifier may be configured per cell, i.e. the same conditional configuration identifier value can be reused for different cells. This will allow the UE to report to the candidate target network node in e.g. RRCReconfigurationComplete message, which of the conditional configuration it has used. Since the target radio network node is aware of which cell the UE 16 has performed the HO towards, only the identifiers associated to that target cell/node are relevant. The candidate target radio network node may include the identifier if there are more than one HO configuration associated to the specific cell, i.e. the conditional configuration identifier is omitted for a conditional configuration in case there is only a single conditional configuration for that particular cell for a given UE.

When the first radio network node 18A may receive the handover configuration(s) from the candidate target network node(s), it creates an RRC message comprising the different conditional configurations, with the associated trigger conditions, and conditional configuration identities provided by the candidate target radio network node (if needed). The source radio network node may then send the RRC message to the UE. In some embodiments, the identifier is determined implicitly for an HO configuration. This may be implemented by assigning identities based on the order the conditional configurations are provided. For example, if three conditional configurations are provided, the first configuration which is provided may be given index 1, the second one index 2, the third index 3.

The source radio network node 12 in other embodiments allocates a unique configuration identity for each handover configuration associated with a target cell/node, and may indicate to the target the identities to be used. This can be indicated from the source to the network during the CHO request message (message 2 in FIG. 7) or after the reception of the CHO request ack from the target (message 3 in FIG. 7).

Figure 11:
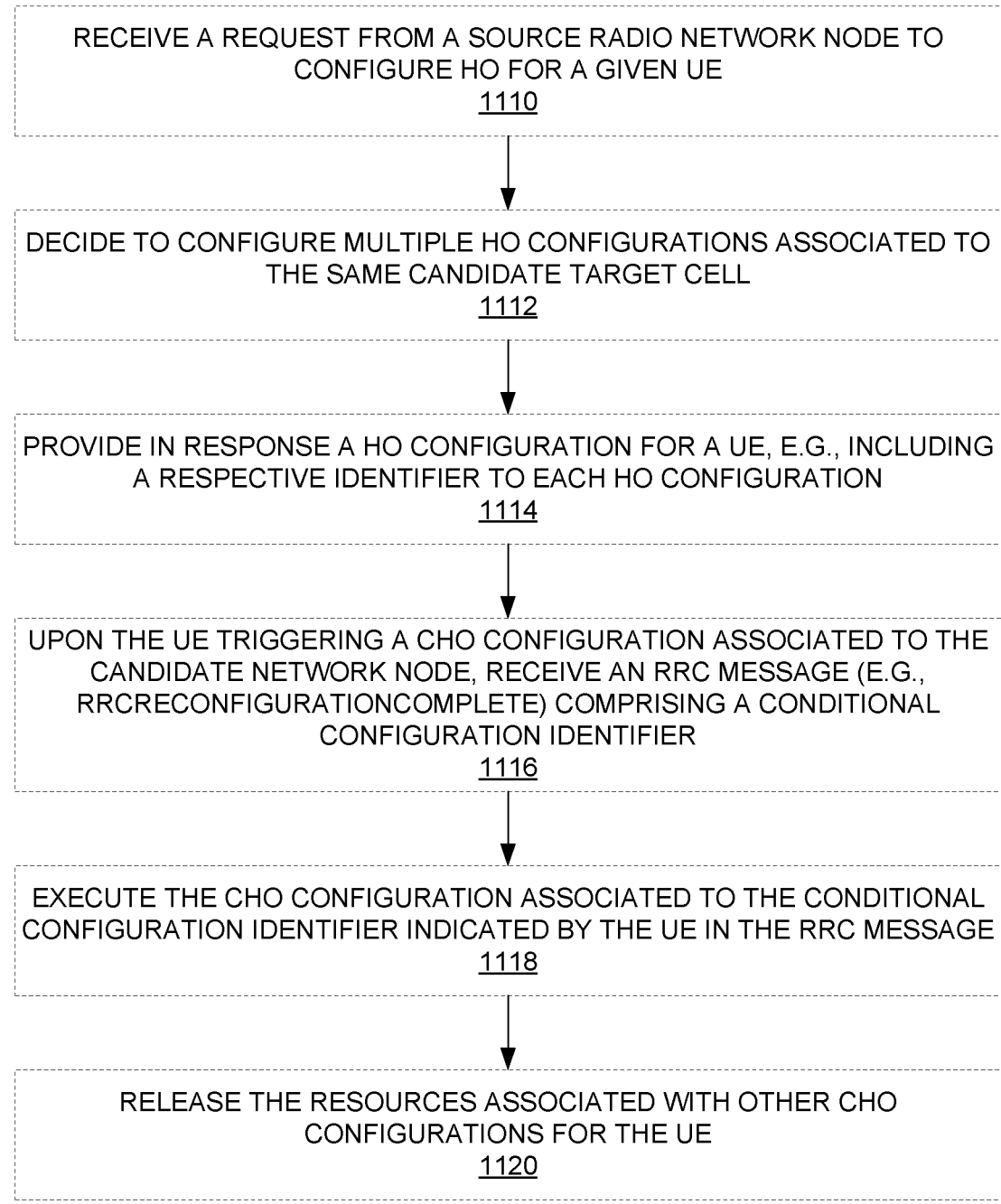
FIG. 11 is a logic flow diagram of a method performed by a radio network node according to other embodiments.

FIG. 11 shows a corresponding method performed by the second radio network node 18B according to some embodiments. As shown, the second radio network node 18B according to the method may receive a request from a source radio network node 12 to configure HO for a given UE e.g. receiving a CHO or HO REQUEST message over X2, Xn or any other inter-node interface (Step 1110). The request may optionally include information about the UE's expected traffic demands (e.g. buffer status report, etc.) and/or traffic type (e.g. voice, ftp, etc.).

The second radio network node 18B may decide to configure multiple HO configurations associated to the same candidate target cell (PCell, PSCell, SpCell, etc) (Step 1112). The decision may be based on e.g. expected traffic, traffic type (voice, file transport protocol (FTP) streaming), UE capability. Different HO configurations may comprise e.g.: Different number of SCells (Zero or more); Different number of MIMO layers; With/without specific beam configurations; etc.

In any event, the second radio network node 18B may provide, in response, a HO configuration for a UE (Step 1114). For example, the second radio network node 18B may transmit a CHO or HO REQUEST ACK message over X2, Xn or any other inter-node interface. The response may comprise recommended CHO conditions associated to different configurations and/or the response may comprise a respective identifier associated to each HO configuration.

The second radio network node 18B in some embodiments may reserve resources for CHO for that UE e.g. C-RNTI, contention-free RACH resources, etc.

As shown in FIG. 11, the second radio network node 18B according to the method may, upon the UE triggering a CHO configuration associated to the candidate target network node, receive an RRC message (e.g. RRCReconfigurationComplete) comprising a conditional configuration identifier (Step 1116).

In some embodiments, the second radio network node 18B may then execute the CHO configurations associated to the conditional configuration identifier indicated by the UE in the RRC message, e.g., the RRC Reconfiguration complete (Step 1118).

The second radio network node 18B may furthermore release the resources associated with other CHO configurations for the UE (Step 1120).

For example, for second radio network nodes neighboring the source radio network node which are configured with multiple CHO configurations associated to the same cell, the second radio network node may receive a message from the source radio network node to release all CHO configurations (e.g. after the UE has executed a CHO to another node) and then release all HO configurations associated to the UE. In other embodiments, the second radio network node 18B may receive one or more messages from the source radio network node 12 comprising an identifier, indicating to release a specific CHO configuration, and then may release the HO configurations associated to the UE as indicated by the conditional configuration identifier.

Generally, when a candidate target network node receives a conditional handover request from a neighboring network node which is connected to the UE 16, the candidate target radio network node 13 may decide to configure multiple conditional configurations associated to one or more of the configured cells. These alternative configurations may comprise e.g., different set of secondary cells (SCells), different MIMO configurations, different beam configurations, etc.

For each of these sets of HO configurations for a particular cell, the candidate target radio network node may create a CHO configuration and may assign the identifier. The identifier may be placed in the same message carrying the configurations. This may for example be an XnAP-message where a field is of the type of a list where each entry in the list is carrying a CHO configuration and a configuration identity. With this approach, the source radio network node may be aware of the identifier and must send the identifier alongside with the HO configuration.

In an alternative approach, the identifier may be placed within the CHO configuration itself, i.e. within the message which terminates in the UE. With this approach, the source node is not necessarily aware of the configuration identifier and since it is placed within a message which terminates in the UE, the source node does not need to take any action with respect to handling of the configuration identifier.

The candidate target network node 13 may also provide different trigger conditions for each of these subsets of configurations (e.g. a relative condition where a better signal strength/quality would correspond to a higher number of MIMO layers, etc.).

The candidate target network node then responds to the source network node with the conditional handover request acknowledgment comprising the set of CHO configurations.

When the UE 16 triggers a conditional handover to a candidate target network node and selects one out of several CHO configuration associated to one cell, the UE performs a random access towards that cell and transmits an RRCReconfigurationComplete message. The RRCReconfigurationComplete message comprises a conditional configuration identifier and the candidate target network node uses this identifier to determine which of the CHO configurations the UE has executed.

When the target node prepared the multiple CHO configurations it may have allocated resources for the UE. For example, the target may have prepared two CHOs for the UE; CHO1 which comprises a configuration without carrier aggregation (i.e. only a PCell) and CHO2 which comprises a configuration with carrier aggregation (i.e. both PCell and one or more SCells). And for CHO2 the target may have assigned sounding reference signal (SRS) resources for the UE on the SCells. In this case, the target node may upon reception of an RRCReconfigurationComplete message with configuration identifier for CHO1 determine that the UE no longer considers CHO2 valid, e.g. the UE may have discarded it or for other reason will not execute CHO2. In this case the target node may consider the resources associated with CHO2 to no longer be reserved for that UE. E.g. in the example with the SRS-resources above, the target may consider the SRS-resource on the SCells to be free.

Figure 12:
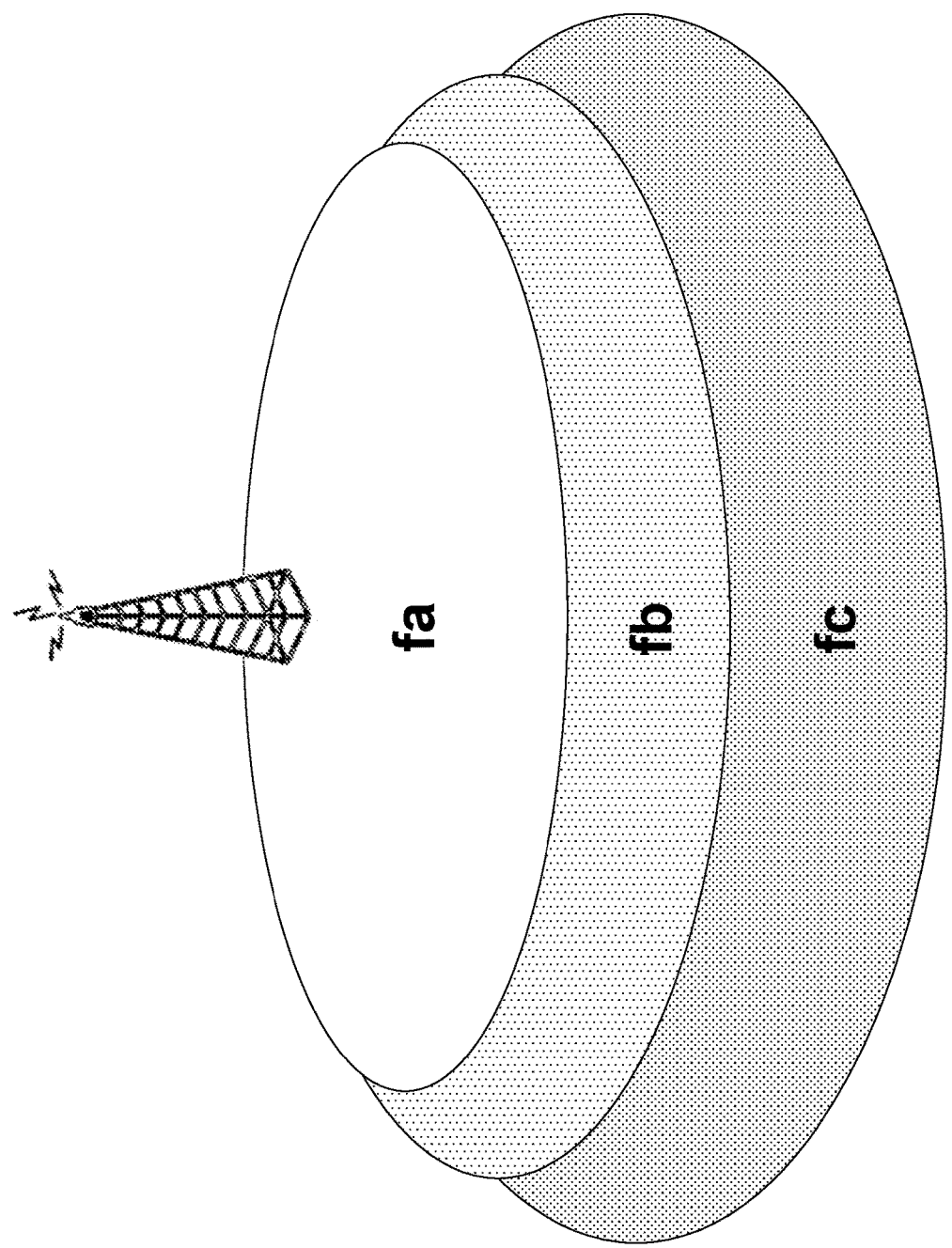
FIG. 12 is a block diagram of an association of conditional configurations with different thresholds according to some embodiments.

FIG. 12 shows on how different threshold could be associated for different conditional configurations. As can be seen in FIG. 12, the target node has cells at three different frequencies, fa, fb, and fc, where fa is the highest frequency and hence the smallest coverage, and fc the lowest frequency and the biggest coverage. The target can send three conditional configurations, say CHO1, CHO2 and CHO3, where CHO1 is the case without CA (i.e. only PCell at fc), CHO2 is the case with CA with fb and fc (i.e. PCell at fc, SCell at fb) and CHO3 is the case with CA with all cells (i.e. PCell at fc, SCells at fb and fc). The target node may also associate the preferred signal levels of the PCell to associate with the three different CHOs. For example, if the PCell quality is above w but below x RSRP, configure CHO1, if between x and y, use CHO2, if greater than y, use CHO3. These thresholds can be sent to the source in absolute values, or relative to each other. The source, upon getting these three CHO configurations, each with associate relative or absolute targets, can take them into account on top of the source's preferred trigger condition to trigger a HO to the target and configures the UE with a final trigger condition/thresholds for each CHO configuration.

Embodiments herein further include a method for adding, modifying, or releasing conditional handover configurations when the UE is configured with multiple CHO configurations associated to the same target cell. The action may be triggered by the target node. For example, the triggering for a release/modification could be due to several reasons such as the target node experiencing resource limitation in some of the cells that are part of the conditional HO configuration, expiry of timer since the conditional HO was configured, etc. Alternatively or additionally, the triggering for an addition/modification could be due to several reasons such as the freeing of resources at the target node (e.g. certain cell of a target is not overloaded anymore). Or, the action may be triggered by the source node. In this case, the triggering of a release/modification could be due to several reasons such as the change of the UE traffic conditions (e.g. a UE's bearer that was generating heavy traffic is released and configuring CA for the UE may not be beneficial anymore), the UE executing a CHO configuration that is associated with another target, etc. Alternatively or additionally, the triggering of an addition/modification could be due to other reasons related to the change of the UE traffic conditions (e.g. a new UE bearer with a heavy guaranteed bit rate requirement has just been setup and UE could benefit from CA).

In case the triggering to add/modify/release the CHO(s) was triggered by the target node, a method may be performed at the target node indicating the add/modify/release request to the source node. The add/modify/release request could also be transparently passed to the UE (e.g. in case there are multiple CHOs that are related to the same target cell of the target node)

In case the triggering to add/modify/release the CHO(s) was triggered by the source node, a method may be performed at the source node indicating the add/modify/release request to the target node.

Embodiments also include a method by each of the source and target node to communicate the addition/modification/release of the CHO configuration(s) to the UE.

Embodiments further include a method at the UE to apply the addition/modification/release of CHO configurations.

As some embodiments herein are applicable for the UEs being configured with multiple CHO configurations associated to the same target cell candidate, some embodiments exploit some identification mechanism other than based on cell identifier (e.g. the identification mechanisms may include a configuration identifier) so that an exact configuration may be modified or released.

Certain embodiments may provide one or more of the following technical advantage(s).

Some embodiments allow multiple conditional handover configurations applicable to the same target candidate cell.

Some embodiments allow the UE to indicate which of the configurations it has executed. Doing so allows the network to configure the UE with different configurations for a given target such as different CA configurations with the same target PCell. Some embodiments also allows to release a specific CHO configuration in a candidate target cell.

Some embodiments alternatively or additionally make it possible to dynamically add, modify, or release CHO configurations for a given UE when the UE is configured with multiple CHO configuration associated, specifically to the same target node/cell, depending on the network conditions (e.g. load) and/or UE conditions (e.g. reduction or increase of traffic to/from the UE).

Some embodiments alternatively or additionally make it possible for the target node to directly communicate to the UE to add/modify/release CHO configurations without involving the source node (i.e. the source transparently passing the information to the UE), e.g., in the case where there are several CHO configurations related to the same target cell. This may be useful for several cases such as when the source and target may not fully comprehend each other's RRC messages, for example, when they employ different radio access technologies (e.g. source is LTE and target is NR, or vice versa) or different versions of the same radio access technologies (e.g. source is NR rel-16, target is NR rel-17).

Consider now additional details of some embodiments concerning target trigger/initiated CHO addition/modification/release.

In one embodiment, the target network node which has configured multiple CHO configurations associated to a given UE, triggers the addition/modification/release of CHO configurations upon determining a change in network conditions. For example, triggering conditional HO release or modification may be performed when other UEs have been handed over or need to be handed over to the target node cells and the resources that were reserved for the CHOs are no longer available. Or when a resource has been freed at the target (e.g. UEs have been handed over to neighboring cells) that makes it possible to configure more resources to the UE (e.g. a configuration with many carriers).

The target network node could, when it wants to add/modify/release CHOs, send a message to the source node indicating which CHO(s) to release, which CHO(s) to add and which CHO(s) to modify. This message could be a new X2/Xn message, e.g. Handover Modification Required. Alternatively, different messages could be employed for different purposes (e.g. a message similar to the HANDOVER CANCEL message discussed below can be used to release CHOs from the target side).

Explicit Approach

In a so-called explicit approach, the target explicitly indicates which CHOs to add/modify/release in a format that is understandable by the source node. An example message structure is shown below.

9.1.1.x Handover Modification Required

This message is sent by the target NG-RAN node to the source NG-RAN node to modify an ongoing conditional handover.

Direction: target NG-RAN node→source NG-RAN node.

| IE/Group Name | Presence | IE type and reference | Semantics description |
|---|---|---|---|
| Message Type | M | 9.2.3.1 | |
| Source NG-RAN node UE XnAP ID | M | NG-RAN node UE XnAP ID 9.2.3.16 | Allocated at the source NG-RAN node. |
| Target NG-RAN node UE XnAP ID | O | NG-RAN node UE XnAP ID 9.2.3.16 | Allocated at the target NG-RAN node. |
| Cause | M | 9.2.3.2 | |
| Release all Conditional Handovers | O | | If included, the target node will release all CHOs associated with the UE |
| Conditional Handover To Be Added List | O | <1..maxCHOperUE> | |
| > conditional Handover To Be Added Item | | | |
| >>Served Cell Information NR | M | 9.2.2.11 | |
| >>>Conditional configuration identity | M | Integer (1..maxConfigurationsPerCell) | |
| >>>Conditional Handover Configuration | M | <1..maxCHOperUE> | |
| Conditional Handover To Be Modified List | O | <1..maxCHOperUE> | |
| > conditional Handover To Be Modified Item | | | |
| >>Served Cell Information NR | M | 9.2.2.11 | |
| >>>Conditional configuration identity | M | Integer (1..maxConfigurationsPerCell) | |
| >>>Conditional Handover Configuration | M | <1..maxCHOperUE> | |
| >>>fullConfig | O | | Included if the CHO configuration is applied as a full configuration to the previous configuration with the same identity, otherwise a delta configuration is assumed |
| Conditional Handover To Be Released List | O | <1..maxCHOperUE> | |
| > conditional Handover To Be Released Item | | | |
| >>Served Cell Information NR | M | 9.2.2.11 | |
| >>>Conditional configuration identity | M | Integer (1..maxConfigurationsPerCell) | |

In one approach a single message indicates to release all CHOs for a UE. "All CHOs for a UE" may comprise all CHOs for a UE for a particular cell. Another approach is that it comprises all CHOs for a UE for a node, i.e. including all cells associated with that node.

The IE Release all Conditional Handover can be included in the modification required message to release all the CHOs associated with that UE at the target. If only a subset of the CHOs are to be released/modified, the individual CHOs to be released/modified can be indicated in the IE "Conditional Handover To Be Released List" and "Conditional Handover To Be Modified List". Which particular CHO is impacted may be indicated by including the specific target cell and an identifier associated with the CHO, such as a conditional configuration identifier (CCI). Note that for the sake of CHO release, only the cell identifier and the CCI is required, while for the modification the new/modified CHO configuration is required, which could be either a delta compared to the CHO which is being modified or a full configuration. If it is a delta configuration, only the changes from the previous CHO configuration with the same serving cell and CCI are provided (e.g. a secondary cell added or removed), while if it is a full configuration, the complete CHO (e.g. RRCReconfiguration) is provided.

Another approach is to send one message which releases a specific CHO. Such a message may comprise an indication of which conditional configuration identity shall be released.

The source node would upon reception of such a message indicate to the UE to release the indicated CHOs. The source node may do so by indicating conditional configuration identifiers (CCIs) which shall be released, e.g., in a control message 26 shown in FIG. 1. One way of implementing this may be to provide a list to the UE where each entry in the list indicates an identifier of a CHO and the cell for which a CHO shall be released. An example:

CHO release list: {CCI 1, cell X}; {CCI 2, cell X}; {CCI 1, cell Y}; {CCI 3, cell Z}.

Another possible way to signal this is that there is a list of CCIs per cell:

CHO release list: {Cell X: {CCI 1, CCI 2}}; {Cell Y: {CCI 1}}; {Cell Z: {CCI 3}}.

Figure 13:
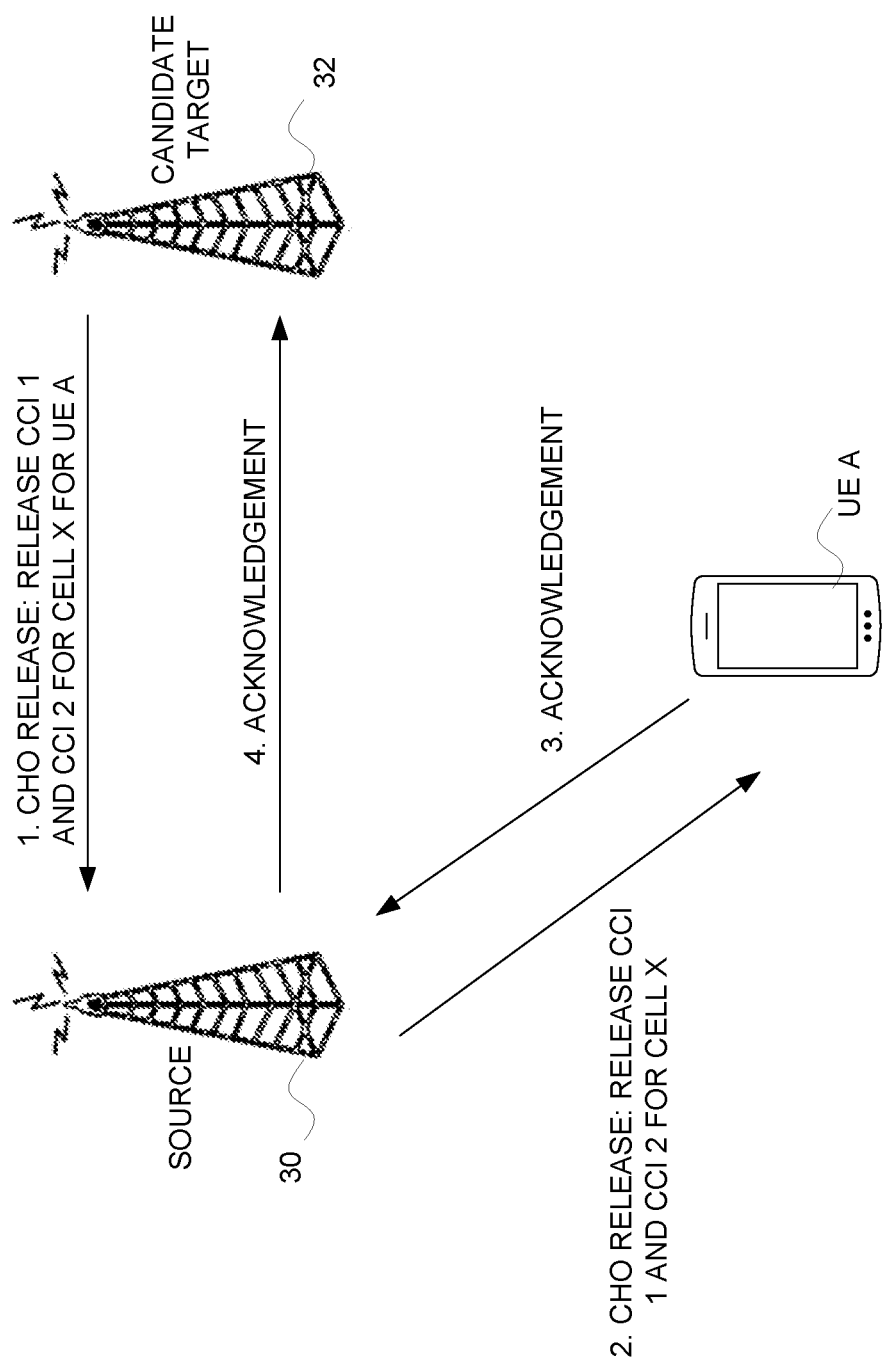
FIG. 13 is a block diagram of a target triggered addition, modification, or release of a conditional configuration according to some embodiments.

An illustration of the scenario is shown in FIG. 13. A candidate target 32 determines that one or more CHOs shall be released (in this case CHOs with CCI 1 and CCI 2 for cell X for UE A), and this is then indicated to the source 30 (Step 1). The source 30 indicates to the UE A to release those CHOs, e.g., via a control message 26 (Step 2). In response to this the UE A may acknowledge to the source 30 that the CHOs has been released (Step 3) and the source 30 may in its turn acknowledge to the candidate target 32 that the UE A has released the CHOs (Step 4).

Yet another approach is that the message indicates to keep (a subset of) the CHO configurations. Such a message may comprise an indication of which conditional configuration identity shall be kept and the others would be released.

It is also possible to use different messages for different purposes. For example, the release of CHOs can be indicated in another message, such as the HANDOVER CANCEL REQUIRED message shown below (which is an enhanced version of the HANDOVER CANCEL message that is currently available in X2/Xn for the source to indicate to the target to cancel an ongoing handover).

9.1.1.6 Handover Cancel Required

This message is sent by the target NG-RAN node to the source NG-RAN node to release a conditional handover.
Direction: target NG-RAN node→source NG-RAN node.
(Implicit) Transparent Container Approach In another so-called implicit approach, the target node can modify the CHO configurations by transmitting a transparent container to the source network node comprising an updated CHO configuration. The source network node would then forward this container to the UE. The source node does not necessarily have to inspect or understand the content of the container. This could be useful for several cases such as when the source and target may not fully comprehend each other's RRC messages, for example, when they employ different radio access technologies (e.g. source is LTE and target is NR, or vice versa) or different versions of the same radio access technologies (e.g. source is NR rel-16, target is NR rel-17).

Message structures similar to that shown above could be employed, where the main difference in this case is the information in the CHOs to be added/modified/released is contained in transparent container and the source is not expected to understand it and simply forwards it to the UE. There can be one container that contains all the CHOs to be added/modified/release, or there can be separate containers for each part. The control message 26 from FIG. 1 in this case may have the structure illustrated above for HANDOVER MODIFICATION REQUIRED.

The UE may, upon reception of receiving indications to release CHOs, release the indicated CHOs and send an acknowledgement message to the source node, e.g. using an RRCReconfigurationComplete message. The source node may in response to receiving the acknowledgement from the UE indicate to the target node that the UE has successfully released the CHOs.

Figure 14:
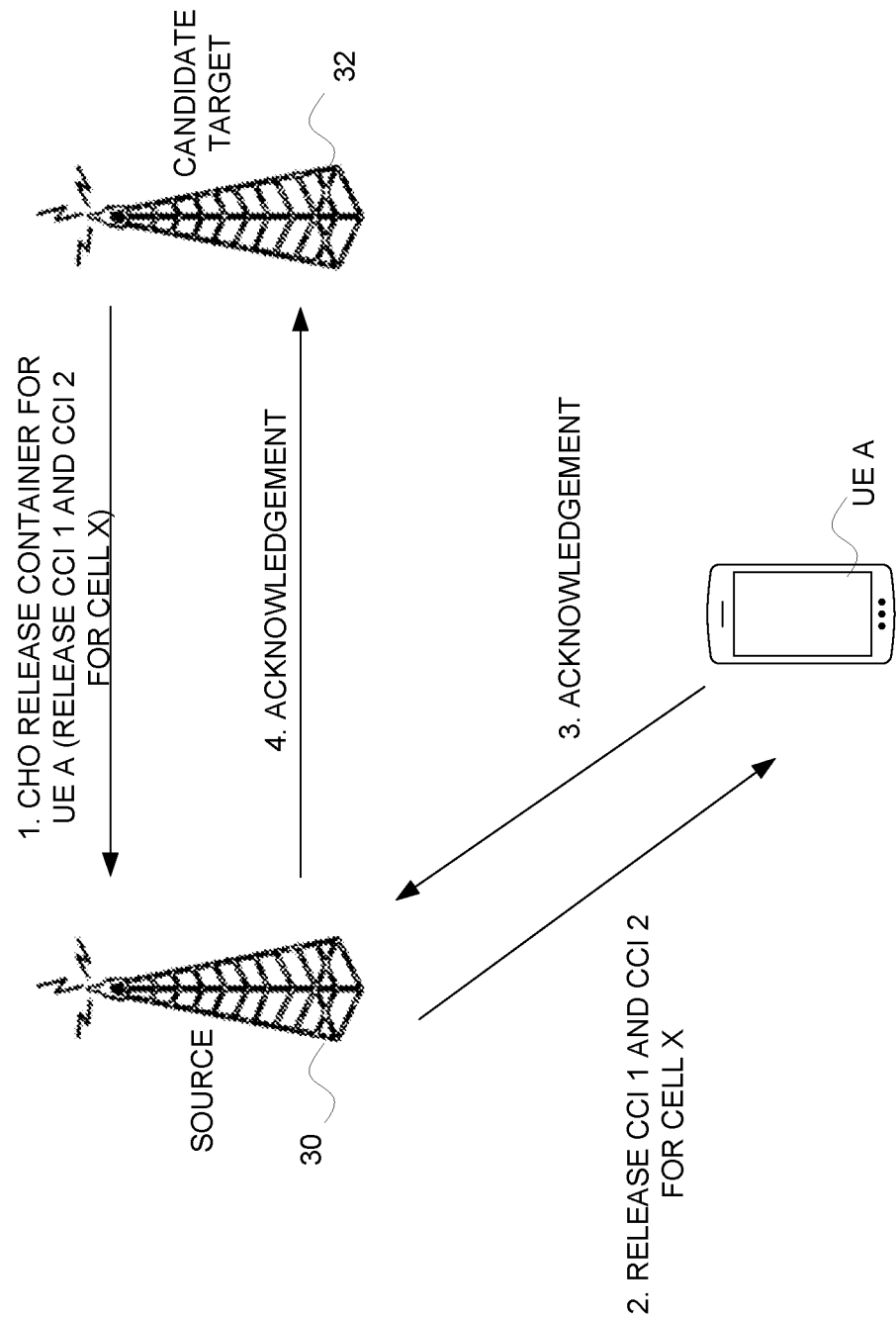
FIG. 14 is a block diagram of a target triggered addition, modification, or release of a conditional configuration according to other embodiments.

An illustration of the scenario is shown in FIG. 14. A candidate target 32 determines that one or more CHOs shall be released (in this case CHOs with CCI 1 and CCI 2 for cell X for UE A), and this is then indicated to the source 30 in a container (Step 1). The source 30 forwards the content of the container to the UE A transparently (Step 2). In response to this, the UE A may acknowledge to the source 30 that it has applied the content of the container (Step 3) and the source 30 may in its turn acknowledge to the candidate target 32 that the UE A has applied the content of the container (Step 4). Alternatively, the UE A may send an Acknowledgement, e.g. RRCReconfigurationComplete, in a container towards the source 30, which then transparently forwards it to the target 32.

In one embodiment the target network node indicates to the source node that a (set of) CHO(s) shall be modified. This may be by providing a new (set of) CHO configuration(s) and that new CHO configuration may be given the same conditional configuration identifier as the CHO which shall be updated.

The source node would in response to receiving an indication from the target node execute the CHO update towards the UE. One way in which the source node may do this is to indicate to the UE that a CHO shall be modified. This may be done by sending the new CHO to the UE and the new CHO is given the same index as the CHO which shall be updated.

Another approach is that the source node releases the CHO which shall be updated and the new (i.e. the updated) CHO is provided to the UE).

Figure 15:
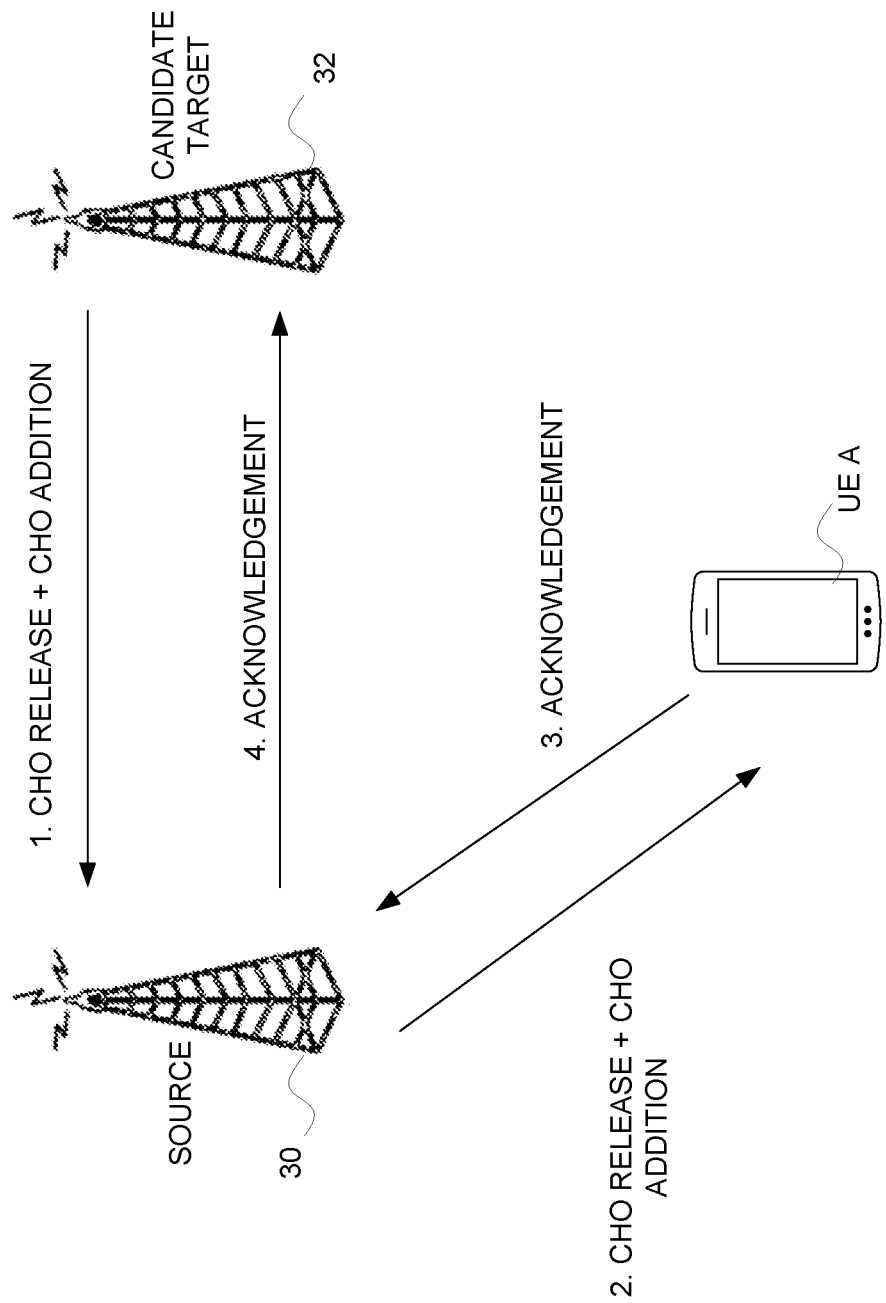
FIG. 15 is a block diagram of a target triggered addition, modification, or release of a conditional configuration according to still other embodiments.

As shown in FIG. 15, another approach in which a CHO can be modified is that the target node indicates that a CHO shall be released and that a new (i.e. updated) CHO shall be added. These two indications (release and addition) may be signaled in the same or different messages.

Consider now yet other embodiments for source triggered/initiated CHO addition/modification/release.

In another embodiment, the addition/modification/release of CHO configurations is triggered/requested by the source node. For example, in one embodiment, the UE has been handed over to a certain target and the CHO configurations for other targets are no longer relevant/needed. In this case, the source may then trigger the release of the CHO configuration to the other targets.

As another example, the traffic conditions at the UE have changed, requiring more resources (e.g. new bearer with heavy data rate requirement has been added). In this case, the source node may trigger CHO addition request to target node(s).

As yet another example, the traffic conditions at the UE have changed, requiring less resources (e.g. a bearer with heavy data rate requirement has been released). The source node in this case may trigger CHO release/modification request to target node(s).

Figure 16:
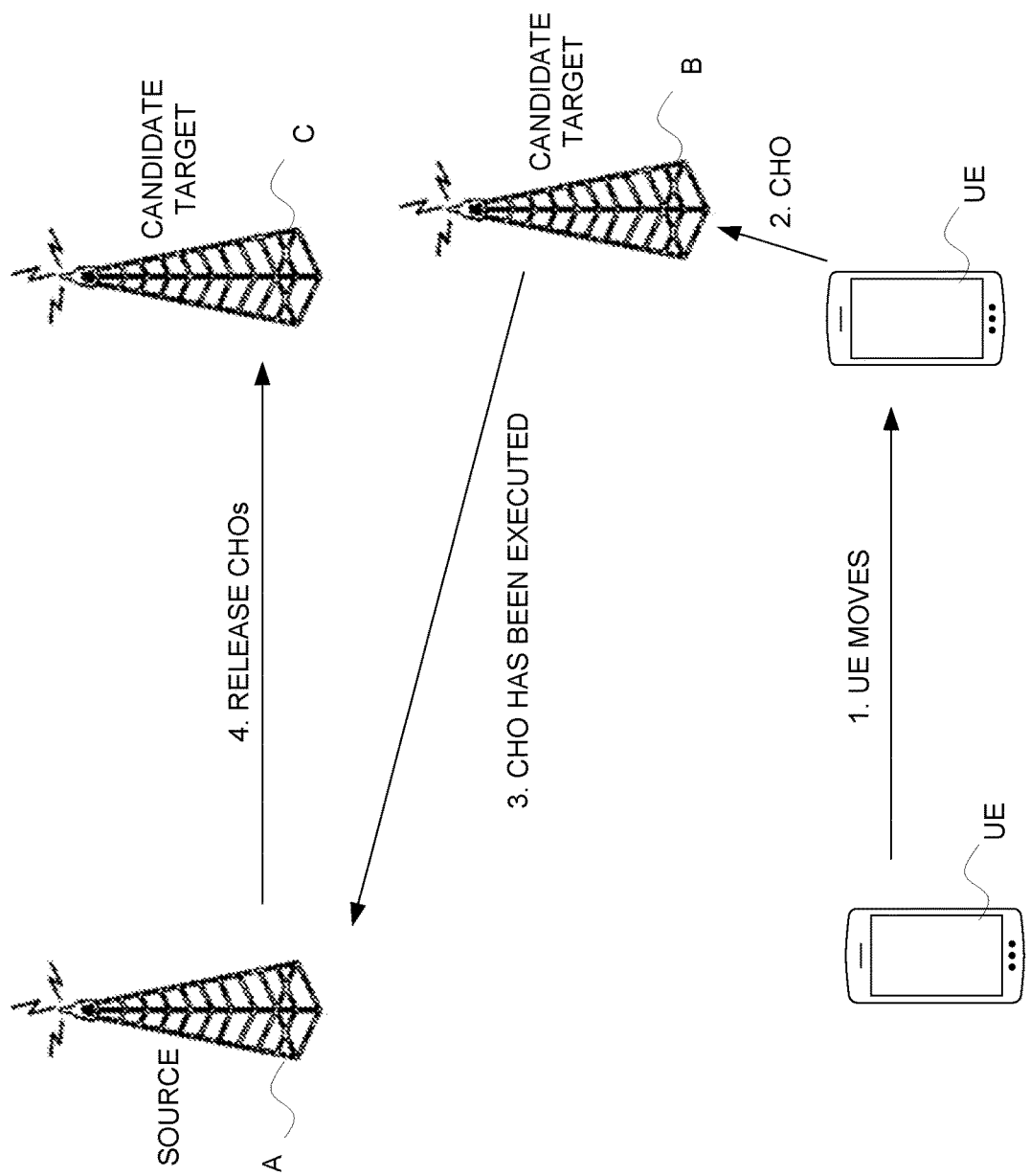
FIG. 16 is a block diagram of a source triggered addition, modification, or release of a conditional configuration according to some embodiments.

An example scenario is shown in FIG. 16, illustrating the source triggered CHO release. The UE is configured with CHO configurations for candidate target node B and node C, and the UE executes a CHO to Cell1 in node B (Steps 1 and 2). Upon the candidate target node B informing the source node A that CHO has been executed (Step 3), the source network node A indicates to node C that the CHOs for the UE shall no longer be applicable (Step 4). Alternatively, if based on a measurement report from the UE, the UE is no longer close to a certain candidate target cell, it may no longer be meaningful for the UE to have a CHO towards that target cell.

The source node can indicate to a candidate target node in a single message to release all CHOs for the UE. "All" CHOs for a UE may comprise all CHOs for a UE for a particular cell. Another approach is that, if the UE has been handed over to a certain node, then a single message can be sent to the other nodes (one per node) to release all the CHOs for that UE where the target primary cell is any cell that is served by the target node.

Below is an example implementation of this embodiment showing an enhancement of the Handover Cancel X2/Xn message. The IE Release all Conditional Handover can be included to release all the CHOs associated with that UE at the target. If only a subset of the CHOs are to be released, the individual CHOs to be released can be indicated in the IE "Conditional Handover To Be Released List". Which particular CHO to be released may be indicated by the target cell and an identifier associated with the CHO, such as a conditional configuration identifier.

9.1.1.6 Handover Cancel

This message is sent by the source NG-RAN node to the target NG-RAN node to cancel an ongoing handover.
Direction: source NG-RAN node→target NG-RAN node.

| IE/Group Name | Presence | IE type and reference | Semantics description |
|---|---|---|---|
| Message Type | M | 9.2.3.1 | |
| Source NG-RAN node UEXnAP ID | M | NG-RAN node UEXnAP ID 9.2.3.16 | Allocated at the source NG-RAN node. |
| Target NG-RAN node UEXnAP ID | O | NG-RAN node UEXnAP ID 9.2.3.16 | Allocated at the target NG-RAN node. |
| Cause | M | 9.2.3.2 | |
| Release all Conditional Handovers | O | | If included, the target node will release all CHOs associated with the UE |
| Conditional Handover To Be Released List > conditional Handover To Be Released Item | O | <1..maxCHOperUE> | |
| >>Served Cell Information NR | M | 9.2.2.11 | |
| >>Conditional configuration identity | M | Integer (1..maxConfigurationsPerCell) | |

In another version of the embodiment, a source node indicates with a separate CHO cancel message, each indicating to release a certain CHO (i.e. a series of messages would be sent to release multiple CHOs).

Since it is up to the target node to decide the exact CHO configuration(s) (e.g. based on the resource situation at the target), the source node cannot mandate the target to add/modify a certain CHO (e.g. a CHO with carrier aggregation). Thus, the CHO addition/modification trigger from the source is rather a recommendation/suggestion, rather than a command, with the message indicating the needs of the UE.

Note that a conditional configuration may sometimes be associated with a handover procedure and the embodiments herein may be applicable both to the case when the conditional configuration is associated with a handover and when it is not. So if, in the description of some embodiment, the term conditional handover is used, it should not be understood as limiting but just an example, i.e. the embodiment could also be applicable to cases when the conditional configuration is not associated with a handover.

In some embodiments described herein, it is described how the UE 16 may receive multiple HO configurations for one or more target nodes and/or cells and how the UE 16 receives one or more identifiers which the UE uses in such scenarios. Also, there are methods described for source and target nodes. However, it should be noted that some the embodiments described herein can also be applied to intra-node/intra-cell scenarios as well, i.e. scenarios in which the UE 16 applies a conditional configuration for the same radio network node as the UE 16 is connected to. For example, in such scenarios, the first radio network node 18A sends HO configurations to the UE 16 which applies for the first radio network node 18A itself. In intra-node/intra-cell scenarios, the methods which are described to be applied by the "source node" or "target node" may take place within the single node.

Most of the embodiments are describing the handling in case of NR. However, it should be noted that this is only for the sake of brevity and the methods are applicable also to the case of LTE or other radio access technologies. As such, the enhancements referred to NR here in RRCReconfiguration, ConditionalRRCReconfiguration, RRCReconfiguration-Complete, etc. are applicable to the LTE equivalents of RRCConnectionReconfiguration, ConditionalRRCConnectionReconfiguration, RRCConnectionReconfigurationComplete, etc.

Accordingly, embodiments herein are described within the context of 3GPP NR radio technology (3GPP TS 38.300 V15.2.0 (2018 June)). It is understood that the embodiments herein are equally applicable to wireless access networks and UEs implementing other access technologies and standards. NR is used as an example technology in the embodiments herein, and using NR in the description therefore is particularly useful for understanding the problem and solutions solving the problem. In particular, the embodiments herein are applicable also to 3GPP LTE, or 3GPP LTE and NR integration, also denoted as non-standalone NR.

Some aspects herein can be implemented in an RRC layer. An RRC entity in the network may be implemented in a cloud environment (e.g. in a CU (central unit)-DU (distributed unit) split case where the base station has a centralized and distributed part, where the RRC resides in the centralized part), hence some aspects may be implemented in a cloud environment.

Figure 17:
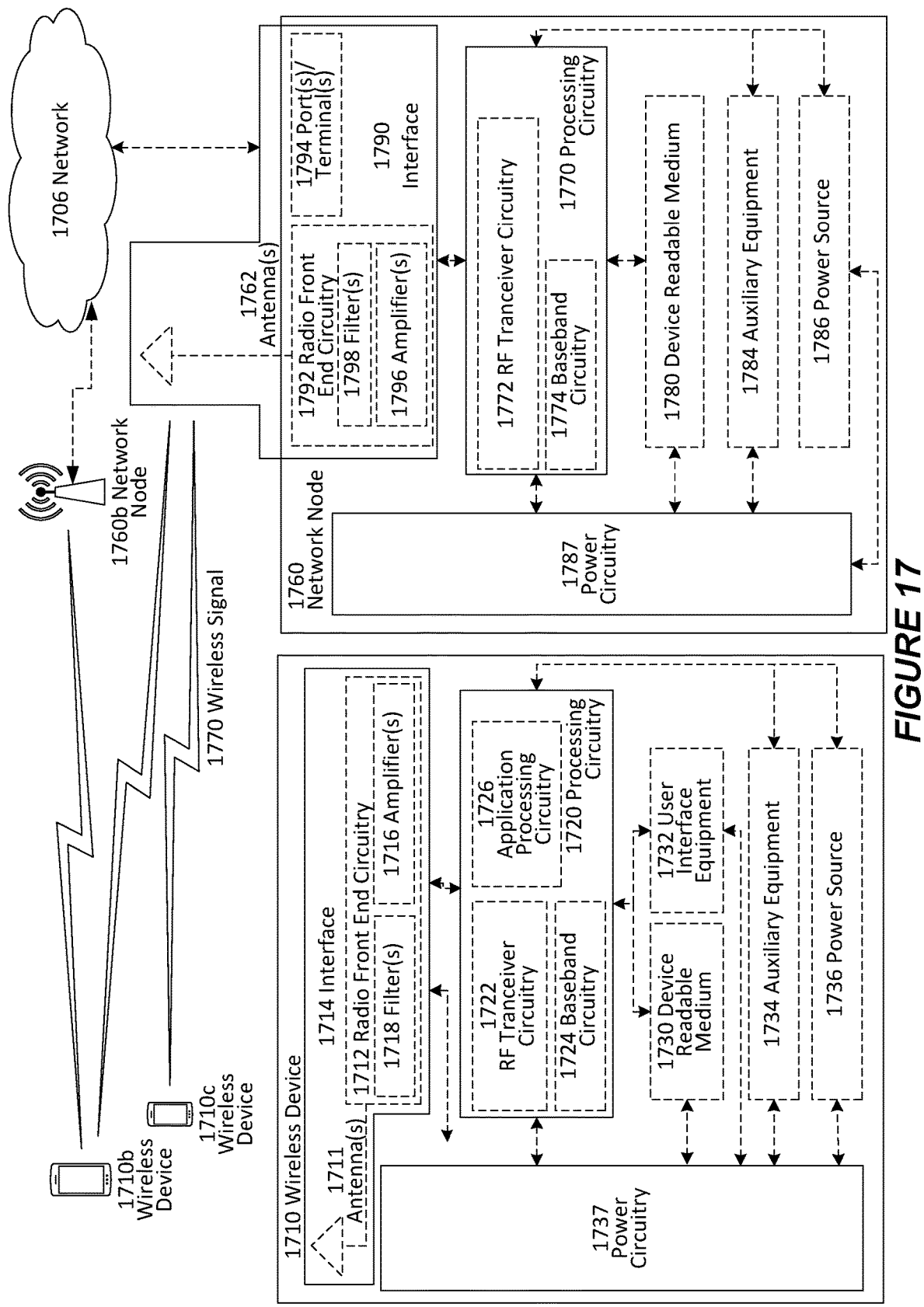
FIG. 17 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network 1706, network nodes 1760 and 1760*b*, and WDs 1710, 1710*b*, and 1710*c*. In practice, a wireless network may further include any additional elements suitable to support communication between wireless devices or between a wireless device and another communication device, such as a landline telephone, a service provider, or any other network node or end device. Of the illustrated components, network node 1760 and wireless device (WD) 1710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1760 and WD 1710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 17, network node 1760 includes processing circuitry 1770, device readable medium 1780, interface 1790, auxiliary equipment 1784, power source 1786, power circuitry 1787, and antenna 1762. Although network node 1760 illustrated in the example wireless network of FIG. 17 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1760 are depicted as single boxes located within a larger box, or nested within multiple boxes, in practice, a network node may comprise multiple different physical components that make up a single illustrated component (e.g., device readable medium 1780 may comprise multiple separate hard drives as well as multiple RAM modules).

Similarly, network node 1760 may be composed of multiple physically separate components (e.g., a NodeB component and a RNC component, or a BTS component and a BSC component, etc.), which may each have their own respective components. In certain scenarios in which network node 1760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1760 may be configured to support multiple radio access technologies (RATs). In such embodiments, some components may be duplicated (e.g., separate device readable medium 1780 for the different RATs) and some components may be reused (e.g., the same antenna 1762 may be shared by the RATs). Network node 1760 may also include multiple sets of the various illustrated components for different wireless technologies integrated into network node 1760, such as, for example, GSM, WCDMA, LTE, NR, WiFi, or Bluetooth wireless technologies. These wireless technologies may be integrated into the same or different chip or set of chips and other components within network node 1760.

Processing circuitry 1770 is configured to perform any determining, calculating, or similar operations (e.g., certain obtaining operations) described herein as being provided by a network node. These operations performed by processing circuitry 1770 may include processing information obtained by processing circuitry 1770 by, for example, converting the obtained information into other information, comparing the obtained information or converted information to information stored in the network node, and/or performing one or more operations based on the obtained information or converted information, and as a result of said processing making a determination.

Processing circuitry 1770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1760 components, such as device readable medium 1780, network node 1760 functionality. For example, processing circuitry 1770 may execute instructions stored in device readable medium 1780 or in memory within processing circuitry 1770. Such functionality may include providing any of the various wireless features, functions, or benefits discussed herein. In some embodiments, processing circuitry 1770 may include a system on a chip (SOC).

In some embodiments, processing circuitry 1770 may include one or more of radio frequency (RF) transceiver circuitry 1772 and baseband processing circuitry 1774. In some embodiments, radio frequency (RF) transceiver circuitry 1772 and baseband processing circuitry 1774 may be on separate chips (or sets of chips), boards, or units, such as radio units and digital units. In alternative embodiments, part or all of RF transceiver circuitry 1772 and baseband processing circuitry 1774 may be on the same chip or set of chips, boards, or units In certain embodiments, some or all of the functionality described herein as being provided by a network node, base station, eNB or other such network device may be performed by processing circuitry 1770 executing instructions stored on device readable medium 1780 or memory within processing circuitry 1770. In alternative embodiments, some or all of the functionality may be provided by processing circuitry 1770 without executing instructions stored on a separate or discrete device readable medium, such as in a hard-wired manner. In any of those embodiments, whether executing instructions stored on a device readable storage medium or not, processing circuitry 1770 can be configured to perform the described functionality. The benefits provided by such functionality are not limited to processing circuitry 1770 alone or to other components of network node 1760, but are enjoyed by network node 1760 as a whole, and/or by end users and the wireless network generally.

Device readable medium 1780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1770. Device readable medium 1780 may store any suitable instructions, data or information, including a computer program, software, an application including one or more of logic, rules, code, tables, etc. and/or other instructions capable of being executed by processing circuitry 1770 and, utilized by network node 1760. Device readable medium 1780 may be used to store any calculations made by processing circuitry 1770 and/or any data received via interface 1790. In some embodiments, processing circuitry 1770 and device readable medium 1780 may be considered to be integrated.

Interface 1790 is used in the wired or wireless communication of signalling and/or data between network node 1760, network 1706, and/or WDs 1710. As illustrated, interface 1790 comprises port(s)/terminal(s) 1794 to send and receive data, for example to and from network 1706 over a wired connection. Interface 1790 also includes radio front end circuitry 1792 that may be coupled to, or in certain embodiments a part of, antenna 1762. Radio front end circuitry 1792 comprises filters 1798 and amplifiers 1796. Radio front end circuitry 1792 may be connected to antenna 1762 and processing circuitry 1770. Radio front end circuitry may be configured to condition signals communicated between antenna 1762 and processing circuitry 1770. Radio front end circuitry 1792 may receive digital data that is to be sent out to other network nodes or WDs via a wireless connection. Radio front end circuitry 1792 may convert the digital data into a radio signal having the appropriate channel and bandwidth parameters using a combination of filters 1798 and/or amplifiers 1796. The radio signal may then be transmitted via antenna 1762. Similarly, when receiving data, antenna 1762 may collect radio signals which are then converted into digital data by radio front end circuitry 1792. The digital data may be passed to processing circuitry 1770. In other embodiments, the interface may comprise different components and/or different combinations of components.

In certain alternative embodiments, network node 1760 may not include separate radio front end circuitry 1792, instead, processing circuitry 1770 may comprise radio front end circuitry and may be connected to antenna 1762 without separate radio front end circuitry 1792. Similarly, in some embodiments, all or some of RF transceiver circuitry 1772 may be considered a part of interface 1790. In still other embodiments, interface 1790 may include one or more ports or terminals 1794, radio front end circuitry 1792, and RF transceiver circuitry 1772, as part of a radio unit (not shown), and interface 1790 may communicate with baseband processing circuitry 1774, which is part of a digital unit (not shown).

Antenna 1762 may include one or more antennas, or antenna arrays, configured to send and/or receive wireless signals. Antenna 1762 may be coupled to radio front end circuitry 1790 and may be any type of antenna capable of transmitting and receiving data and/or signals wirelessly. In some embodiments, antenna 1762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1762 may be separate from network node 1760 and may be connectable to network node 1760 through an interface or port.

Antenna 1762, interface 1790, and/or processing circuitry 1770 may be configured to perform any receiving operations and/or certain obtaining operations described herein as being performed by a network node. Any information, data and/or signals may be received from a wireless device, another network node and/or any other network equipment. Similarly, antenna 1762, interface 1790, and/or processing circuitry 1770 may be configured to perform any transmitting operations described herein as being performed by a network node. Any information, data and/or signals may be transmitted to a wireless device, another network node and/or any other network equipment.

Power circuitry 1787 may comprise, or be coupled to, power management circuitry and is configured to supply the components of network node 1760 with power for performing the functionality described herein. Power circuitry 1787 may receive power from power source 1786. Power source 1786 and/or power circuitry 1787 may be configured to provide power to the various components of network node 1760 in a form suitable for the respective components (e.g., at a voltage and current level needed for each respective component). Power source 1786 may either be included in, or external to, power circuitry 1787 and/or network node 1760. For example, network node 1760 may be connectable to an external power source (e.g., an electricity outlet) via an input circuitry or interface such as an electrical cable, whereby the external power source supplies power to power circuitry 1787. As a further example, power source 1786 may comprise a source of power in the form of a battery or battery pack which is connected to, or integrated in, power circuitry 1787. The battery may provide backup power should the external power source fail. Other types of power sources, such as photovoltaic devices, may also be used.

Alternative embodiments of network node 1760 may include additional components beyond those shown in FIG. 17 that may be responsible for providing certain aspects of the network node's functionality, including any of the functionality described herein and/or any functionality necessary to support the subject matter described herein. For example, network node 1760 may include user interface equipment to allow input of information into network node 1760 and to allow output of information from network node 1760. This may allow a user to perform diagnostic, maintenance, repair, and other administrative functions for network node 1760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1710 includes antenna 1711, interface 1714, processing circuitry 1720, device readable medium 1730, user interface equipment 1732, auxiliary equipment 1734, power source 1736 and power circuitry 1737. WD 1710 may include multiple sets of one or more of the illustrated components for different wireless technologies supported by WD 1710, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1710.

Antenna 1711 may include one or more antennas or antenna arrays, configured to send and/or receive wireless signals, and is connected to interface 1714. In certain alternative embodiments, antenna 1711 may be separate from WD 1710 and be connectable to WD 1710 through an interface or port. Antenna 1711, interface 1714, and/or processing circuitry 1720 may be configured to perform any receiving or transmitting operations described herein as being performed by a WD. Any information, data and/or signals may be received from a network node and/or another WD. In some embodiments, radio front end circuitry and/or antenna 1711 may be considered an interface.

As illustrated, interface 1714 comprises radio front end circuitry 1712 and antenna 1711. Radio front end circuitry 1712 comprise one or more filters 1718 and amplifiers 1716. Radio front end circuitry 1714 is connected to antenna 1711 and processing circuitry 1720, and is configured to condition signals communicated between antenna 1711 and processing circuitry 1720. Radio front end circuitry 1712 may be coupled to or a part of antenna 1711. In some embodiments, WD 1710 may not include separate radio front end circuitry 1712; rather, processing circuitry 1720 may comprise radio front end circuitry and may be connected to antenna 1711. Similarly, in some embodiments, some or all of RF transceiver circuitry 1722 may be considered a part of interface 1714. Radio front end circuitry 1712 may receive digital data that is to be sent out to other network nodes or WDs via a wireless connection. Radio front end circuitry 1712 may convert the digital data into a radio signal having the appropriate channel and bandwidth parameters using a combination of filters 1718 and/or amplifiers 1716. The radio signal may then be transmitted via antenna 1711. Similarly, when receiving data, antenna 1711 may collect radio signals which are then converted into digital data by radio front end circuitry 1712. The digital data may be passed to processing circuitry 1720. In other embodiments, the interface may comprise different components and/or different combinations of components.

Processing circuitry 1720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1710 components, such as device readable medium 1730, WD 1710 functionality. Such functionality may include providing any of the various wireless features or benefits discussed herein. For example, processing circuitry 1720 may execute instructions stored in device readable medium 1730 or in memory within processing circuitry 1720 to provide the functionality disclosed herein.

As illustrated, processing circuitry 1720 includes one or more of RF transceiver circuitry 1722, baseband processing circuitry 1724, and application processing circuitry 1726. In other embodiments, the processing circuitry may comprise different components and/or different combinations of components. In certain embodiments processing circuitry 1720 of WD 1710 may comprise a SOC. In some embodiments, RF transceiver circuitry 1722, baseband processing circuitry 1724, and application processing circuitry 1726 may be on separate chips or sets of chips. In alternative embodiments, part or all of baseband processing circuitry 1724 and application processing circuitry 1726 may be combined into one chip or set of chips, and RF transceiver circuitry 1722 may be on a separate chip or set of chips. In still alternative embodiments, part or all of RF transceiver circuitry 1722 and baseband processing circuitry 1724 may be on the same chip or set of chips, and application processing circuitry 1726 may be on a separate chip or set of chips. In yet other alternative embodiments, part or all of RF transceiver circuitry 1722, baseband processing circuitry 1724, and application processing circuitry 1726 may be combined in the same chip or set of chips. In some embodiments, RF transceiver circuitry 1722 may be a part of interface 1714. RF transceiver circuitry 1722 may condition RF signals for processing circuitry 1720.

In certain embodiments, some or all of the functionality described herein as being performed by a WD may be provided by processing circuitry 1720 executing instructions stored on device readable medium 1730, which in certain embodiments may be a computer-readable storage medium. In alternative embodiments, some or all of the functionality may be provided by processing circuitry 1720 without executing instructions stored on a separate or discrete device readable storage medium, such as in a hard-wired manner. In any of those particular embodiments, whether executing instructions stored on a device readable storage medium or not, processing circuitry 1720 can be configured to perform the described functionality. The benefits provided by such functionality are not limited to processing circuitry 1720 alone or to other components of WD 1710, but are enjoyed by WD 1710 as a whole, and/or by end users and the wireless network generally.

Processing circuitry 1720 may be configured to perform any determining, calculating, or similar operations (e.g., certain obtaining operations) described herein as being performed by a WD. These operations, as performed by processing circuitry 1720, may include processing information obtained by processing circuitry 1720 by, for example, converting the obtained information into other information, comparing the obtained information or converted information to information stored by WD 1710, and/or performing one or more operations based on the obtained information or converted information, and as a result of said processing making a determination.

Device readable medium 1730 may be operable to store a computer program, software, an application including one or more of logic, rules, code, tables, etc. and/or other instructions capable of being executed by processing circuitry 1720. Device readable medium 1730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1720. In some embodiments, processing circuitry 1720 and device readable medium 1730 may be considered to be integrated.

User interface equipment 1732 may provide components that allow for a human user to interact with WD 1710. Such interaction may be of many forms, such as visual, audial, tactile, etc. User interface equipment 1732 may be operable to produce output to the user and to allow the user to provide input to WD 1710. The type of interaction may vary depending on the type of user interface equipment 1732 installed in WD 1710. For example, if WD 1710 is a smart phone, the interaction may be via a touch screen; if WD 1710 is a smart meter, the interaction may be through a screen that provides usage (e.g., the number of gallons used) or a speaker that provides an audible alert (e.g., if smoke is detected). User interface equipment 1732 may include input interfaces, devices and circuits, and output interfaces, devices and circuits. User interface equipment 1732 is configured to allow input of information into WD 1710, and is connected to processing circuitry 1720 to allow processing circuitry 1720 to process the input information. User interface equipment 1732 may include, for example, a microphone, a proximity or other sensor, keys/buttons, a touch display, one or more cameras, a USB port, or other input circuitry. User interface equipment 1732 is also configured to allow output of information from WD 1710, and to allow processing circuitry 1720 to output information from WD 1710. User interface equipment 1732 may include, for example, a speaker, a display, vibrating circuitry, a USB port, a headphone interface, or other output circuitry. Using one or more input and output interfaces, devices, and circuits, of user interface equipment 1732, WD 1710 may communicate with end users and/or the wireless network, and allow them to benefit from the functionality described herein.

Auxiliary equipment 1734 is operable to provide more specific functionality which may not be generally performed by WDs. This may comprise specialized sensors for doing measurements for various purposes, interfaces for additional types of communication such as wired communications etc. The inclusion and type of components of auxiliary equipment 1734 may vary depending on the embodiment and/or scenario.

Power source 1736 may, in some embodiments, be in the form of a battery or battery pack. Other types of power sources, such as an external power source (e.g., an electricity outlet), photovoltaic devices or power cells, may also be used. WD 1710 may further comprise power circuitry 1737 for delivering power from power source 1736 to the various parts of WD 1710 which need power from power source 1736 to carry out any functionality described or indicated herein. Power circuitry 1737 may in certain embodiments comprise power management circuitry. Power circuitry 1737 may additionally or alternatively be operable to receive power from an external power source; in which case WD 1710 may be connectable to the external power source (such as an electricity outlet) via input circuitry or an interface such as an electrical power cable. Power circuitry 1737 may also in certain embodiments be operable to deliver power from an external power source to power source 1736. This may be, for example, for the charging of power source 1736. Power circuitry 1737 may perform any formatting, converting, or other modification to the power from power source 1736 to make the power suitable for the respective components of WD 1710 to which power is supplied.

Figure 18:
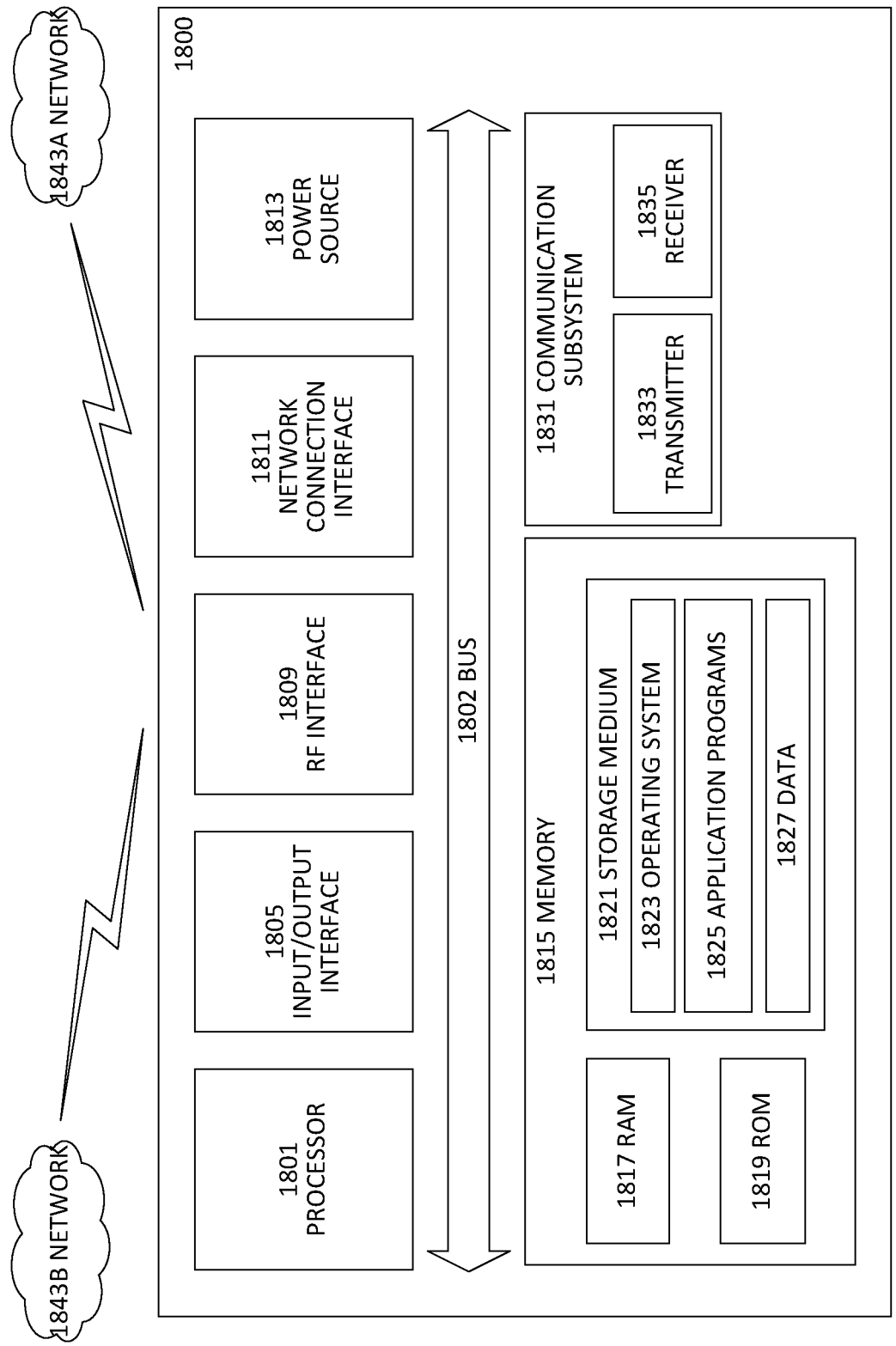
FIG. 18 is a block diagram of a user equipment according to some embodiments.

FIG. 18 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 18200 may be any UE identified by the $3^{rd}$ Generation Partnership Project (3GPP), including a NB-IoT UE, a machine type communication (MTC) UE, and/or an enhanced MTC (eMTC) UE. UE 1800, as illustrated in FIG. 18, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 18 is a UE, the components discussed herein are equally applicable to a WD, and vice-versa.

In FIG. 18, UE 1800 includes processing circuitry 1801 that is operatively coupled to input/output interface 1805, radio frequency (RF) interface 1809, network connection interface 1811, memory 1815 including random access memory (RAM) 1817, read-only memory (ROM) 1819, and storage medium 1821 or the like, communication subsystem 1831, power source 1833, and/or any other component, or any combination thereof. Storage medium 1821 includes operating system 1823, application program 1825, and data 1827. In other embodiments, storage medium 1821 may include other similar types of information. Certain UEs may utilize all of the components shown in FIG. 18, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry 1801 may be configured to process computer instructions and data. Processing circuitry 1801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1801 may include two central processing units (CPUs). Data may be information in a form suitable for use by a computer.

In the depicted embodiment, input/output interface 1805 may be configured to provide a communication interface to an input device, output device, or input and output device. UE 1800 may be configured to use an output device via input/output interface 1805. An output device may use the same type of interface port as an input device. For example, a USB port may be used to provide input to and output from UE 1800. The output device may be a speaker, a sound card, a video card, a display, a monitor, a printer, an actuator, an emitter, a smartcard, another output device, or any combination thereof. UE 1800 may be configured to use an input device via input/output interface 1805 to allow a user to capture information into UE 1800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface 1809 may be configured to provide a communication interface to RF components such as a transmitter, a receiver, and an antenna. Network connection interface 1811 may be configured to provide a communication interface to network 1843*a*. Network 1843*a* may encompass wired and/or wireless networks such as a local-area network (LAN), a wide-area network (WAN), a computer network, a wireless network, a telecommunications network, another like network or any combination thereof. For example, network 1843*a* may comprise a Wi-Fi network. Network connection interface 1811 may be configured to include a receiver and a transmitter interface used to communicate with one or more other devices over a communication network according to one or more communication protocols, such as Ethernet, TCP/IP, SONET, ATM, or the like. Network connection interface 1811 may implement receiver and transmitter functionality appropriate to the communication network links (e.g., optical, electrical, and the like). The transmitter and receiver functions may share circuit components, software or firmware, or alternatively may be implemented separately.

RAM 1817 may be configured to interface via bus 1802 to processing circuitry 1801 to provide storage or caching of data or computer instructions during the execution of software programs such as the operating system, application programs, and device drivers. ROM 1819 may be configured to provide computer instructions or data to processing circuitry 1801. For example, ROM 1819 may be configured to store invariant low-level system code or data for basic system functions such as basic input and output (I/O), startup, or reception of keystrokes from a keyboard that are stored in a non-volatile memory. Storage medium 1821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1821 may be configured to include operating system 1823, application program 1825 such as a web browser application, a widget or gadget engine or another application, and data file 1827. Storage medium 1821 may store, for use by UE 1800, any of a variety of various operating systems or combinations of operating systems.

Storage medium 1821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1821 may allow UE 1800 to access computer-executable instructions, application programs or the like, stored on transitory or non-transitory memory media, to off-load data, or to upload data. An article of manufacture, such as one utilizing a communication system may be tangibly embodied in storage medium 1821, which may comprise a device readable medium.

In FIG. 18, processing circuitry 1801 may be configured to communicate with network 1843b using communication subsystem 1831. Network 1843a and network 1843b may be the same network or networks or different network or networks. Communication subsystem 1831 may be configured to include one or more transceivers used to communicate with network 1843b. For example, communication subsystem 1831 may be configured to include one or more transceivers used to communicate with one or more remote transceivers of another device capable of wireless communication such as another WD, UE, or base station of a radio access network (RAN) according to one or more communication protocols, such as IEEE 802.18, CDMA, WCDMA, GSM, LTE, UTRAN, WiMax, or the like. Each transceiver may include transmitter 1833 and/or receiver 1835 to implement transmitter or receiver functionality, respectively, appropriate to the RAN links (e.g., frequency allocations and the like). Further, transmitter 1833 and receiver 1835 of each transceiver may share circuit components, software or firmware, or alternatively may be implemented separately.

In the illustrated embodiment, the communication functions of communication subsystem 1831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1831 may include cellular communication, Wi-Fi communication, Bluetooth communication, and GPS communication. Network 1843b may encompass wired and/or wireless networks such as a local-area network (LAN), a wide-area network (WAN), a computer network, a wireless network, a telecommunications network, another like network or any combination thereof. For example, network 1843b may be a cellular network, a Wi-Fi network, and/or a near-field network. Power source 1813 may be configured to provide alternating current (AC) or direct current (DC) power to components of UE 1800.

The features, benefits and/or functions described herein may be implemented in one of the components of UE 1800 or partitioned across multiple components of UE 1800. Further, the features, benefits, and/or functions described herein may be implemented in any combination of hardware, software or firmware. In one example, communication subsystem 1831 may be configured to include any of the components described herein. Further, processing circuitry 1801 may be configured to communicate with any of such components over bus 1802. In another example, any of such components may be represented by program instructions stored in memory that when executed by processing circuitry 1801 perform the corresponding functions described herein. In another example, the functionality of any of such components may be partitioned between processing circuitry 1801 and communication subsystem 1831. In another example, the non-computationally intensive functions of any of such components may be implemented in software or firmware and the computationally intensive functions may be implemented in hardware.

Figure 19:
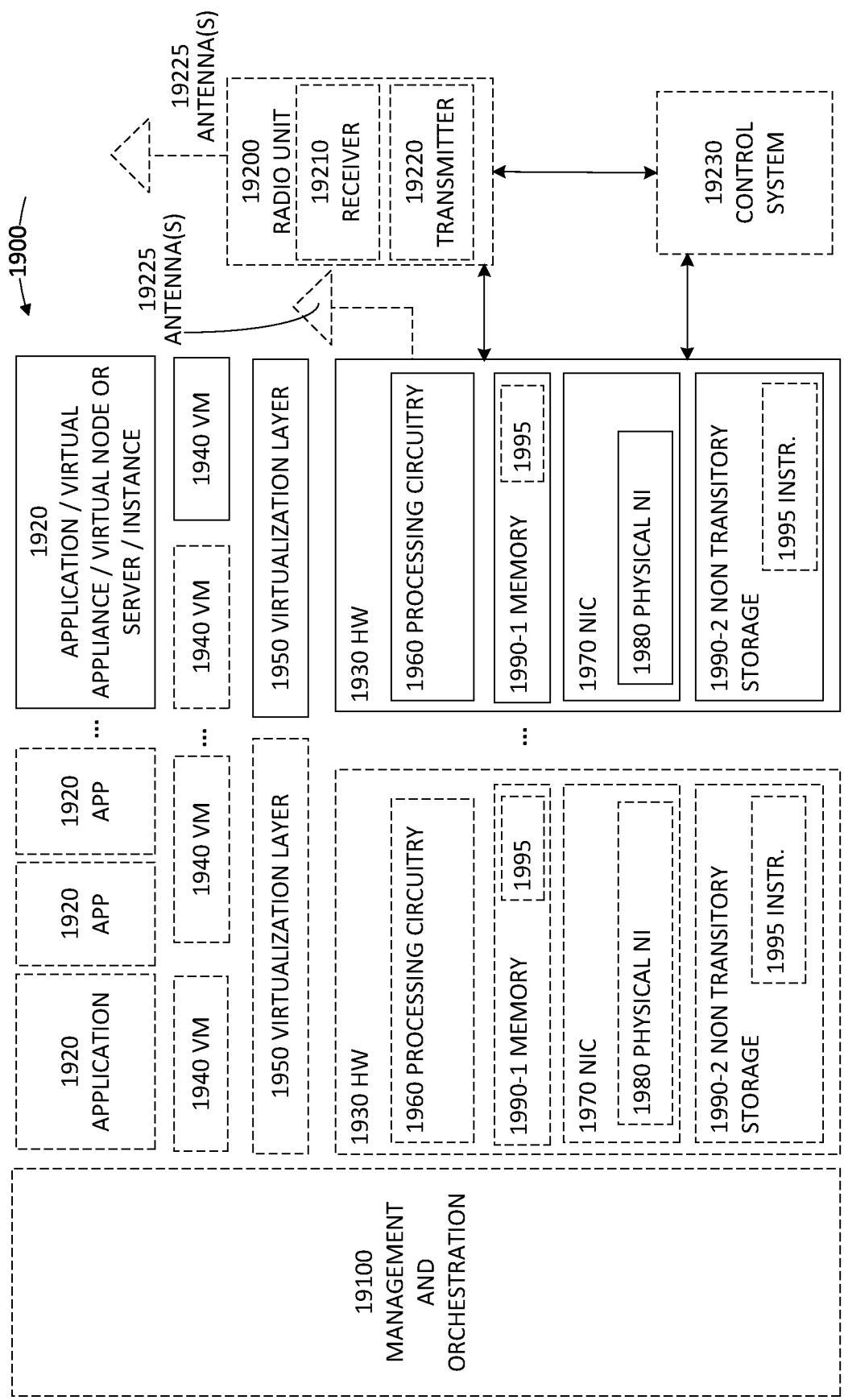
FIG. 19 is a block diagram of a virtualization environment according to some embodiments.

FIG. 19 is a schematic block diagram illustrating a virtualization environment 1900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1900 hosted by one or more of hardware nodes 1930. Further, in embodiments in which the virtual node is not a radio access node or does not require radio connectivity (e.g., a core network node), then the network node may be entirely virtualized.

The functions may be implemented by one or more applications 1920 (which may alternatively be called software instances, virtual appliances, network functions, virtual nodes, virtual network functions, etc.) operative to implement some of the features, functions, and/or benefits of some of the embodiments disclosed herein. Applications 1920 are run in virtualization environment 1900 which provides hardware 1930 comprising processing circuitry 1960 and memory 1990. Memory 1990 contains instructions 1995 executable by processing circuitry 1960 whereby application 1920 is operative to provide one or more of the features, benefits, and/or functions disclosed herein.

Virtualization environment 1900, comprises general-purpose or special-purpose network hardware devices 1930 comprising a set of one or more processors or processing circuitry 1960, which may be commercial off-the-shelf (COTS) processors, dedicated Application Specific Integrated Circuits (ASICs), or any other type of processing circuitry including digital or analog hardware components or special purpose processors. Each hardware device may comprise memory 1990-1 which may be non-persistent memory for temporarily storing instructions 1995 or software executed by processing circuitry 1960. Each hardware device may comprise one or more network interface controllers (NICs) 1970, also known as network interface cards, which include physical network interface 1980. Each hardware device may also include non-transitory, persistent, machine-readable storage media 1990-2 having stored therein software 1995 and/or instructions executable by processing circuitry 1960. Software 1995 may include any type of software including software for instantiating one or more virtualization layers 1950 (also referred to as hypervisors), software to execute virtual machines 1940 as well as software allowing it to execute functions, features and/or benefits described in relation with some embodiments described herein.

Virtual machines 1940, comprise virtual processing, virtual memory, virtual networking or interface and virtual storage, and may be run by a corresponding virtualization layer 1950 or hypervisor. Different embodiments of the instance of virtual appliance 1920 may be implemented on one or more of virtual machines 1940, and the implementations may be made in different ways.

During operation, processing circuitry 1960 executes software 1995 to instantiate the hypervisor or virtualization layer 1950, which may sometimes be referred to as a virtual machine monitor (VMM). Virtualization layer 1950 may present a virtual operating platform that appears like networking hardware to virtual machine 1940.

As shown in FIG. 19, hardware 1930 may be a standalone network node with generic or specific components. Hardware 1930 may comprise antenna 19225 and may implement some functions via virtualization. Alternatively, hardware 1930 may be part of a larger cluster of hardware (e.g. such as in a data center or customer premise equipment (CPE)) where many hardware nodes work together and are managed via management and orchestration (MANO) 19100, which, among others, oversees lifecycle management of applications 1920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1940 may be a software implementation of a physical machine that runs programs as if they were executing on a physical, non-virtualized machine. Each of virtual machines 1940, and that part of hardware 1930 that executes that virtual machine, be it hardware dedicated to that virtual machine and/or hardware shared by that virtual machine with others of the virtual machines 1940, forms a separate virtual network elements (VNE).

Still in the context of NFV, Virtual Network Function (VNF) is responsible for handling specific network functions that run in one or more virtual machines 1940 on top of hardware networking infrastructure 1930 and corresponds to application 1920 in FIG. 19.

In some embodiments, one or more radio units 19200 that each include one or more transmitters 19220 and one or more receivers 19210 may be coupled to one or more antennas 19225. Radio units 19200 may communicate directly with hardware nodes 1930 via one or more appropriate network interfaces and may be used in combination with the virtual components to provide a virtual node with radio capabilities, such as a radio access node or a base station.

In some embodiments, some signalling can be effected with the use of control system 19230 which may alternatively be used for communication between the hardware nodes 1930 and radio units 19200.

Figure 20:
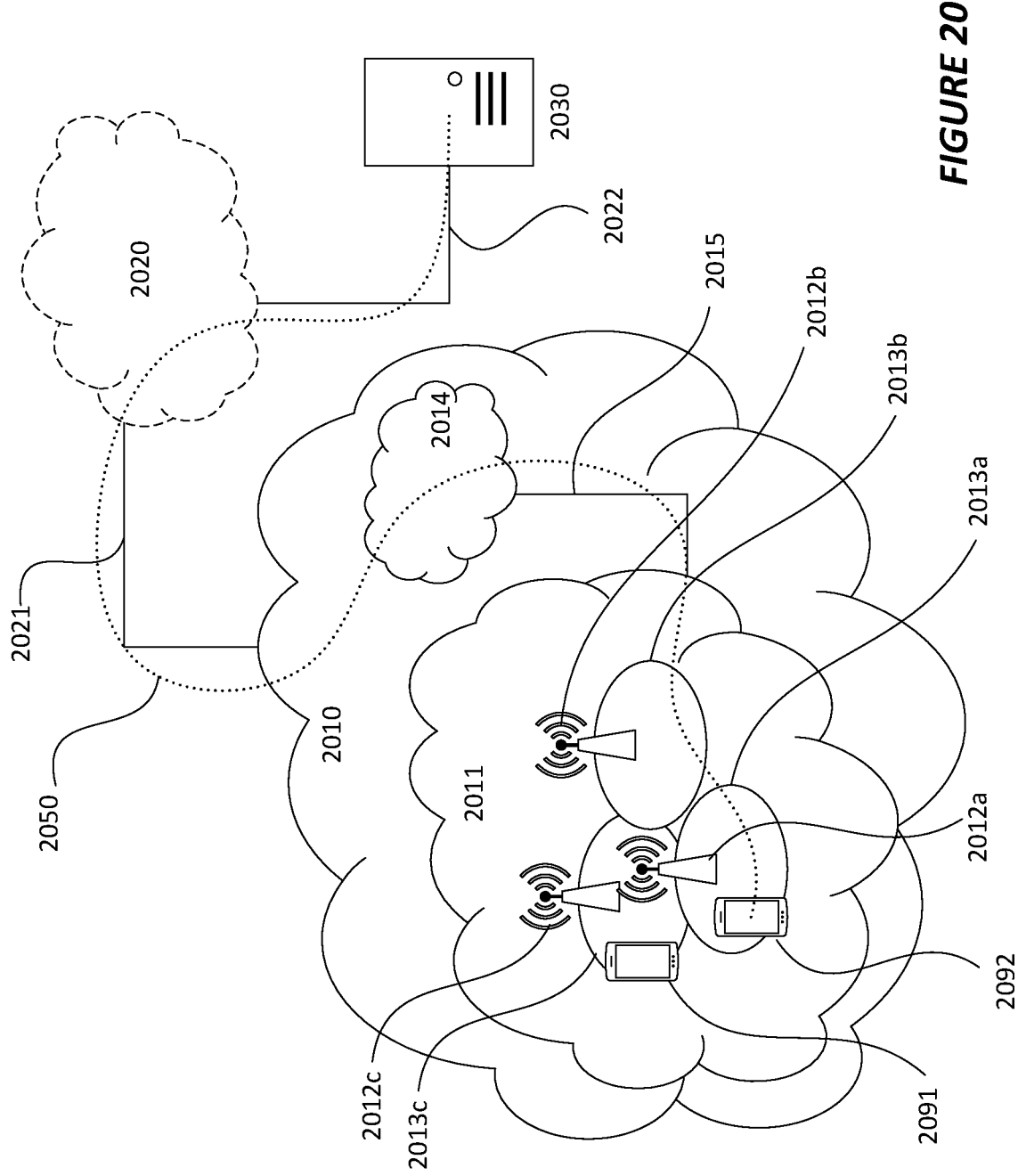
FIG. 20 is a block diagram of a communication network with a host computer according to some embodiments.

FIG. 20 illustrates a telecommunication network connected via an intermediate network to a host computer in accordance with some embodiments. In particular, with reference to FIG. 20, in accordance with an embodiment, a communication system includes telecommunication network 2010, such as a 3GPP-type cellular network, which comprises access network 2011, such as a radio access network, and core network 2014. Access network 2011 comprises a plurality of base stations 2012*a*, 2012*b*, 2012*c*, such as NBs, eNBs, gNBs or other types of wireless access points, each defining a corresponding coverage area 2013*a*, 2013*b*, 2013*c*. Each base station 2012*a*, 2012*b*, 2012*c* is connectable to core network 2014 over a wired or wireless connection 2015. A first UE 2091 located in coverage area 2013*c* is configured to wirelessly connect to, or be paged by, the corresponding base station 2012*c*. A second UE 2092 in coverage area 2013*a* is wirelessly connectable to the corresponding base station 2012*a*. While a plurality of UEs 2091, 2092 are illustrated in this example, the disclosed embodiments are equally applicable to a situation where a sole UE is in the coverage area or where a sole UE is connecting to the corresponding base station 2012.

Telecommunication network 2010 is itself connected to host computer 2030, which may be embodied in the hardware and/or software of a standalone server, a cloud-implemented server, a distributed server or as processing resources in a server farm. Host computer 2030 may be under the ownership or control of a service provider, or may be operated by the service provider or on behalf of the service provider. Connections 2021 and 2022 between telecommunication network 2010 and host computer 2030 may extend directly from core network 2014 to host computer 2030 or may go via an optional intermediate network 2020. Intermediate network 2020 may be one of, or a combination of more than one of, a public, private or hosted network; intermediate network 2020, if any, may be a backbone network or the Internet; in particular, intermediate network 2020 may comprise two or more sub-networks (not shown).

The communication system of FIG. 20 as a whole enables connectivity between the connected UEs 2091, 2092 and host computer 2030. The connectivity may be described as an over-the-top (OTT) connection 2050. Host computer 2030 and the connected UEs 2091, 2092 are configured to communicate data and/or signaling via OTT connection 2050, using access network 2011, core network 2014, any intermediate network 2020 and possible further infrastructure (not shown) as intermediaries. OTT connection 2050 may be transparent in the sense that the participating communication devices through which OTT connection 2050 passes are unaware of routing of uplink and downlink communications. For example, base station 2012 may not or need not be informed about the past routing of an incoming downlink communication with data originating from host computer 2030 to be forwarded (e.g., handed over) to a connected UE 2091. Similarly, base station 2012 need not be aware of the future routing of an outgoing uplink communication originating from the UE 2091 towards the host computer 2030.

Figure 21:
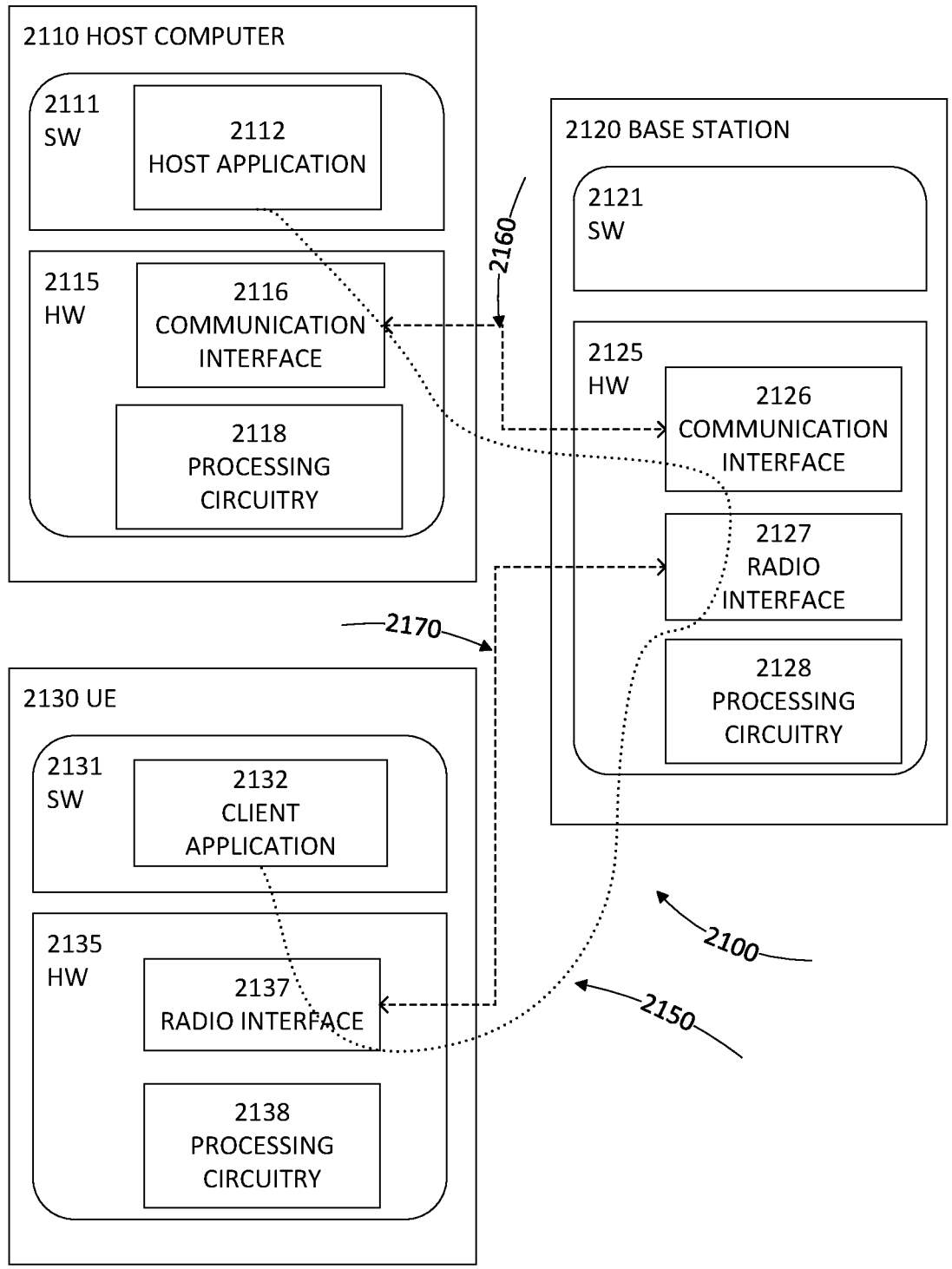
FIG. 21 is a block diagram of a host computer according to some embodiments.

Example implementations, in accordance with an embodiment, of the UE, base station and host computer discussed in the preceding paragraphs will now be described with reference to FIG. 21. FIG. 21 illustrates host computer communicating via a base station with a user equipment over a partially wireless connection in accordance with some embodiments In communication system 2100, host computer 2110 comprises hardware 2115 including communication interface 2116 configured to set up and maintain a wired or wireless connection with an interface of a different communication device of communication system 2100. Host computer 2110 further comprises processing circuitry 2118, which may have storage and/or processing capabilities. In particular, processing circuitry 2118 may comprise one or more programmable processors, application-specific integrated circuits, field programmable gate arrays or combinations of these (not shown) adapted to execute instructions. Host computer 2110 further comprises software 2111, which is stored in or accessible by host computer 2110 and executable by processing circuitry 2118. Software 2111 includes host application 2112. Host application 2112 may be operable to provide a service to a remote user, such as UE 2130 connecting via OTT connection 2150 terminating at UE 2130 and host computer 2110. In providing the service to the remote user, host application 2112 may provide user data which is transmitted using OTT connection 2150.

Communication system 2100 further includes base station 2120 provided in a telecommunication system and comprising hardware 2125 enabling it to communicate with host computer 2110 and with UE 2130. Hardware 2125 may include communication interface 2126 for setting up and maintaining a wired or wireless connection with an interface of a different communication device of communication system 2100, as well as radio interface 2127 for setting up and maintaining at least wireless connection 2170 with UE 2130 located in a coverage area (not shown in FIG. 21) served by base station 2120. Communication interface 2126 may be configured to facilitate connection 2160 to host computer 2110. Connection 2160 may be direct or it may pass through a core network (not shown in FIG. 21) of the telecommunication system and/or through one or more intermediate networks outside the telecommunication system. In the embodiment shown, hardware 2125 of base station 2120 further includes processing circuitry 2128, which may comprise one or more programmable processors, application-specific integrated circuits, field programmable gate arrays or combinations of these (not shown) adapted to execute instructions. Base station 2120 further has software 2121 stored internally or accessible via an external connection.

Communication system 2100 further includes UE 2130 already referred to. Its hardware 2135 may include radio interface 2137 configured to set up and maintain wireless connection 2170 with a base station serving a coverage area in which UE 2130 is currently located. Hardware 2135 of UE 2130 further includes processing circuitry 2138, which may comprise one or more programmable processors, application-specific integrated circuits, field programmable gate arrays or combinations of these (not shown) adapted to execute instructions. UE 2130 further comprises software 2131, which is stored in or accessible by UE 2130 and executable by processing circuitry 2138. Software 2131 includes client application 2132. Client application 2132 may be operable to provide a service to a human or non-human user via UE 2130, with the support of host computer 2110. In host computer 2110, an executing host application 2112 may communicate with the executing client application 2132 via OTT connection 2150 terminating at UE 2130 and host computer 2110. In providing the service to the user, client application 2132 may receive request data from host application 2112 and provide user data in response to the request data. OTT connection 2150 may transfer both the request data and the user data. Client application 2132 may interact with the user to generate the user data that it provides.

It is noted that host computer 2110, base station 2120 and UE 2130 illustrated in FIG. 21 may be similar or identical to host computer 2030, one of base stations 2012*a*, 2012*b*, 2012*c* and one of UEs 2091, 2092 of FIG. 20, respectively. This is to say, the inner workings of these entities may be as shown in FIG. 21 and independently, the surrounding network topology may be that of FIG. 20.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure may determine the routing, which it may be configured to hide from UE 2130 or from the service provider operating host computer 2110, or both. While OTT connection 2150 is active, the network infrastructure may further take decisions by which it dynamically changes the routing (e.g., on the basis of load balancing consideration or reconfiguration of the network).

Wireless connection 2170 between UE 2130 and base station 2120 is in accordance with the teachings of the embodiments described throughout this disclosure. One or more of the various embodiments improve the performance of OTT services provided to UE 2130 using OTT connection 2150, in which wireless connection 2170 forms the last segment.

A measurement procedure may be provided for the purpose of monitoring data rate, latency and other factors on which the one or more embodiments improve. There may further be an optional network functionality for reconfiguring OTT connection 2150 between host computer 2110 and UE 2130, in response to variations in the measurement results. The measurement procedure and/or the network functionality for reconfiguring OTT connection 2150 may be implemented in software 2111 and hardware 2115 of host computer 2110 or in software 2131 and hardware 2135 of UE 2130, or both. In embodiments, sensors (not shown) may be deployed in or in association with communication devices through which OTT connection 2150 passes; the sensors may participate in the measurement procedure by supplying values of the monitored quantities exemplified above, or supplying values of other physical quantities from which software 2111, 2131 may compute or estimate the monitored quantities. The reconfiguring of OTT connection 2150 may include message format, retransmission settings, preferred routing etc.; the reconfiguring need not affect base station 2120, and it may be unknown or imperceptible to base station 2120. Such procedures and functionalities may be known and practiced in the art. In certain embodiments, measurements may involve proprietary UE signaling facilitating host computer 2110's measurements of throughput, propagation times, latency and the like. The measurements may be implemented in that software 2111 and 2131 causes messages to be transmitted, in particular empty or 'dummy' messages, using OTT connection 2150 while it monitors propagation times, errors etc.

Figure 22:
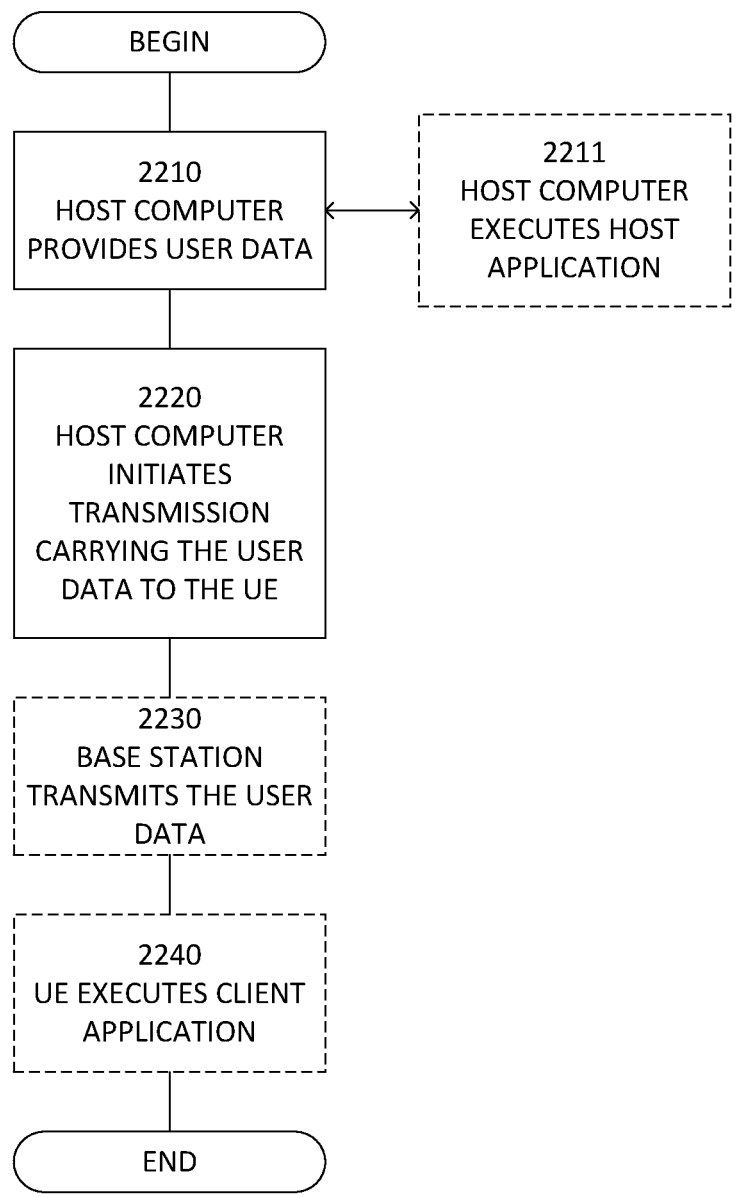
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step 2210, the host computer provides user data. In substep 2211 (which may be optional) of step 2210, the host computer provides the user data by executing a host application. In step 2220, the host computer initiates a transmission carrying the user data to the UE. In step 2230 (which may be optional), the base station transmits to the UE the user data which was carried in the transmission that the host computer initiated, in accordance with the teachings of the embodiments described throughout this disclosure. In step 2240 (which may also be optional), the UE executes a client application associated with the host application executed by the host computer.

Figure 23:
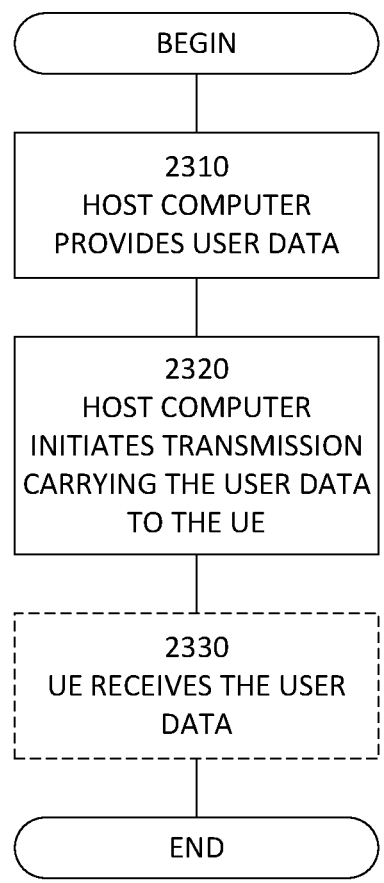
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission may pass via the base station, in accordance with the teachings of the embodiments described throughout this disclosure. In step 2330 (which may be optional), the UE receives the user data carried in the transmission.

Figure 24:
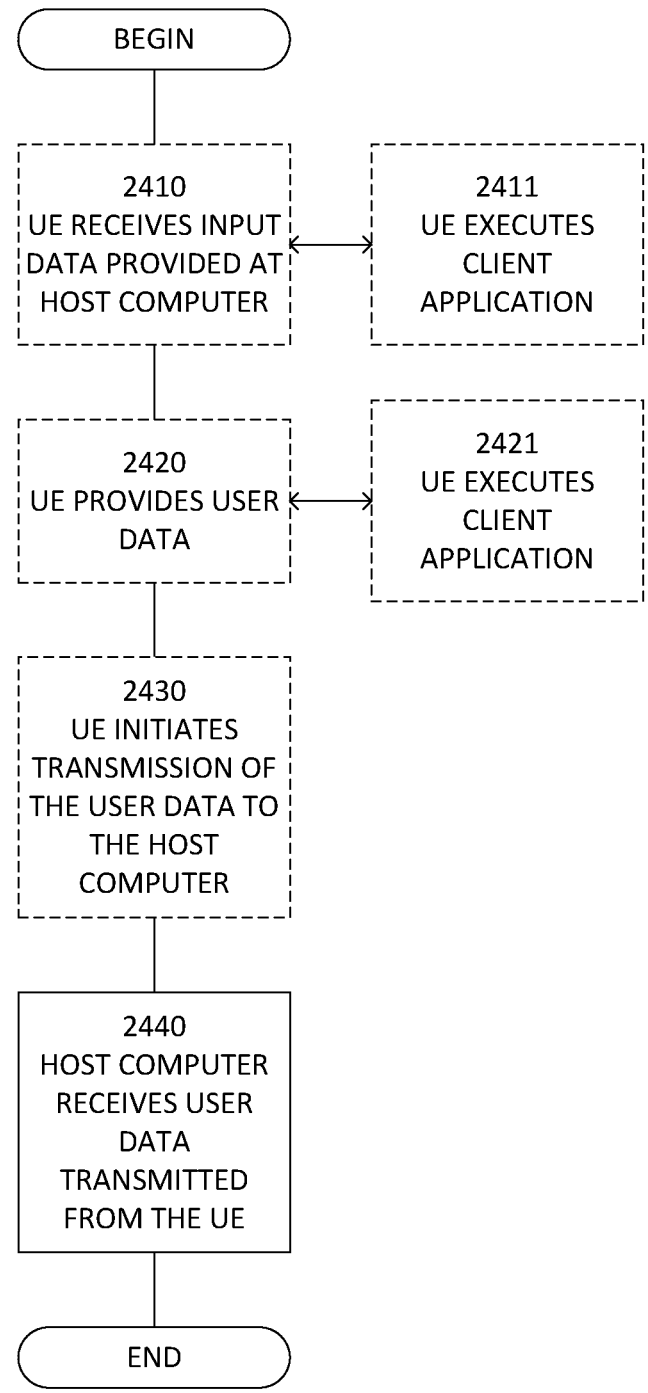
FIG. 24 is a flowchart illustrating a method implemented in a communication system, in accordance with one embodiment.

FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section. In step 2410 (which may be optional), the UE receives input data provided by the host computer. Additionally or alternatively, in step 2420, the UE provides user data. In substep 2421 (which may be optional) of step 2420, the UE provides the user data by executing a client application. In substep 2411 (which may be optional) of step 2410, the UE executes a client application which provides the user data in reaction to the received input data provided by the host computer. In providing the user data, the executed client application may further consider user input received from the user. Regardless of the specific manner in which the user data was provided, the UE initiates, in substep 2430 (which may be optional), transmission of the user data to the host computer. In step 2440 of the method, the host computer receives the user data transmitted from the UE, in accordance with the teachings of the embodiments described throughout this disclosure.

Figure 25:
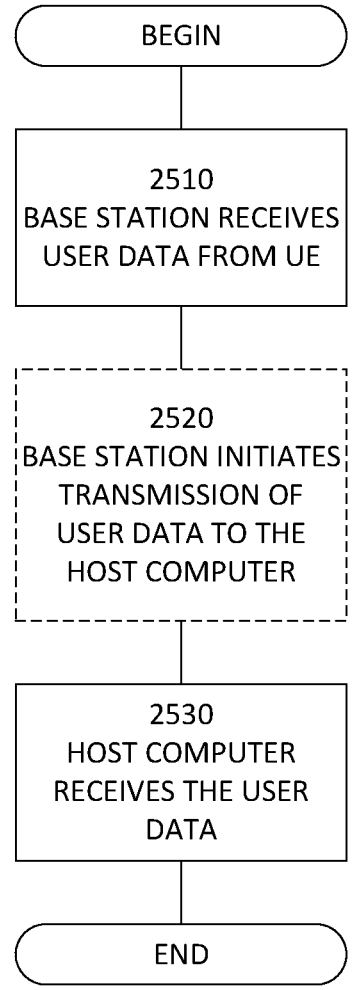
FIG. 25 is a flowchart illustrating a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section. In step 2510 (which may be optional), in accordance with the teachings of the embodiments described throughout this disclosure, the base station receives user data from the UE. In step 2520 (which may be optional), the base station initiates transmission of the received user data to the host computer. In step 2530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Example embodiments of the techniques and apparatus described herein include, but are not limited to, the following enumerated examples:

Group A Embodiments

A1. A method performed by a wireless device, the method comprising:
receiving a control message indicating a conditional configuration that the wireless device is to add, modify, or release for a link, wherein the control message includes configuration-specific information that distinguishes the conditional configuration from one or more other conditional configurations that are configurable for the link.

A2. The method of embodiment A1, wherein the configuration-specific information includes a conditional configuration identifier that is unique at least among any conditional configurations configured for the link.

A3. The method of any of embodiments A1-A2, wherein the configuration-specific information includes a Radio Resource Control, RRC, transaction identifier that is unique at least among any conditional configurations configured for the link.

A4. The method of any of embodiments A1-A3, wherein the configuration-specific information includes a radio network temporary identifier that is unique at least among any conditional configurations configured for the link.

A5. The method of any of embodiments A1-A4, wherein the configuration-specific information includes a random access channel configuration that is unique at least among any conditional configurations configured for the link.

A6. The method of any of embodiments A1-A5, wherein the configuration-specific information includes a preamble and/or a radio resource allocation for random access that is unique at least among any conditional configurations configured for the link.

A7. The method of any of embodiments A1-A6, wherein the link is a cell.

A8. The method of any of embodiments A1-A6, wherein the link is a radio network node.

A9. The method of any of embodiments A1-A8, wherein the conditional configuration is a conditional handover configuration that contains a handover configuration and one or more trigger conditions whose fulfillment is to trigger execution of the handover configuration.

A10. The method of embodiment A9, wherein the link is a target cell candidate for the conditional handover configuration or a target radio network node for the conditional handover configuration.

A11. The method of any of embodiments A1-A10, wherein the control message is a Radio Resource Control, RRC, reconfiguration message.

A12. The method of any of embodiments A1-A11, wherein the control message indicates multiple conditional configurations that the wireless device is to add, modify, or release for the link, wherein the control message includes configuration-specific information for each of the multiple conditional configurations that distinguishes the multiple conditional configurations from one another.

A13. The method of any of embodiments A1-A12, further comprising adding, modifying, or releasing the conditional configuration for the link in accordance with the received control message.

A14. The method of any of embodiments A1-A13, further comprising, for each conditional configuration that is configured for the link, monitoring for whether one or more trigger conditions associated with the conditional configuration are fulfilled.

A15. The method of embodiment A14, further comprising selecting, from among multiple conditional configurations whose one or more trigger conditions are fulfilled, a conditional configuration to apply.

A16. The method of any of embodiments A14-A15, further comprising applying a conditional configuration whose one or more trigger conditions are fulfilled.

A17. The method of any of embodiments A1-A16, further comprising transmitting a control message indicating a conditional configuration that the wireless device has applied for the link, wherein the transmitted control message includes configuration-specific information that distinguishes the applied conditional configuration from one or more other conditional configurations that are configurable for the link.

A18. The method of embodiment A17, wherein the transmitted control message is an RRC Reconfiguration Complete message.

A19. The method of any of embodiments A1-A18, wherein the control message also includes a link identifier that identifies the link.

A20. The method of any of embodiments A1-A19, further comprising transmitting a response message indicating that the wireless device added, modified, or released the conditional configuration for the link in accordance with the control message.

A21. The method of any of embodiments A1-A20, wherein the conditional configuration is a conditional handover configuration that contains a handover configuration and one or more trigger conditions whose fulfillment is to trigger execution of the handover configuration, and wherein the control message is received from a source link for the conditional handover configuration.

A22. The method of any of embodiments A1-A20, wherein the conditional configuration is a conditional handover configuration that contains a handover configuration and one or more trigger conditions whose fulfillment is to trigger execution of the handover configuration, and wherein the control message is received, via a source link for the conditional handover configuration, from a target link for the conditional handover configuration.

A23. The method of embodiment A22, wherein the control message is or is included in a transparent container that the source link transparently forwards from the target link to the wireless device.

A24. A method performed by a wireless device, the method comprising:
transmitting a control message indicating a conditional configuration that the wireless device has applied for a link, wherein the control message includes or is transmitted based on configuration-specific information that distinguishes the applied conditional configuration from one or more other conditional configurations that are configurable for the link.

A25. The method of embodiment A24, wherein the configuration-specific information includes a conditional configuration identifier that is unique at least among any conditional configurations configured for the link.

A26. The method of any of embodiments A24-A25, wherein the configuration-specific information includes a Radio Resource Control, RRC, transaction identifier that is unique at least among any conditional configurations configured for the link.

A27. The method of any of embodiments A24-A26, wherein the configuration-specific information includes a radio network temporary identifier that is unique at least among any conditional configurations configured for the link.

A28. The method of any of embodiments A24-A27, further comprising, before transmitting the control message, sending a random access request message using a random access channel configuration that is unique at least among any conditional configurations configured for the link, and wherein the configuration-specific information includes information indicating the random access channel configuration.

A29. The method of any of embodiments A24-A28, further comprising, before transmitting the control message, performing a random access procedure using a preamble that is unique at least among any conditional configurations configured for the link and/or using one or more radio resources that are unique at least among any conditional configurations configured for the link, wherein the configuration-specific information includes information indicating the preamble and/or the one or more radio resources.

A30. The method of any of embodiments A24-A29, wherein the link is a cell.

A31. The method of any of embodiments A24-A29, wherein the link is a radio network node.

A32. The method of any of embodiments A24-A31, wherein the conditional configuration is a conditional handover configuration that contains a handover configuration and one or more trigger conditions whose fulfillment is to trigger execution of the handover configuration.

A33. The method of embodiment A32, wherein the link is a target cell candidate for the conditional handover configuration or a target radio network node for the conditional handover configuration.

AA. The method of any of the previous embodiments, further comprising:
  providing user data; and
  forwarding the user data to a host computer via the transmission to a base station.

Group B Embodiments

B1. A method performed by a radio network node, the method comprising:
  transmitting, to a wireless device, a control message indicating a conditional configuration that the wireless device is to add, modify, or release for a link, wherein the control message includes configuration-specific information that distinguishes the conditional configuration from one or more other conditional configurations that are configurable for the link.

B2. The method of embodiment B1, wherein the configuration-specific information includes a conditional configuration identifier that is unique at least among any conditional configurations configured for the link.

B3. The method of any of embodiments B1-B2, wherein the configuration-specific information includes a Radio Resource Control, RRC, transaction identifier that is unique at least among any conditional configurations configured for the link.

B4. The method of any of embodiments B1-B3, wherein the configuration-specific information includes a radio network temporary identifier that is unique at least among any conditional configurations configured for the link.

B5. The method of any of embodiments B1-B4, wherein the configuration-specific information includes a random access channel configuration that is unique at least among any conditional configurations configured for the link.

B6. The method of any of embodiments B1-B5, wherein the configuration-specific information includes a preamble and/or a radio resource allocation for random access that is unique at least among any conditional configurations configured for the link.

B7. The method of any of embodiments B1-B6, wherein the link is a cell.

B8. The method of any of embodiments B1-B6, wherein the link is a radio network node.

B9. The method of any of embodiments B1-B8, wherein the conditional configuration is a conditional handover configuration that contains a handover configuration and one or more trigger conditions whose fulfillment is to trigger execution of the handover configuration.

B10. The method of embodiment B9, wherein the link is a target cell candidate for the conditional handover configuration or a target radio network node for the conditional handover configuration.

B11. The method of any of embodiments B9-B10, wherein the radio network node is a target radio network node for the conditional handover configuration and/or provides a target cell candidate for the conditional handover configuration.

B12. The method of any of embodiments B9-B10, wherein the radio network node is a source radio network node for the conditional handover configuration.

B13. The method of embodiment B12, further comprising transmitting control signaling to a target radio network node for the conditional handover configuration indicating the configuration-specific information for the indicated conditional configuration.

B14. The method of embodiment B12, further comprising receiving control signaling from a target radio network node for the conditional handover configuration indicating the configuration-specific information for the conditional configuration.

B15. The method of any of embodiments B1-B14, further comprising determining the configuration-specific information for the indicated conditional configuration.

B16. The method of any of embodiments B1-B15, further comprising triggering the addition, modification, or release of the conditional configuration for the link, based on network conditions and/or traffic conditions for the wireless device.

B17. The method of any of embodiments B1-B16, further comprising triggering the addition, modification, or release of the conditional configuration for the link, responsive to one or more of:
  a change in availability of resources needed for the conditional configuration;
  the wireless device applying a different conditional configuration;
  a change in resource requirements that are required for communicating traffic to or from the wireless device; or
  a change in channel conditions at the wireless device.

B18. The method of any of embodiments B1-B15, wherein the radio network node is a source radio network node that configures the wireless device for the conditional handover configuration, and wherein the method further comprises receiving, from a target radio network node for the conditional handover configuration, a message indicating which conditional handover configurations the wireless device is to add, modify, or release for the link, and wherein transmitting the control message to the wireless device is performed responsive to receiving the message from the target radio network node.

B19. The method of embodiment B18, wherein the received message explicitly indicates which conditional handover configurations the wireless device is to add, modify, or release for the link, and wherein the method further comprises processing the received message to determine which conditional handover configurations the wireless device is to add, modify, or release for the link.

B20. The method of embodiment B18, wherein the received message is included in a container, and wherein the method further comprises retrieving the received message from the container and transparently forwarding the retrieved message to the wireless device as said control message.

B21. The method of any of embodiments B18-B20, wherein the received message is a handover modification required message or a handover cancel required message.

B22. The method of any of embodiments B1-B21, wherein the control message is a Radio Resource Control, RRC, reconfiguration message.

B23. The method of any of embodiments B1-B22, wherein the control message indicates multiple conditional configurations that the wireless device is to add, modify, or release for the link, wherein the control message includes configuration-specific information for each of the multiple conditional configurations that distinguishes the multiple conditional configurations from one another.

B24. The method of any of embodiments B1-B23, further comprising receiving a control message indicating a conditional configuration that the wireless device has applied for the link, wherein the received control message includes configuration-specific information that distinguishes the applied conditional configuration from one or more other conditional configurations that are configurable for the link.

B25. The method of embodiment B24, wherein the received control message is an RRC Reconfiguration Complete message.

B26. The method of any of embodiments B1-B25, wherein the control message also includes a link identifier that identifies the link.

B27. The method of any of embodiments B1-B26, further comprising receiving a response message indicating that the wireless device added, modified, or released the conditional configuration for the link in accordance with the control message.

B28. A method performed by a radio network node, the method comprising:
receiving a control message indicating a conditional configuration that the wireless device has applied for a link, wherein the control message includes configuration-specific information that distinguishes the applied conditional configuration from one or more other conditional configurations that are configurable for the link.

B29. The method of embodiment B28, wherein the configuration-specific information includes a conditional configuration identifier that is unique at least among any conditional configurations configured for the link.

B30. The method of any of embodiments B28-B29, wherein the configuration-specific information includes a Radio Resource Control, RRC, transaction identifier that is unique at least among any conditional configurations configured for the link.

B31. The method of any of embodiments B28-B30, wherein the configuration-specific information includes a radio network temporary identifier that is unique at least among any conditional configurations configured for the link.

B32. The method of any of embodiments B28-B31, further comprising, before receiving the control message, receiving a random access request message using a random access channel configuration that is unique at least among any conditional configurations configured for the link, and wherein the configuration-specific information includes information indicating the random access channel configuration.

B33. The method of any of embodiments B28-B32, further comprising, before receiving the control message, receiving random access signaling from the wireless device using a preamble that is unique at least among any conditional configurations configured for the link and/or using one or more radio resources that are unique at least among any conditional configurations configured for the link, wherein the configuration-specific information includes information indicating the preamble and/or the one or more radio resources.

B34. The method of any of embodiments B28-B33, wherein the link is a cell.

B35. The method of any of embodiments B28-B33, wherein the link is a radio network node.

B36. The method of any of embodiments B28-B35, wherein the conditional configuration is a conditional handover configuration.

B37. The method of embodiment B36, wherein the link is a target cell candidate for the conditional handover configuration or a target radio network node for the conditional handover configuration.

B38. The method of any of embodiments B28-B38, further comprising, based on the received control message, releasing any other conditional configurations that are configured for the wireless device.

B39. A method performed by a radio network node, the method comprising:
transmitting, to another radio network node, a control message indicating a conditional configuration that the other radio network node is to add, modify, or release, wherein the control message includes configuration-specific information that distinguishes the conditional configuration from one or more other conditional configurations that are configurable for the link.

B40. The method of embodiment B39, further comprising determining to transmit the control message, based on network conditions and/or traffic conditions for the wireless device.

B41. The method of any of embodiments B39-B40, further comprising determining to transmit the control message, responsive to one or more of:
a change in availability of resources needed for the conditional configuration;
the wireless device applying a different conditional configuration;
a change in resource requirements that are required for communicating traffic to or from the wireless device; or
a change in channel conditions at the wireless device.

B42. A method performed by a radio network node, the method comprising:

receiving, from another radio network node, a control message indicating a conditional configuration that the radio network node is to add, modify, or release, wherein the control message includes configuration-specific information that distinguishes the conditional configuration from one or more other conditional configurations that are configurable for the link.

B43. The method of embodiment B42, further comprising adding, modifying, or releasing the conditional configuration in accordance with the control message.

B44. The method of any of embodiments B39-B43, wherein the configuration-specific information includes a conditional configuration identifier that is unique at least among any conditional configurations configured for the link.

B45. The method of any of embodiments B39-B44, wherein the configuration-specific information includes a Radio Resource Control, RRC, transaction identifier that is unique at least among any conditional configurations configured for the link.

B46. The method of any of embodiments B39-B45, wherein the configuration-specific information includes a radio network temporary identifier that is unique at least among any conditional configurations configured for the link.

B47. The method of any of embodiments B39-B46, wherein the configuration-specific information includes a random access channel configuration that is unique at least among any conditional configurations configured for the link.

B48. The method of any of embodiments B39-B47, wherein the configuration-specific information includes a preamble and/or a radio resource allocation for random access that is unique at least among any conditional configurations configured for the link.

B49 The method of any of embodiments B39-B48, wherein the link is a cell.

B50. The method of any of embodiments B39-B48, wherein the link is a radio network node.

B51. The method of any of embodiments B39-B50, wherein the conditional configuration is a conditional handover configuration that contains a handover configuration and one or more trigger conditions whose fulfillment is to trigger execution of the handover configuration.

B52. The method of embodiment B51, wherein the link is a target cell candidate for the conditional handover configuration or a target radio network node for the conditional handover configuration.

B53. The method of any of embodiments B51-B52, wherein the radio network node is a target radio network node for the conditional handover configuration and/or provides a target cell candidate for the conditional handover configuration.

B54. The method of any of embodiments B51-B52, wherein the radio network node is a source radio network node that configures the wireless device for the conditional handover configuration.

BB. The method of any of the previous embodiments, further comprising:

obtaining user data; and forwarding the user data to a host computer or a wireless device.

Group C Embodiments

C1. A wireless device configured to perform any of the steps of any of the Group A embodiments.

C2. A wireless device comprising processing circuitry configured to perform any of the steps of any of the Group A embodiments.

C3. A wireless device comprising:
communication circuitry; and
processing circuitry configured to perform any of the steps of any of the Group A embodiments.

C4. A wireless device comprising:
processing circuitry configured to perform any of the steps of any of the Group A embodiments; and
power supply circuitry configured to supply power to the wireless device.

C5. A wireless device comprising:
processing circuitry and memory, the memory containing instructions executable by the processing circuitry whereby the wireless device is configured to perform any of the steps of any of the Group A embodiments.

C6. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. A radio network node configured to perform any of the steps of any of the Group B embodiments.

C10. A radio network node comprising processing circuitry configured to perform any of the steps of any of the Group B embodiments.

C11. A radio network node comprising:
communication circuitry; and
processing circuitry configured to perform any of the steps of any of the Group B embodiments.

C12. A radio network node comprising:
processing circuitry configured to perform any of the steps of any of the Group B embodiments;
power supply circuitry configured to supply power to the radio network node.

C13. A radio network node comprising:
processing circuitry and memory, the memory containing instructions executable by the processing circuitry whereby the radio network node is configured to perform any of the steps of any of the Group B embodiments.

C14. The radio network node of any of embodiments C9-C13, wherein the radio network node is a base station.

C15. A computer program comprising instructions which, when executed by at least one processor of a radio network node, causes the radio network node to carry out the steps of any of the Group B embodiments.

C16. The computer program of embodiment C14, wherein the radio network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
  at the UE, executing a client application; and
  at the UE, receiving input data to the client application, the input data being provided at the host computer by executing a host application associated with the client application,
  wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
  the processing circuitry of the host computer is configured to execute a host application;
  the UE is configured to execute a client application associated with the host application, thereby providing the user data to be received by the host computer.

D27. A method implemented in a communication system including a host computer, a base station and a user equipment (UE), the method comprising:
  at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method performed by a wireless device, the method comprising:
  receiving, from a radio network node, a control message indicating a conditional handover configuration that contains a handover configuration and one or more trigger conditions whose fulfillment is to trigger execution of the handover configuration by the wireless device, wherein the control message includes configuration-specific information that distinguishes the conditional handover configuration from one or more other conditional handover configurations that are configurable for a link, wherein the configuration-specific information includes a radio network temporary identifier (RNTI) and/or a random access channel configuration that are unique at least among any conditional handover configurations configured for the link; and
  based on fulfillment of the one or more trigger conditions, applying the handover configuration by transmitting a control message of a random access procedure to a radio network node, the control message of the random access procedure including the RNTI and/or being transmitted according to the random access channel configuration.

2. The method of claim 1, wherein the configuration-specific information includes the RNTI, wherein the RNTI is unique at least among any conditional handover configurations configured for the link.

3. The method of claim 1, wherein the configuration-specific information includes the random access channel configuration, wherein the random access channel configuration is unique at least among any conditional handover configurations configured for the link.

4. The method of claim 1, wherein the link is a link to a cell or a radio network node.

5. The method of claim 1, wherein the control message is received from a source link for the conditional configuration.

6. The method of claim 1, wherein the control message is received, via a source link for the conditional handover configuration, from a target link for the conditional handover configuration, wherein the control message is or is included in a transparent container that the source link transparently forwards from the target link to the wireless device.

7. The method of claim 1, further comprising adding the conditional handover configuration for the link in accordance with the received control message.

8. A method performed by a radio network node, the method comprising:
  transmitting, to another radio network node, a control message indicating a conditional handover configuration that contains a handover configuration and one or more trigger conditions whose fulfillment is to trigger execution of the handover configuration by a wireless device, wherein the control message includes configuration-specific information that distinguishes the conditional handover configuration from one or more other conditional handover configurations that are configurable for a link, wherein the configuration-specific information includes a radio network temporary identifier (RNTI) and/or a random access channel configuration that are unique at least among any conditional handover configurations configured for the link; and
  receiving, from the wireless device, a control message of a random access procedure, the control message of the random access procedure including the RNTI and/or being transmitted according to the random access channel configuration.

9. The method of claim 8, further comprising determining, from the RNTI included in the control message and/or from the random access channel configuration according to which the control message was transmitted, a conditional handover configuration applied by the wireless device for the link.

10. The method of claim 9, further comprising releasing one or more resources reserved for the link according to one or more other conditional handover configurations.

11. The method of claim 8, wherein the configuration-specific information includes the RNTI, wherein the RNTI is unique at least among any conditional handover configurations configured for the link.

12. The method of claim 8, wherein the configuration-specific information includes the random access channel configuration, wherein the random access channel configuration is unique at least among any conditional handover configurations configured for the link.

13. The method of claim 8, wherein the link is a link to a cell or a radio network node.

14. The method of claim 8, further comprising triggering addition, modification, or release of the conditional handover configuration for the link, based on network conditions and/or traffic conditions for the wireless device, or responsive to one or more of:
a change in availability of resources needed for the conditional handover configuration;
the wireless device applying a different conditional handover configuration;
a change in resource requirements that are required for communicating traffic to or from the wireless device; or
a change in channel conditions at the wireless device.

15. The method of claim 8, wherein the radio network node is a target radio network node for the conditional configuration and/or provides a target cell candidate for the conditional handover configuration, and wherein the method further comprises triggering, by the target radio network node, addition, modification, or release of the conditional handover configuration for the link.

16. The method of claim 8, wherein the radio network node is a target radio network node for the conditional handover configuration and/or provides a target cell candidate for the conditional handover configuration.

17. The method of claim 16, wherein transmitting the control message comprises transmitting a container to a source radio network node for the conditional handover configuration, wherein the container includes the control message.

18. A wireless device comprising:
communication circuitry; and
processing circuitry configured to;
receive, from a radio network node, a control message indicating a conditional handover configuration that contains a handover configuration and one or more trigger conditions whose fulfillment is to trigger execution of the handover configuration by the wireless device, wherein the control message includes configuration-specific information that distinguishes the conditional handover configuration from one or more other conditional handover configurations that are configurable for a link, wherein the configuration-specific information includes a radio network temporary identifier (RNTI) and/or a random access channel configuration that are unique at least among any conditional handover configurations configured for the link; and
based on fulfillment of the one or more trigger conditions, apply the handover configuration by transmitting a control message of a random access procedure to a radio network node, the control message of the random access procedure including the RNTI and/or being transmitted according to the random access channel configuration.

19. A radio network node comprising:
communication circuitry; and
processing circuitry configured to:
transmit, to another radio network node, a control message indicating a conditional handover configuration that contains a handover configuration and one or more trigger conditions whose fulfillment is to trigger execution of the handover configuration by a wireless device, wherein the control message includes configuration-specific information that distinguishes the conditional handover configuration from one or more other conditional handover configurations that are configurable for a link, wherein the configuration-specific information includes a radio network temporary identifier (RNTI) and/or a random access channel configuration that are unique at least among any conditional handover configurations configured for the link; and
receive, from the wireless device, a control message of a random access procedure, the control message of the random access procedure including the RNTI and/or being transmitted according to the random access channel configuration.

* * * * *